United States Patent [19]
Weder et al.

[11] Patent Number: 5,392,161
[45] Date of Patent: Feb. 21, 1995

[54] ILLUSION ASSEMBLY CREATING A SEE THROUGH EFFECT

[75] Inventors: Donald E. Weder, Highland, Ill.;
James J. Sluss, Jr., Norman, Okla.;
Joseph G. Straeter, Highland, Ill.;
Charles A. Codding, Oklahoma City, Okla.; David A. Weder, Highland, Ill.

[73] Assignee: Highland Supply Corporation, Highland, Ill.

[21] Appl. No.: 958

[22] Filed: Jan. 5, 1993

[51] Int. Cl.⁶ .............................................. G02B 5/10
[52] U.S. Cl. .................................. 359/861; 472/63; 472/71; 446/219
[58] Field of Search ............... 446/219; 472/63, 71; 359/861

[56] References Cited

U.S. PATENT DOCUMENTS

| | | |
|---|---|---|
| 1,462,849 | 7/1923 | Christenson et al. |
| 1,552,449 | 9/1925 | Roach ........................... 359/861 |
| 1,680,855 | 8/1928 | Burns. |
| 1,988,946 | 1/1935 | Hauser et al. ................. 359/861 |
| 2,891,437 | 6/1959 | Tripp ............................. 350/440 |
| 3,792,916 | 2/1974 | Sarng ............................ 350/163 |
| 4,023,794 | 5/1977 | Adams. |
| 4,213,684 | 7/1980 | Chamberlain .................. 359/861 |
| 4,886,348 | 12/1989 | Schmertz ..................... 359/861 |
| 4,898,560 | 2/1990 | Moscovich ..................... 472/63 |
| 4,967,953 | 11/1990 | Sugawara. |

FOREIGN PATENT DOCUMENTS 0279813  6/1934  Italy ................................. 359/861

Primary Examiner—Edward K. Look
Assistant Examiner—Mark Sgantzos
Attorney, Agent, or Firm—Dunlap, & Codding

[57] ABSTRACT

An illusion assembly for retaining at least a portion of an item and creating the illusion that the retained portion of the item disappeared. The illusion assembly includes a container having a front transparent area and a rear transparent area. The container includes a retainer assembly defining a retaining space with at least a portion of the item being disposed in the retaining space. At least a portion of the retaining space is disposed between the front transparent area and the rear transparent area in the container. Illusion devices are disposed in the container between the front transparent area and the rear transparent area for creating the illusion of seeing through the front transparent area and through the container and through the rear transparent area without seeing the retainer assembly or the portion of the item stored in the disposed space of the retainer assembly.

226 Claims, 16 Drawing Sheets

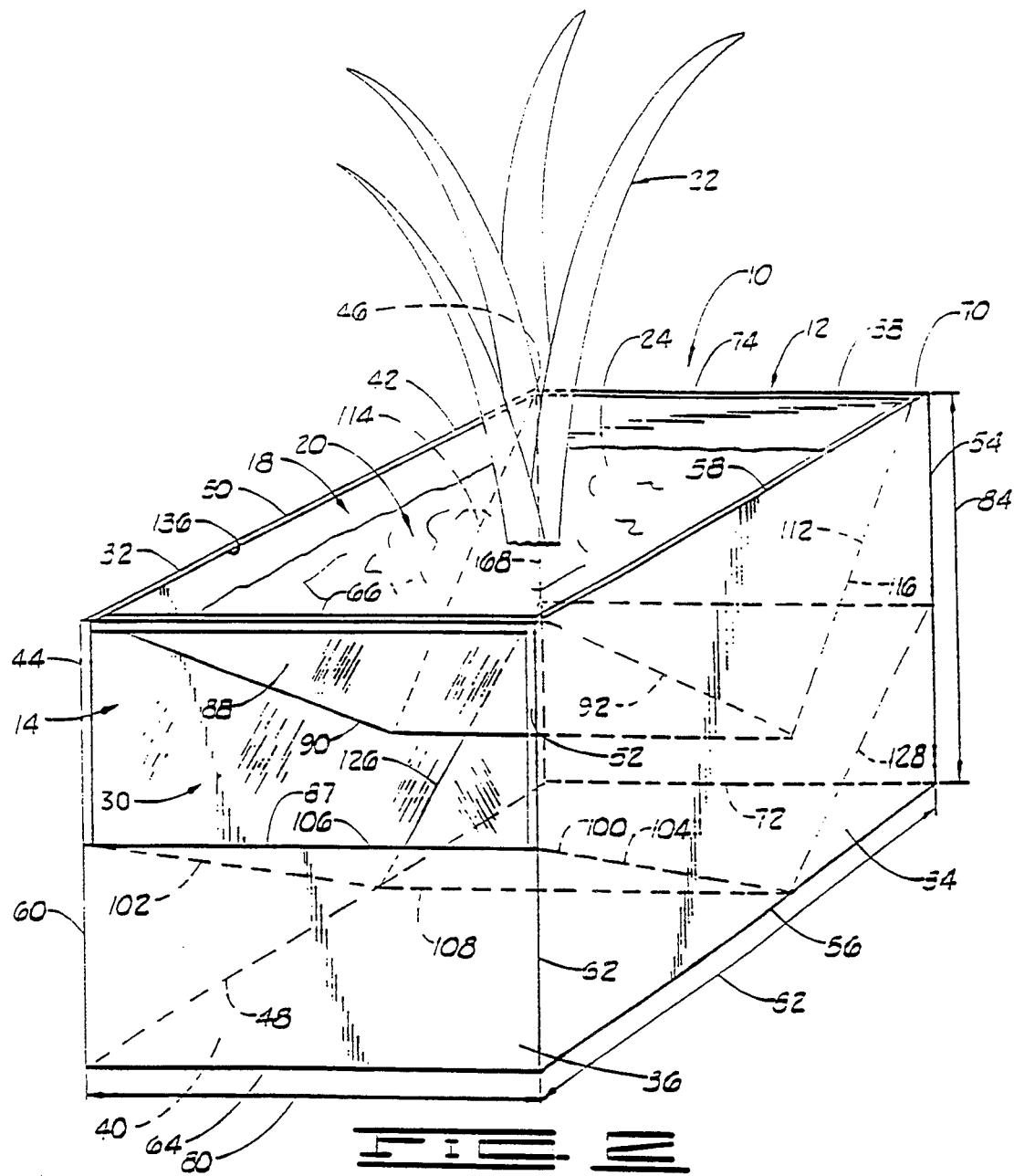

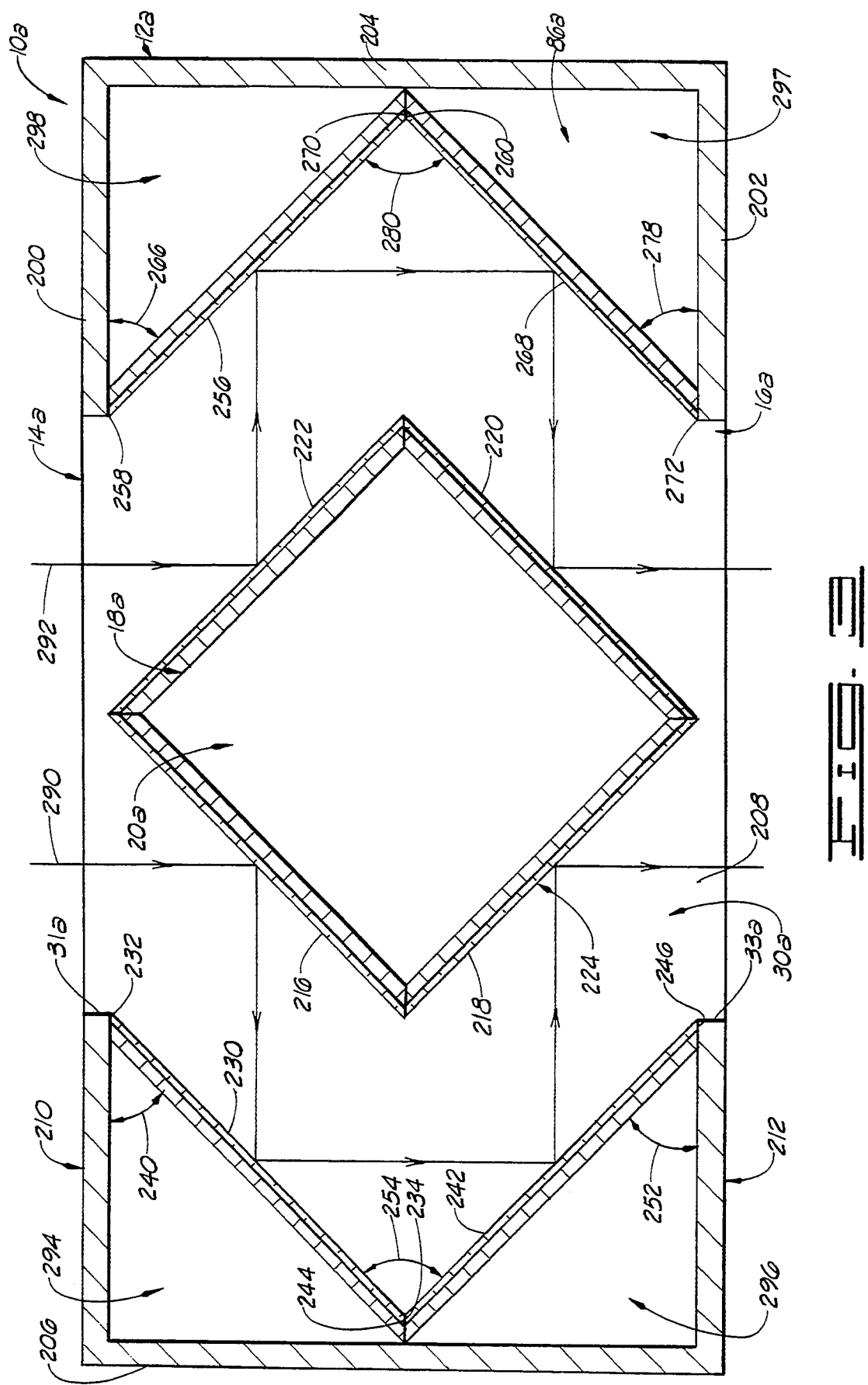

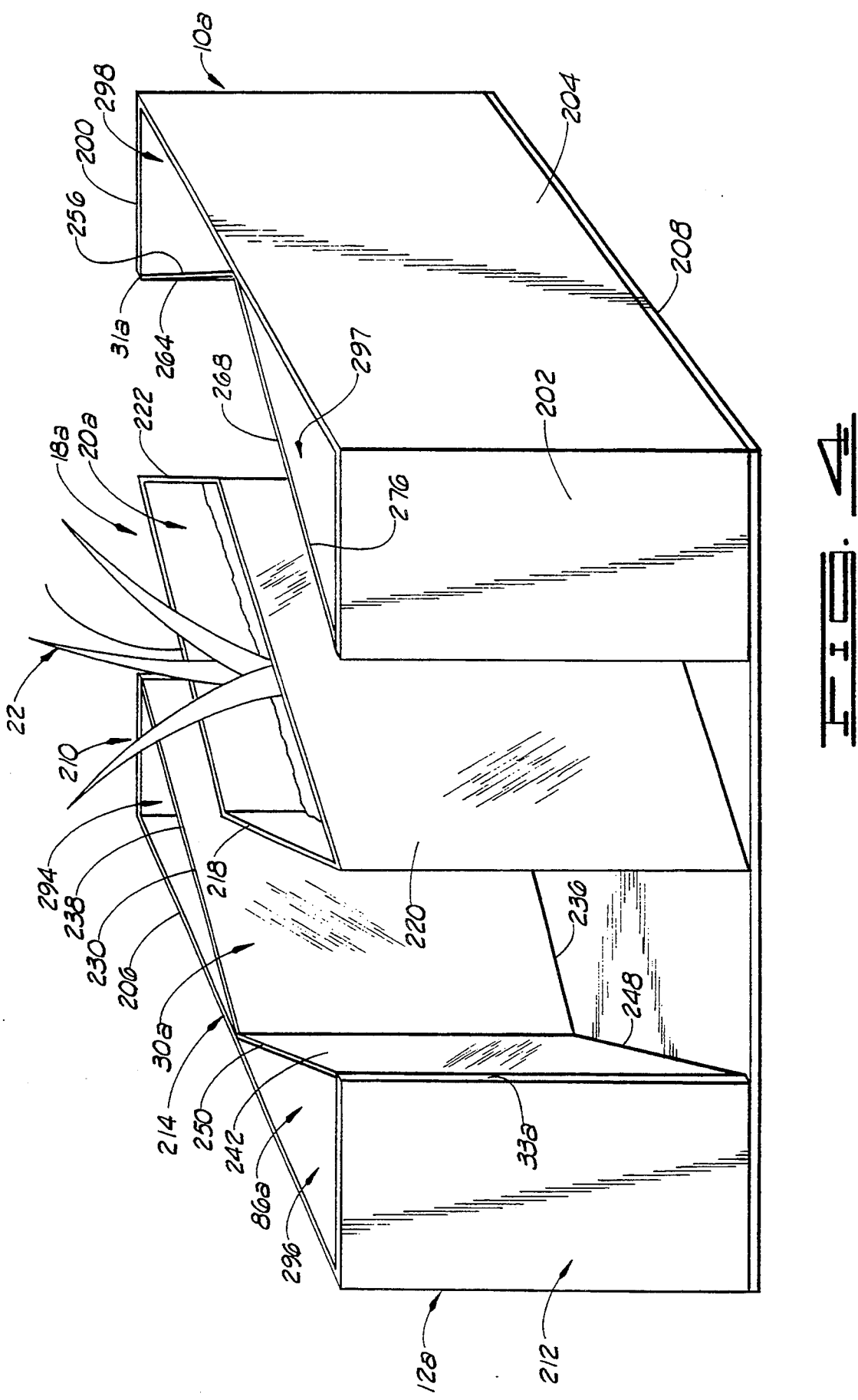

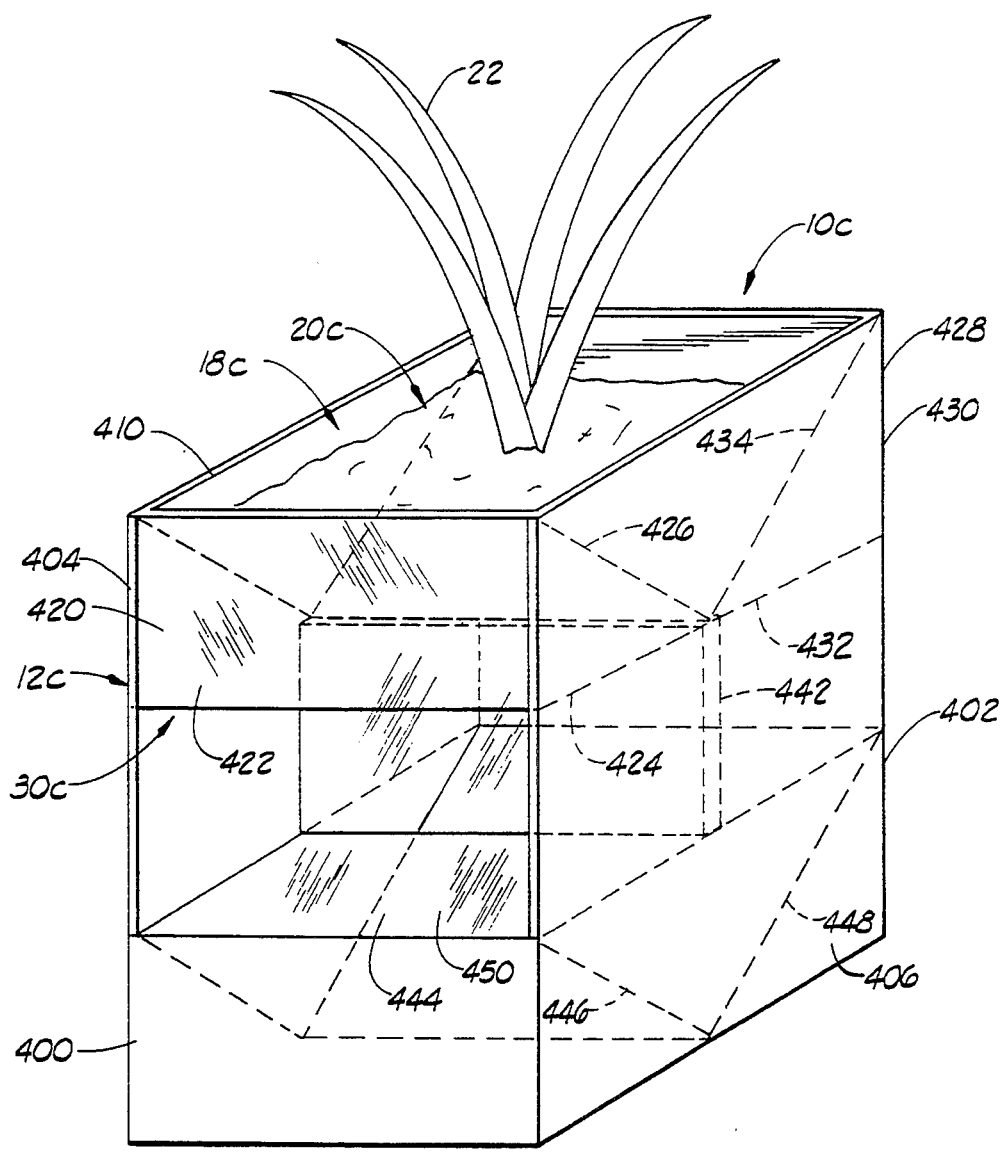
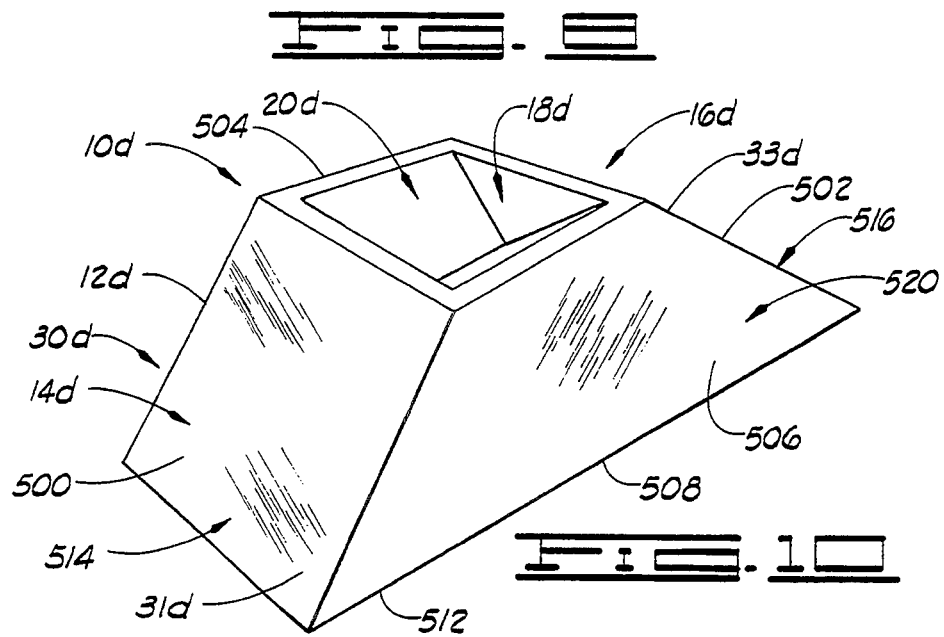

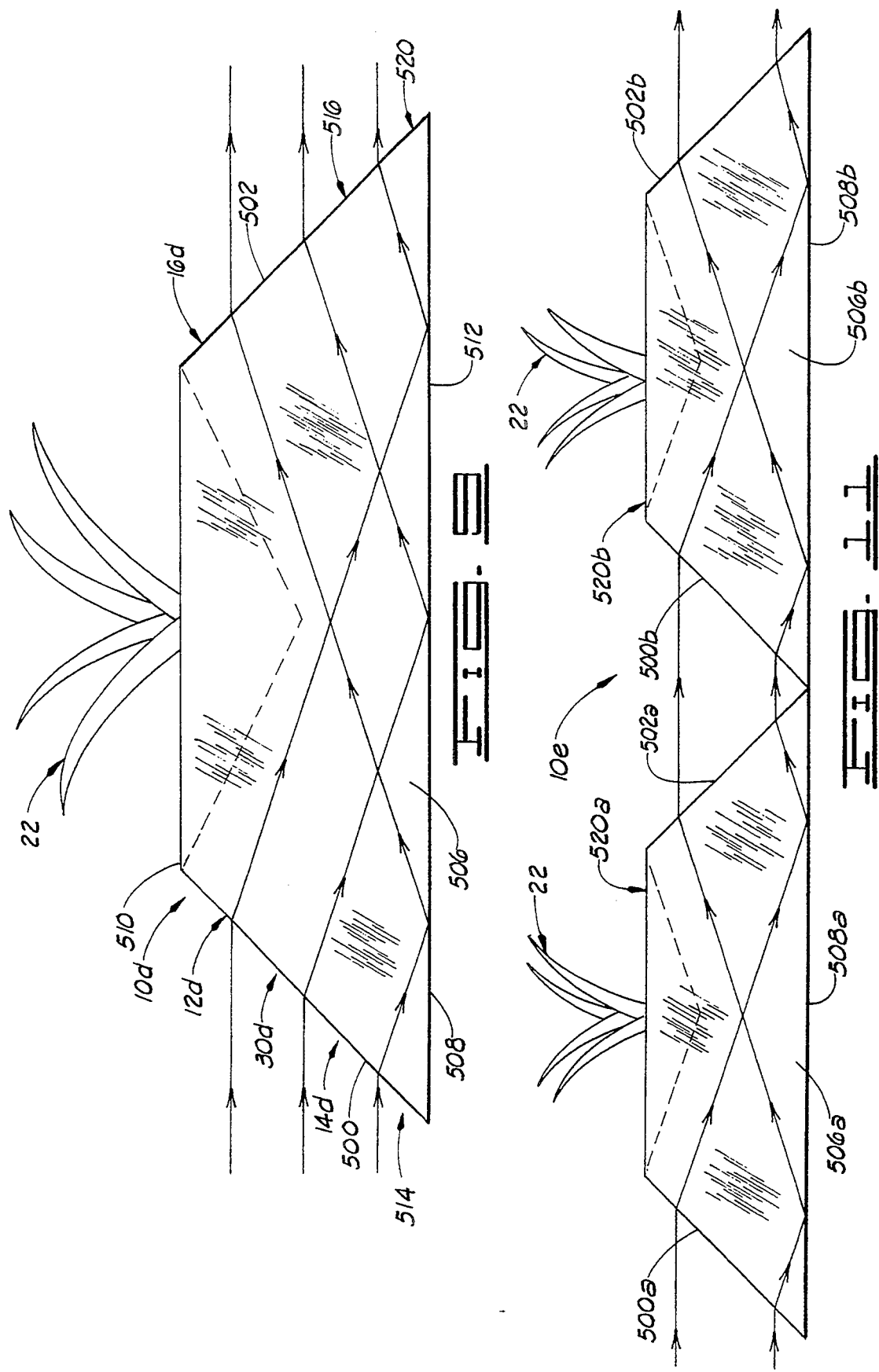

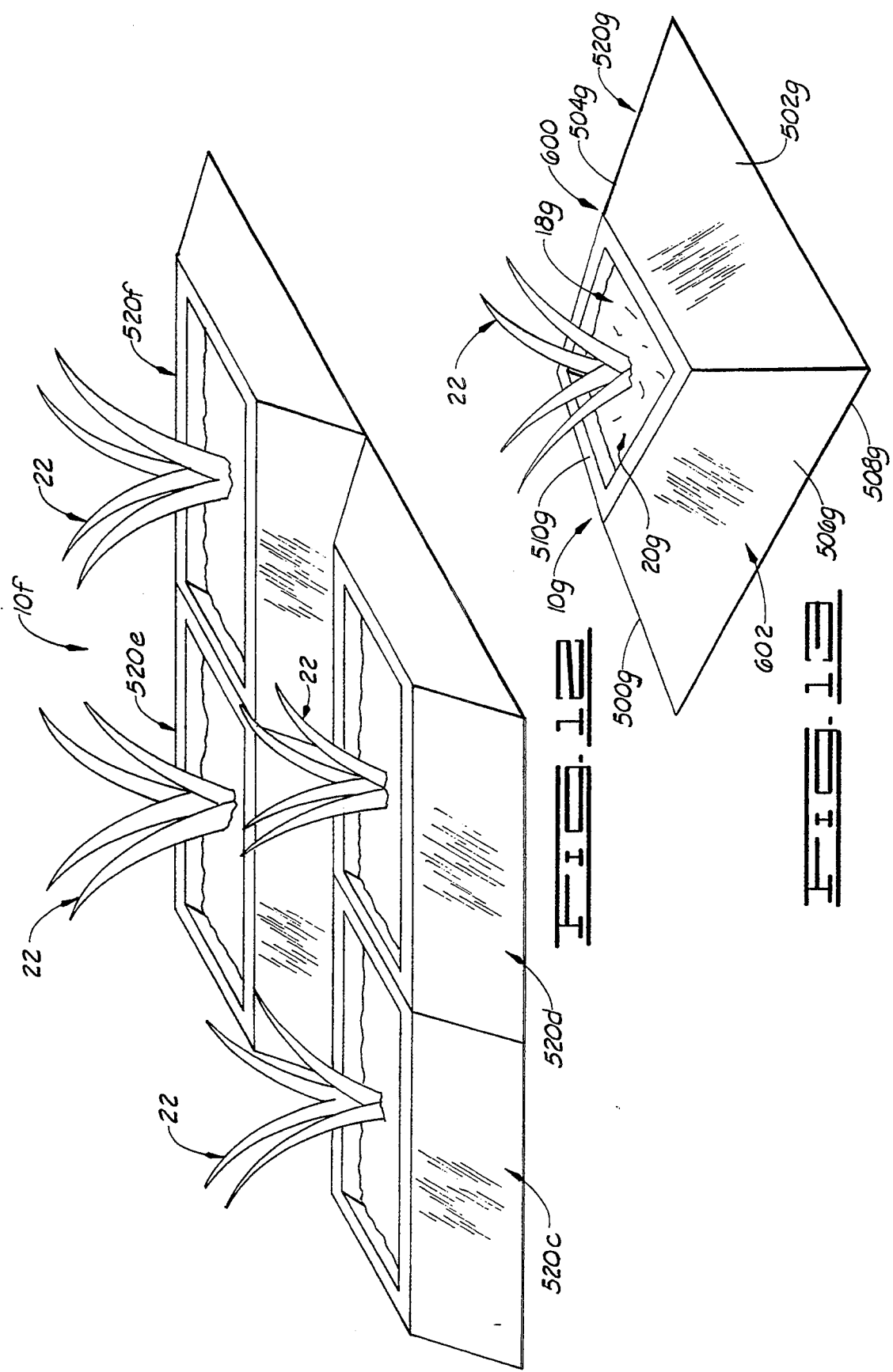

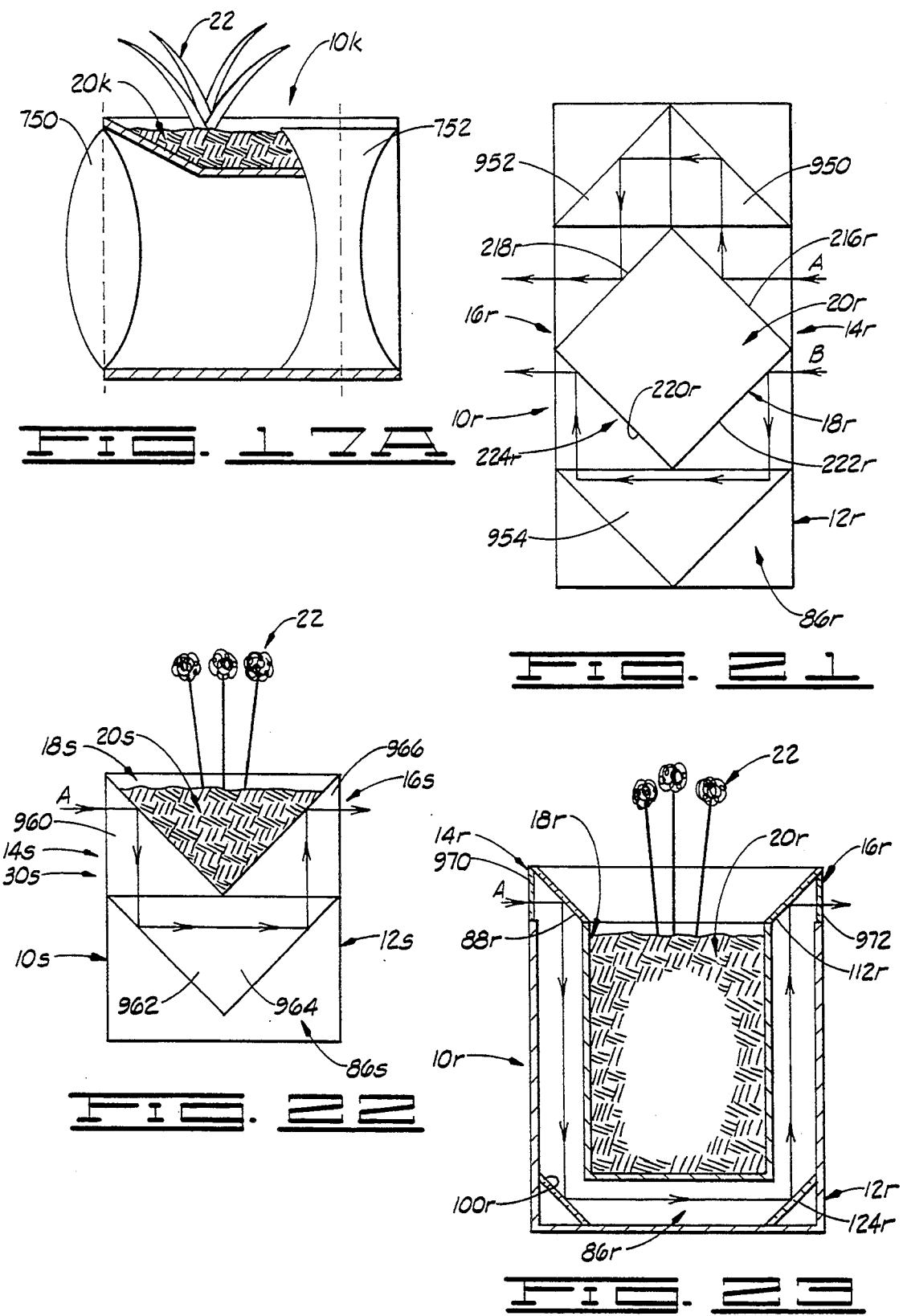

ILLUSION ASSEMBLY CREATING A SEE THROUGH EFFECT

FIELD OF THE INVENTION

The present invention relates to an illusion assembly for retaining at least a portion of an item and creating the illusion that the portion of the item disposed in the retainer assembly disappeared. More particularly, the illusion assembly includes a container having a front transparent area and a rear transparent area with a retainer assembly being disposed between the front transparent area and the rear transparent area of the container and defining a retaining space with at least a portion of the item being disposed in the retaining space, and illusion devices for creating the illusion of seeing through the front transparent area, through the container and through the rear transparent area without seeing the retainer assembly or the portion of the item disposed in the retainer assembly.

BRIEF DESCRIPTION OF THE DRAWINGS

FIG. 2 is a partial perspective, partial diagrammatic view of the illusion assembly of FIG. 1.

FIG. 3 is a sectional view of a modified illusion assembly.

FIG. 6 is a sectional view of yet another modified illusion assembly.

FIG. 8 is a partial diagrammatic perspective view of the modified illusion assembly of FIG. 7.

FIG. 9 is a side elevational view of another modified illusion assembly.

FIG. 10 is a partial perspective view of the modified illusion assembly of FIG. 9.

FIG. 11 is a side elevational view of still another modified illusion assembly showing two illusion assemblies constructed like the illusion assembly shown in FIG. 9 connected in series.

FIG. 12 is a partial perspective view of still another modified illusion assembly consisting of a plurality of illusion assemblies constructed like the illusion assembly shown in FIG. 9.

FIG. 13 is a partial perspective view of still another modified illusion assembly.

FIG. 17A is a schematic view of another modified illusion assembly.

FIG. 21 is a diagrammatic view of still another modified illusion assembly.

FIG. 22 is a diagrammatic, schematic view of still another modified illusion assembly.

FIG. 23 is a diagrammatic, schematic view of yet another modified illusion assembly.

DESCRIPTION OF THE PREFERRED EMBODIMENTS

Figure 1:
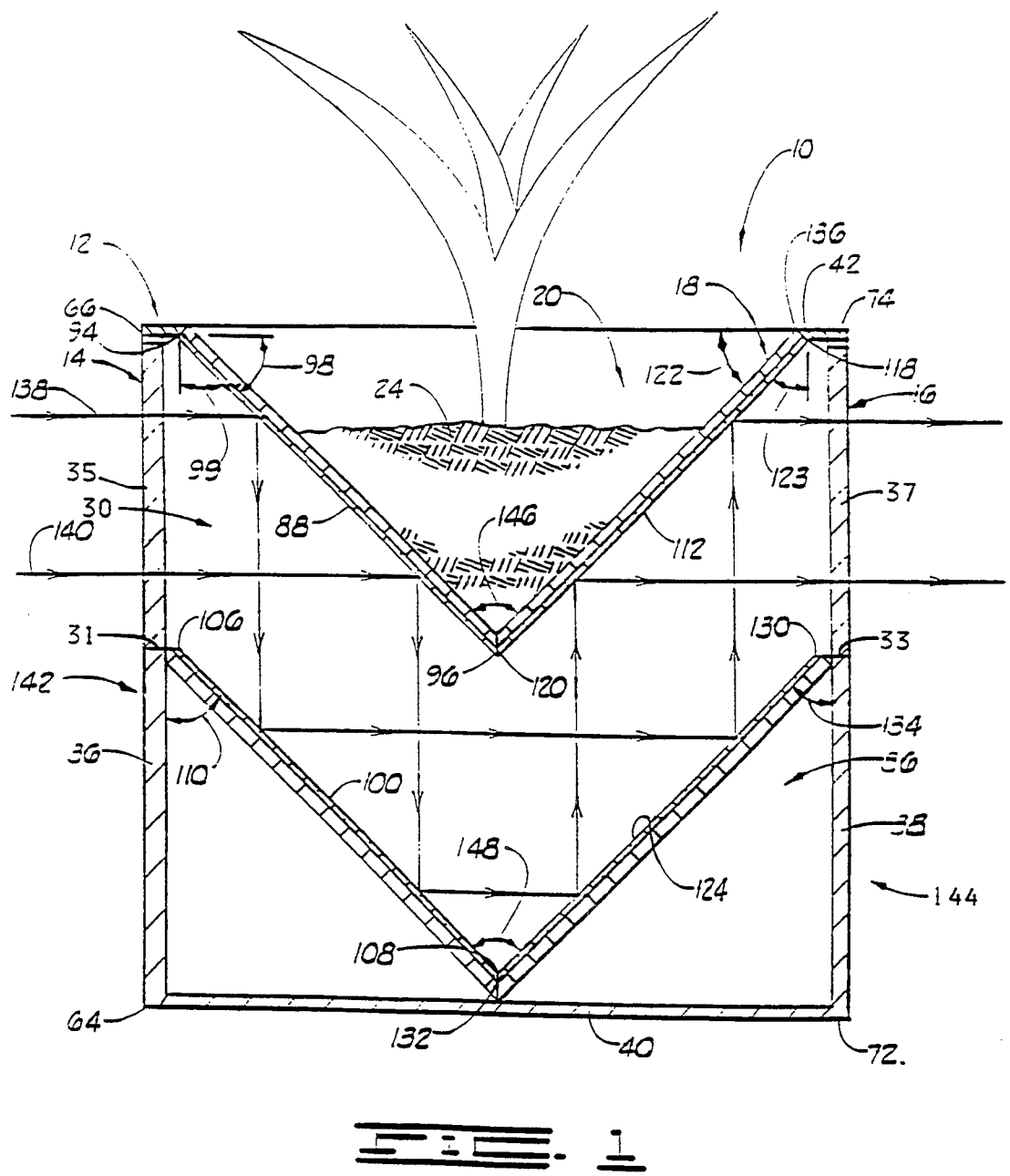
FIG. 1 is a sectional view of an illusion assembly constructed in accordance with the present invention.

Referring to FIGS. 1 and 2, shown therein and designated by the general reference numeral 10 is an illusion assembly for creating a see through effect constructed in accordance with the present invention. The illusion assembly 10 includes a container 12 having a first or front transparent area 14 and a second or rear transparent area 16. A retainer assembly 18 is supported by the container 12 and defines a retaining space 20.

The retaining space 20 is shaped to receive at least a portion of an item. More particularly, the present invention will be described herein with respect to disposing at least a portion of a floral grouping 22 item in the retaining space. It is to be understood that any item may be disposed in the retaining space such as coins or fish (and water) or an animal (with or without habitat) or any other item. The illusion assembly 10 also could comprise a terrarium or display case such as a floral cooler display case.

With respect to the floral grouping 22, earth 24 (growing medium) is disposed in the retaining space 20 and a portion of the floral grouping 22 is at least partially disposed in the earth 24. A portion of the floral grouping 22 extends a distance above the earth 24 and above the container 12 and above the retaining space 20.

"Floral grouping" as used herein means cut fresh flowers, artificial flowers, a single flower, a plant or tree or shrub or other fresh and/or artificial plants or other floral materials and may include other secondary plants and/or ornamentation which add to the aesthetics of the overall floral grouping.

The illusion assembly 10 includes illusion devices 30 supported in the container 12 for creating the illusion of seeing through the front transparent area 14, through the container 12 and through the rear transparent area 16 without seeing the retaining space 20 or the earth 24 and the portion of the floral grouping 22 disposed in the retaining space 20. In other words, from the point of view of an individual looking through the front transparent area 14, it would appear as though the individual was looking through the front transparent area 14 and through the rear transparent area 16 without any obstructions (the retainer assembly 18 and the portion of the floral grouping 22 disposed in the retaining space 20) appearing between the front transparent area 14 and the rear transparent area 16.

In one embodiment, the front transparent area comprises a front opening 31 (FIG. 1) formed through a portion of the container 12 and a rear opening 33 (FIG. 1) is formed through another portion of the container 12. A light transmissible material 35 is disposed in the front opening 31 and substantially encompasses the front opening 31. A light transmissible material 37 is disposed in the rear opening 33 and substantially encompasses the rear opening 33. The light transmissible materials 35 and 37 may comprise a glass material for example, although any light transmissible material is suitable for use with the present invention. The light transmissible materials 35 and 37 simply are materials which an individual can "see through". It should be noted that the illusion assembly 10 may not include light transmissible materials 35 and 37 and, in this embodiment, the front opening 31 and the rear opening 33 simply are open spaces formed in the container 12.

The container 12, as shown in FIGS. 1 and 2, is constructed of an opaque material and the floral grouping 22 also is opaque. In this embodiment, the portion of the retainer assembly 18 disposed between the front opening 31 and the rear opening 33 also is constructed of an opaque material. Thus, except for the illusion devices 30, an individual looking through either the front opening 31 or the rear opening 33 would see either the portion of the retainer assembly 18 disposed between the front opening 31 and the rear opening 33 and/or the portion of the floral grouping 22 disposed in the retaining space 20 assuming the retainer assembly 18 itself were not opaque.

In some embodiments described below, the retainer assembly 18 may be transparent, light transmissible. In these embodiments, light is directed through the container 12 in a manner by passing the retainer assembly 18 in a manner to be made more apparent below.

Further, in some embodiments described below, the container itself may be transparent rather than opaque.

The front opening 31 is aligned with the rear opening 33. The front opening 31 also is spaced a distance from the rear opening 33.

It should be noted that, although the earth 24 is shown disposed in the retaining space 20 below the top of the retaining space 20, the earth 24 in fact may fill the retaining space 20 all the way to the top of the retaining space 20.

The container 12 includes a first end wall 32 (FIG. 2), a second end wall 34 (FIG. 2), a front wall 36 (FIGS. 1 and 2), a rear wall 38 (FIGS. 1 and 2), a bottom wall 40 (FIGS. 1 and 2) and a top 42 (FIGS. 1 and 2).

As shown in FIG. 2, the first end wall 32 has a first end 44, a second end 46, a bottom 48 and a top 50. The second end wall 34 has a first end 52 a second end 54, a bottom 56 and a top 58. The front wall 36 has a first end 60, a second end 62, a bottom 64 and a top 66. The rear wall 38 has a first end 68, a second end 70, a bottom 72 and a top 74.

The first end 44 of the first end wall 32 is connected to the first end 60 of the front wall 36. The second end 62 of the front wall 36 is connected to the first end 52 of the second side wall 34. The second end 46 of the first end wall 32 is connected to the first end 68 of the rear wall 38 and the second end 54 of the second end wall 34 is connected to the second end 70 of the rear wall 38. The bottoms 48, 56, 64 and 72 of the walls 32, 34, 36 and 38 respectively, each are connected to the bottom wall 40. The walls 32, 34, 36 and 38 each extend about perpendicularly upwardly from the bottom wall 40. The tops 50, 58, 66 and 74 of the walls 32, 34, 36 and 38, form the top 42 of the container 12.

As shown in FIG. 2, the container has a width 80 equal to either the distance between the first and the second ends 60 and 62 of the front wall 36 or the distance between the first and the second ends 68 and 70 of the rear wall 38. The container 12 has a length 82 equal to either the distance between the first and the second ends 44 and 46 of the first end wall 32 or the distance between the first and the second ends 52 and 54 of the second end wall 34. The container 12 has a height 84 extending between the bottom wall 40 and the top 42. The walls 32, 34, 36, 38 and 40 are connected together and at least partially encompass a container space 86 (FIG. 1).

The front opening 31 is rectangularly shaped. The front opening 31 has a first end adjacent the first end wall 32, a second end adjacent the second end wall 34, a first side disposed near the top 66 of the front wall 36 and a second side 87 (FIG. 2) disposed about midway between the top 66 and the bottom 64 of the front wall 36. The sides of the front opening 31 extend between the first and the second end walls 32 and 34.

The rear opening 33 is generally rectangularly shaped. The rear opening 33 has a first end disposed near the first end wall 32, a second end disposed near the second end wall 34, a first side disposed near the top 74 of the rear wall 38 and a second side disposed about midway between the bottom 72 and the top 74 of the rear wall 38. The sides of the rear opening 33 extend generally between the first and the second end walls 32 and 34.

A first mirror 88 is disposed in the container space 86. The first mirror has a first end 90 (FIG. 2), a second end 92 (FIG. 2), a first side 94 (FIG. 1) and a second side 96 (FIG. 1). The first end 90 of the first mirror 88 is connected to the first end wall 32. The second end 92 of the first mirror 88 is connected to the second end wall 34. The first side 94 of the first mirror 88 is disposed adjacent the top 42 and the first side 94 extends between the first and the second end walls 32 and 34. The first side 94 of the first mirror 88 is disposed in a plane about coplaner with the front wall 36. The first mirror 88 extends through the container space 86 generally toward the rear wall 38 and is disposed at an angle 98 with respect to the top 42. The angle 98 is about forty five degrees. The first mirror 88 is disposed at an angle 99 with respect to the front wall 36 or with respect to the front opening 31. The angle 99 is about forty five degrees.

A second mirror 100 is disposed in the container space 86. The second mirror 100 has a first end 102 (FIG. 2), a second end 104 (FIG. 2), a first side 106 (FIGS. 1 and 2) and a second side 108 (FIGS. 1 and 2). The first side 106 of the second mirror 100 is disposed adjacent the front wall 36 and the second mirror 100 extends between the first and the second end walls 32 and 34. The first end 102 of the second mirror 100 is connected to the first end wall 32 in the second end 104 the second mirror 100 is connected to the second end wall 34. The second mirror 100 extends into the container space 86 at an angle 110 with respect to the front wall 36 or the front opening 31 and the angle 110 is about forty five degrees.

A third mirror 112 is disposed in a container space 86. The third mirror 112 has a first end 114 (FIG. 2), a second end 116 (FIG. 2), a first side 118 (FIG. 1) and a second side 120 (FIG. 1). The first side 118 is disposed adjacent the top 44 and the first side 118 extends between the first end wall 32 and the second end wall 34 and is disposed in a plane about coplaner with the rear wall 38. The first end 114 of the third mirror 112 is connected to the first end wall 32 and the second end 116 of the third mirror 112 is connected to the second end wall 34. The third mirror 112 extends into the container space 86 at an angle 122 with respect to the top 42 of the container 12 and the angle 122 (FIG. 1) is equal to about forty five degrees. The third mirror 112 extends at an angle 123 (FIG. 1) with respect to the rear wall 38 or the rear opening 33 and the angle 123 is about forty five degrees.

A fourth mirror 124 is disposed in the container space 86. The fourth mirror 124 has a first end 126 (FIG. 2), a second end 128 (FIG. 2), a first side 130 (FIG. 1) and a second side 132 (FIG. 1). The first side 130 of the fourth mirror 124 is disposed adjacent the top 74 of the rear wall 38 and the first side 130 of the fourth mirror 124 extends between the first and the second end walls 32 and 34. The fourth mirror 124 extends at an angle 134 (FIG. 1) with respect to the rear wall 38 or the rear opening 33 and the angle 134 is equal to about forty five degrees.

The first side 118 of the third mirror 112 extends along the first side of the rear opening 33. The first side 130 of the fourth mirror 124 extends along the second side of the rear opening 33. The first side 94 of the first mirror 88 extends along the first side of the front opening 31. The first side 106 of the second mirror 100 extends along the second side of the front opening 31.

The second side 96 of the first mirror 88 is disposed adjacent the second side 120 of the third mirror 112. The second side 108 of the second mirror 100 is disposed adjacent the second side 132 of the fourth mirror 124.

The second side 96 of the first mirror 88 is disposed adjacent the second side 120 of the third mirror 112 and the first mirror 88 extends at an angle 146 with respect to the third mirror 112. The angle 146 is about ninety degrees.

The second side 108 of the second mirror 100 is disposed adjacent the second side 132 of the fourth mirror 124. The second mirror 100 extends at an angle 148 with respect to the fourth mirror 124. The angle 148 is about ninety degrees.

The first side 94 of the first mirror 88, the first side 106 of the second mirror 100 and portions of the first ends 44 and 52 of the first and the second end walls 32 and 34 cooperate to define the front opening 31. The first side 118 to the third mirror 112, the first side 130 of the fourth mirror 124 and portions of the second ends 46 and 54 of the first and the second end walls 32 and 34 cooperate to form the rear opening 33. The mirrors 88, 100, 112 and 124 cooperate to provide the illusion devices 30. The first mirror 88, the third mirror 112 and portions of the first and the second end walls 32 and 34 near the tops 50 and 58 thereof cooperate to define the retaining space 20. The first side 94 of the first mirror 88, the first side 118 of the third mirror 112 and the tops 50 and 58 of the first and the second end walls 32 and 34 cooperate to form a retaining space opening 136 providing access to the retaining space 20.

The mirrors 88, 100, 112 and 124 cooperate to reflect light as diagrammatically illustrated by the light paths 138 and 140 so that an individual looking through the front opening 31 appears to see through the rear opening 33 without seeing the retaining assembly 18. In this embodiment, the see through space defined by the front and the rear openings 31 and 33 encompasses about one half of the entire area of a front 142 (FIG. 1) of the container 12 and about one half of an entire area of a rear 144 (FIG. 1) of the container 12 with the front 142 being defined by the front opening 31 and the front wall 36 and the rear 144 being defined by the rear opening 33 and the rear wall 38.

The mirrors 88, 100, 112 and 124 are positioned in the container space 86 and positioned with respect to the front opening 31 and the rear opening 33 so that light rays entering the front opening 31 are reflected from the first mirror 88 onto the second mirror 100, the light rays being reflected from the second mirror 100 onto the fourth mirror 124 and the light rays are reflected from the fourth mirror 124 onto the third mirror 112. The light rays are reflected from the third mirror 112 out through the rear opening 33. The reflection of the light rays as just described are illustrated in FIG. 1 by the two light rays 138 and 140 schematically shown in FIG. 1.

It should be noted that, although the terms "mirrors" or "mirror" are used herein, such terms are used merely to mean light reflective surfaces. For example, the mirrors 88, 100, 112 and 124 may comprise glass mirrors or any other reflective surface. These terms are not intended to limit the construction of the illusion devices 30 in any way other than to denote light reflective surfaces.

Figure 4:
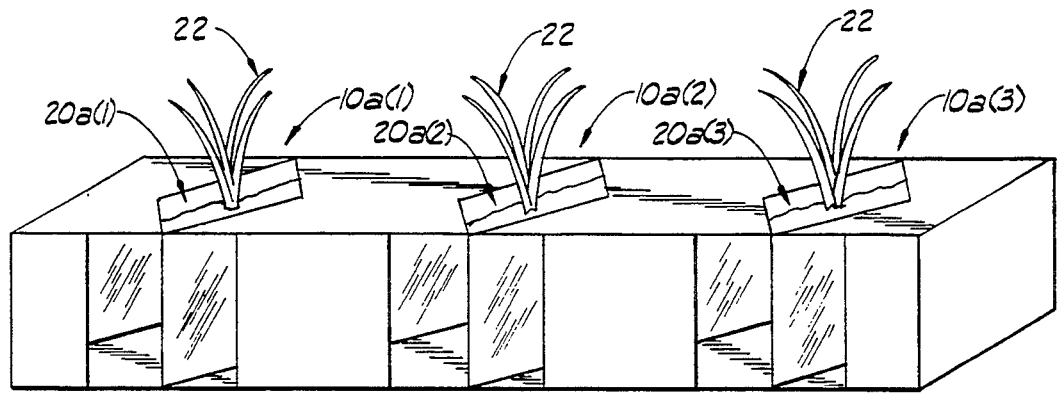
FIG. 4 is a partial perspective view of the modified illusion assembly of FIG. 3.

Embodiment of FIGS. 3 and 4

Shown in FIGS. 3 and 4 is a modified illusion assembly 10a having a modified container 12a with a front transparent area 14a defined via a front opening 31a and a rear transparent area 16a defined via a rear opening 33a and a modified retainer assembly 18a having a modified retaining space 20a. Illusion devices 30a are supported within the container 12a.

The container 12a includes a front wall 200, a rear wall 202, a first end wall 204 and a second end wall 206. The container 12a also includes a bottom wall 208.

The walls 200, 202, 204 and 206 each have first and second ends, tops and bottoms and the walls 200, 202, 204 and 206 are interconnected and connected to the bottom wall 208 in a manner exactly like that described before with respect to the container 12 such that the walls 200, 202, 204, 206 and 208 cooperate to at least partially encompass the container space 86a.

The walls 200, 202, 204 and 206 are interconnected and cooperate to form a generally rectangularly shaped container 12a. The container 12a has a front 210 formed by the front wall 200 and a rear 212 formed by the rear wall 202.

The front opening 31a is formed through the front wall 200 and is positioned about midway between the first and the second ends of the front wall 200. The front opening 31a extends from the bottom wall 208 to a top 214 (FIG. 4) of the container 12a.

The rear opening 33a is formed through the rear wall 202 and is positioned about midway between the first and the second ends of the rear wall 202. The rear opening 33a extends from the bottom wall 208 to the top 214 of the container 12a.

A first mirror 216, a second mirror 218, a third mirror 220 and a fourth mirror 222 each are disposed in the container space 86a. The first mirror 216, the second mirror 218, the third mirror 220 and the fourth mirror 222 are interconnected to form a generally square shaped mirror assembly 224 which is disposed in the container space 86a and positioned in about the middle of the front opening 31a and in about the middle of the rear opening 33a. The first mirror 216 extends at an angle of about ninety degrees with respect to the second mirror 218. The second mirror 218 extends at an angle of about ninety degrees with respect to the third mirror 220. The third mirror 220 extends at an angle of about ninety degrees with respect to the fourth mirror 222 and the fourth mirror 222 extends at an angle of about ninety degrees with respect to the first mirror 216. The first mirror 216, the second mirror 218, the third mirror 220 and the fourth mirror 222 each extend from the bottom wall 208 perpendicularly upwardly to the top 214 of the container 12a. The first mirror 216, the second mirror 218, the third mirror 220 and the fourth mirror 222 cooperate to encompass the retaining space 20a with the first mirror 216, the second mirror 218, the third mirror 220 and the fourth mirror 222 also comprising a portion of the retainer assembly 18a. The floral grouping 22 is disposed in the retaining space 20a, as shown in FIG. 4. The mirror assembly 224 is disposed between the front transparent area 14a and the rear transparent area 16a.

A fifth mirror 230 is disposed in the container space 86a. The fifth mirror 230 has a first end 232 (FIG. 3), a second end 234 (FIG. 3), a first side 236 (FIG. 4) and a second side 238 (FIG. 4). The first side 236 is disposed adjacent the bottom wall 208 and the fifth mirror 230 extends a distance about perpendicularly upwardly from the bottom wall 208 terminating with the second side 238 which is disposed in a plane about coplaner with the top 214 of the container 12a. The first end 232 of the fifth mirror 230 is disposed adjacent one end of the front opening 31a and the fifth mirror 230 extends at an angle 240 (FIG. 3) a distance from the front wall 200 toward the rear wall 202. The angle 240 is about forty five degrees.

A sixth mirror 242 is disposed in the container space 86a. The sixth mirror 242 includes a first end 244 (FIG. 1), a second end 246 (FIG. 1), a first side 248 (FIG. 2) and a second side 250. The first side 248 of the sixth mirror 242 is disposed adjacent the bottom wall 208 and the sixth mirror 242 extends a distance about perpendicularly upwardly from the bottom wall 208 terminating with the second side 250 which is disposed on a plane or about coplaner with the top 214 of the container 12a.

The first end 244 of the sixth mirror 242 is disposed adjacent the second end 234 of the fifth mirror 230. The second end 246 of the sixth mirror 242 is disposed adjacent one end of the rear opening 33a and the sixth mirror 242 extends at an angle 252 (FIG. 3) with respect to the rear wall 202 a distance from the rear wall 202 toward the front wall 200. The first end 244 of the sixth mirror 242 is disposed adjacent the second end 234 of the fifth mirror 230. The sixth mirror 242 extends at an angle 254 (FIG. 3) with respect to the fifth mirror 230. The angle 252 is about forty five degrees and the angle 254 is about ninety degrees.

A seventh mirror 256 is disposed in the container space 86a. The seventh mirror 256 has a first end 258 (FIG. 1), a second end 260 (FIG. 1), a first side (not shown) and opposite a second side 264 (FIG. 4). The first side (not shown) of the seventh mirror 256 is disposed adjacent the bottom wall 208 and the seventh mirror 256 extends a distance about perpendicularly upwardly from the bottom wall 208 terminating with the second side 264 which is disposed in a plane about coplaner with the top 214 of the container 12a. The first end 258 of the seventh mirror 256 is disposed adjacent one end of the front opening 31a and the seventh mirror 256 extends at an angle 266 (FIG. 3) from the front wall 200 toward the rear wall 202. The angle 266 is about forty five degrees.

An eighth mirror 268 is disposed in the container space 86a. The eighth mirror 268 has a first end 270 (FIG. 3), a second end 272 (FIG. 3), a first side (not shown), and a second side 276 (FIG. 4). The first side (not shown) of the eighth mirror 268 is disposed adjacent the bottom wall 208 and the eighth mirror 268 extends about perpendicularly upwardly from the bottom wall 208 terminating with the second side 276 which is disposed in a plane about coplaner with the top 214 of the container 12a. The first end 270 of the eighth mirror 268 is disposed adjacent the second end 260 of the seventh mirror 256. The eighth mirror 268 extends at an angle 278 (FIG. 3) from the rear wall 202 a distance toward the front wall 200 and the angle 278 is about forty five degrees. The second end 272 of the eighth mirror 268 is disposed adjacent one end of the rear opening 33a. The eighth mirror 268 extends at an angle 280 (FIG. 3) from the seventh mirror 256 and the angle 280 is about ninety degrees.

The fifth mirror 230 extends in a plane about parallel with the first mirror 216. The sixth mirror 242 extends in a plane about parallel with the second mirror 218 and the sixth mirror 242 is spaced a distance from the second mirror 218. The seventh mirror 256 is spaced a distance from the fourth mirror 222 and the seventh mirror 256 extends in a plane about parallel with the fourth mirror 222. The eighth mirror 268 is spaced a distance from the third mirror 220 and the eighth mirror 268 extends in a plane about parallel with the third mirror 220.

Light rays are diagrammatically illustrated in FIG. 3 with the light rays or light paths 290 and 292. The mirrors 216, 218, 220, 222, 230, 242, 256 and 268 are arranged in the component space 86a such that some of the light illustrated by the light ray or light path 290 enters the front opening 31a and is reflected from the first mirror 216 onto the fifth mirror 230 and from the fifth mirror 230 onto the sixth mirror 242 and from the sixth mirror 242 onto the second mirror 218 and from the second mirror 218 out the rear opening 33a. Some of the light indicated by the light ray or light path 292 enters the front opening 31a and is reflected from the fourth mirror 222 onto the seventh mirror 256 and reflected from the seventh mirror 256 onto the eighth mirror 268 and reflected from the eighth mirror 268 onto the third mirror 220 and from the third mirror 220 out the rear opening 33a.

The mirrors 216, 218, 220 and 222 cooperate to also provide the retainer assembly 18a with the retaining space 20a being at least partially encompassed by the mirrors 216, 218, 220 and 222. The floral grouping 22 is disposed in the retaining space 20a.

Thus, from the point of view of an individual looking through the front opening 31a, the illusion is created that the individual is looking through the front opening 31a and directly through the rear opening 33a without seeing any obstruction such as the retainer assembly 18a disposed between the front opening 31a and the rear opening 33a or the portion of the floral grouping 22 disposed in the retaining space 20a. The illusion thus is created that the earth and the end of the floral grouping 22 disposed in the retaining space 20a have disappeared.

The fifth mirror 230 cooperates with a portion of the front wall 200 and a portion of the second end wall 206 to encompass an auxiliary retaining space 294. The sixth mirror 242 cooperates with a portion of the rear wall 202 and a portion of the second end wall 206 to at least partially encompass another auxiliary retaining space 296. The seventh mirror 256 cooperates with a portion of the front wall 200 and a portion of the first end wall 204 to encompass another auxiliary retaining space 298. The eighth mirror 268 cooperates with a portion of the rear wall 202 and a portion of the first end wall 204 to at least partially encompass another auxiliary retaining space 297. Floral groupings may be disposed in the auxiliary retaining spaces 294, 296, 298 and 297 in one embodiment. In the alternative, the top of the retaining spaces 294, 296, 298 and 297 may be closed via a wall extending over these retaining spaces 294, 296, 298 and 297 if desired in a particular application.

In the illusion assembly 10a, the mirrors 216, 218, 220 and 222 are arranged in pairs of two back to back such that all four reflective surfaces on the mirrors 216, 218, 220 and 222 face outwardly through either the front opening 31a or the rear opening 33a. More particularly, the reflective surfaces on the mirrors 216 and 222 face outwardly through the front opening 31a and the reflective surfaces on the mirrors 218 and 220 face outwardly through the rear openings 33a. The reflective surfaces of the mirrors 216 and 222 are oriented at forty five degrees with respect to incoming paraxial rays. The reflective surfaces on the mirrors 218 and 220 are oriented at forty five degrees with respect to the outgoing paraxial rays. Further, the reflective surfaces on the mirrors 216 and 222 are parallel to the reflective surfaces of the mirrors 230 and 242, respectively, and the reflective surfaces on the mirrors 220 and 222 are parallel to the reflective surfaces on the mirrors 256 and 268, respectively.

The path of the paraxial light rays is diagrammatically shown in FIG. 3 by the light paths 290 and 292. Light emanating from an object on a front of the container 12a in front of the front wall 200 is split into two paths as the mirror combination of the mirrors 216 and 222 is encountered. The light rays will transmit through each respective four mirror combination and will be recombined at the rear side of the container 12a on the side of the rear wall 202. The alignment of all of the mirrors 216, 218, 220, 222, 230, 242, 256 and 268 is critical, particularly at the joint between the mirrors 218 and 220. Otherwise, an image will appear as two distinct images rather than one "spliced" image.

In this design of the container 12a, the "see through" portion of the container 12a defined via the transparent areas 14a and 16a extends from the bottom wall 208 to the top 214 and is disposed between the first end wall 204 and the second end wall 206. The front wall 200 and the rear wall 202 must be opaque to hide the arrangement of the mirrors 230, 242, 256 and 268.

The illusion devices 30a comprise the mirrors 216, 218, 220, 222, 230, 242, 256 and 268. The container 12a or at least certain walls may comprise transparent windows if desired.

Figure 5:
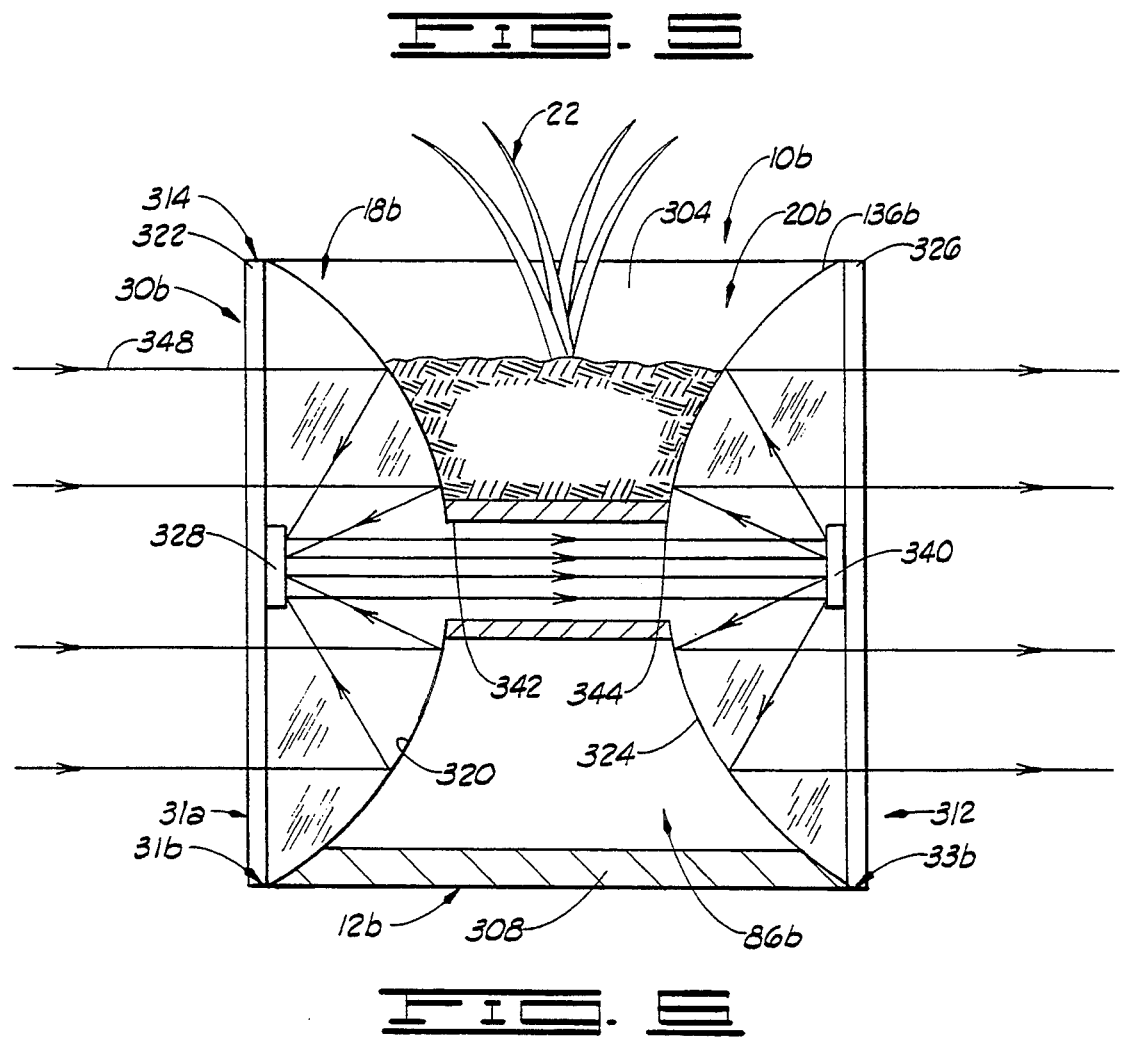
FIG. 5 is a perspective showing a plurality of the illusion assemblies of FIGS. 3 and 4 connected in tandem.

Embodiment of FIG. 5

Shown in FIG. 5 are three illusion assemblies 10a(1), 10a(2) and 10a(3). Each of the illusion assemblies 10a(1), 10a(2) and 10a(3) is constructed exactly like the illusion assembly 10a shown in FIGS. 3 and 4, except the illusion assemblies 10a(1), 10a(2) and 10a(3) are connected in tandem.

This embodiment shown in FIG. 5 creates a container having three retaining spaces 20a(1), 20a(2) and 20a(3) for retaining floral groupings 22 and three "see through" portions with each "see through" portion being constructed exactly like the "see through" portion of the container 12a shown in FIGS. 3 and 4 and defined by the front transparent area 14a, the rear transparent area 16a and the illusion devices 30a.

Figure 6A:
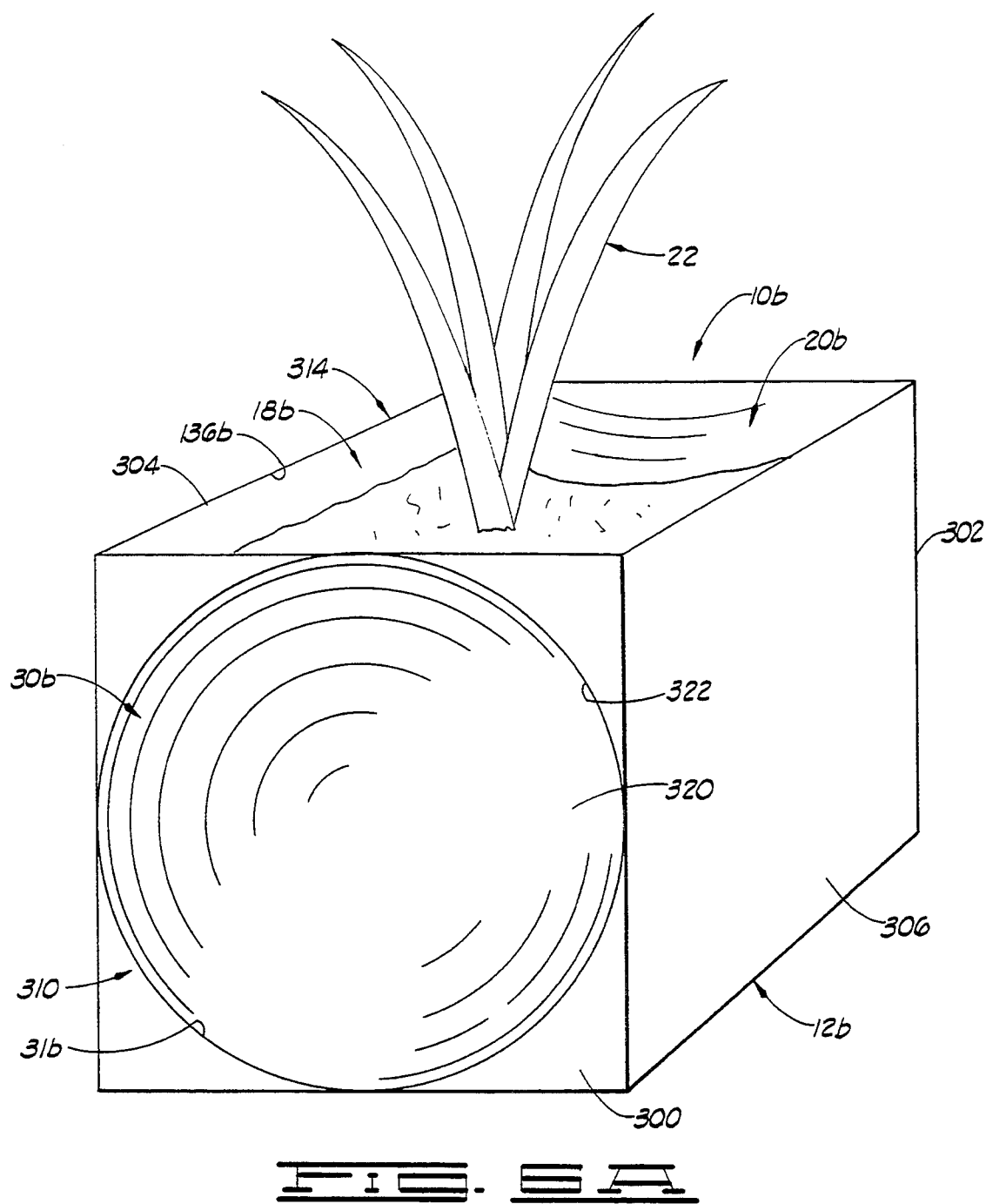
FIG. 6A is partial perspective view of the illusion assembly shown in FIG. 6.

Embodiment of FIGS. 6 and 6A

Shown in FIGS. 6 and 6A is another modified illusion assembly 10b having a modified container 12b. The illusion assembly 10b also includes a modified retainer assembly 18b having a retaining space 20b and modified illusion devices 30b.

The container 12b includes a front wall 300, a rear wall 302, a first end wall 304 and a second end wall 306. The container 12b also includes a bottom wall 308 (FIG. 6).

The walls 300, 302, 304 and 306 each are connected to the bottom wall 308 in a manner like that described before with respect to the containers 12 and 12a. The walls 300, 302, 304 and 306 each extend about perpendicularly upwardly from the bottom wall 308 forming the square or rectangularly shaped container 12b. The walls 300, 302, 304, 306 and 308 cooperate to at least partially encompass the container space 86b. The walls 300, 302, 304, 306 and 308 cooperate to form a front 310 of the container 12b defined via the front wall 300 and a rear 312 of the container 12b defined via the rear wall 302. The walls 300, 302, 304 and 306 extend upwardly from the bottom wall 308 terminating with a top 314 of the container 12b.

The front opening 31b is circularly shaped and encompasses substantially the entire area of the front 310 or of the front wall 300. The rear opening 33b (FIG. 6) also is circularly shaped and encompasses substantially the entire area of the rear 312 or the rear wall 302.

The walls 300, 302, 304, 306 and 308 cooperate to at least partially encompass the container space 86b. The walls 300, 302, 304 and 306 cooperate so that the tops of the respective walls 300, 302, 304 and 306 form the retaining space opening 136b.

A portion of the floral grouping 22 is disposed in the retaining space 20b. At least a portion of the retainer assembly 18b is disposed between the front transparent area 14b and the rear transparent area 16b of the container 12b.

The illusion assembly 10b also includes illusion devices 30b for creating the illusion of seeing through the front opening 31b and through the rear opening 33b without seeing the retainer assembly 18b or the portion of the floral grouping 22 disposed in the retaining space 20b in a manner like that described before with respect to the illusion assemblies 10 and 10a.

A front concave mirror 320 is disposed in the container space 86b. The front concave mirror 320 has a circularly shaped front face 322. The front face 322 of the front concave mirror 320 is disposed adjacent the front wall 300. The front face 322 of the front concave mirror 320 encompasses the front opening 31b. The front concave mirror 320 extends concavely inward from the front wall 300 toward the rear wall 302.

As shown in FIG. 6, a rear concave mirror 324 is disposed in the container space 86b. The rear concave mirror 324 has a circularly shaped front face 326. The front face 326 of the rear concave mirror 324 is disposed adjacent the rear wall 302. The front face 326 of the front concave mirror 324 encompasses the rear opening 33b. The rear concave mirror 324 extends concavely inward from the rear wall 302 toward the front wall 300.

A front convex mirror 328 (FIG. 6) is supported in a plane coplaner with the front wall 300 or front opening 31a and at about a central portion of the front concave mirror 320. The front concave mirror 320 has a focal point and the front convex mirror 328 is disposed about at the focal point of the front concave mirror 320.

A rear convex mirror 340 (FIG. 6) is supported in a plane about coplaner with the rear wall 302 or the rear opening 33b and positioned at about the center of the rear concave mirror 324. The rear concave mirror 324 has a focal point and the rear convex mirror 340 is disposed about at the focal point of the rear concave mirror 324.

An opening 342 (FIG. 6) is formed through a central portion of the front concave mirror 320. An opening 344 (FIG. 6) is formed through a central portion of the rear concave mirror 324. The opening 342 is aligned with the opening 344.

One end of a hollow opaque light tube 346 (FIG. 6) is connected to the front concave mirror 320 and the opposite end of the hollow light tube is connected to the rear concave mirror 324. One end of the light tube 346 encompasses the opening 342 in the front concave mirror 320 and the opposite end of the light tube 346 encompasses the opening 344 in the rear concave mirror 324.

A portion of the rear faces of the front and the rear concave mirrors 320 and 324 cooperate with a portion of the light tube 346 and portions of the first and the second end walls 304 and 306 to form the retainer assembly 18b encompassing the retaining space 20b. The floral grouping 22 is disposed in the retaining space 20b.

Light rays entering the container 12b through the front opening 31b traverse the open space to the front concave mirror 320 and are reflected toward the focal point of the front concave mirror 320. The light rays are diagrammatically illustrated in FIG. 6 by the light rays or paths 348 (only one of the light paths 348 being designated by a reference numeral in FIG. 6). The rays 348 then are focused onto the small front convex mirror 328 which is positioned to the right of the focal point of the front concave mirror 320 where the rays 348 are converging, but have not yet converged to a point.

The effect of the front convex mirror 328 is to reflect the rays 348, forming a small diameter paraxial beam of light traveling out the opening 342 in the front concave mirror 320 and toward the rear wall 302 of the container 12b. This light beam passes through the center of the light tube 346. After emerging from the center of the light tube 346 and passing through the opening 344 in the rear concave mirror 324, the paraxial rays 348 encounter the rear convex mirror 340 causing the rays 348 to diverge toward the left. The rear convex mirror 340 is positioned such that the diverging rays 348 appear as though they originated from the focal point of the rear concave mirror 324. When the rays 348 encounter the rear concave mirror 324, the rays 348 are finally reflected as paraxial rays 348 toward the right of the container 12b and out through the rear opening 33b with the same spatial separation the rays 348 originally possessed prior to entering the container 12b. In this manner, a virtual image of objects on the front 310 side of the container 12b is formed and can be viewed from the rear 312 of the container 12b.

It should be noted that in some instances, aberrations (blurred images) might sometimes result in optical systems using spherical mirrors. These aberrations may be corrected using parabolic mirrors instead of spherical mirrors. The illusion assembly 10b may use parabolic or spherical mirrors.

Figure 7:
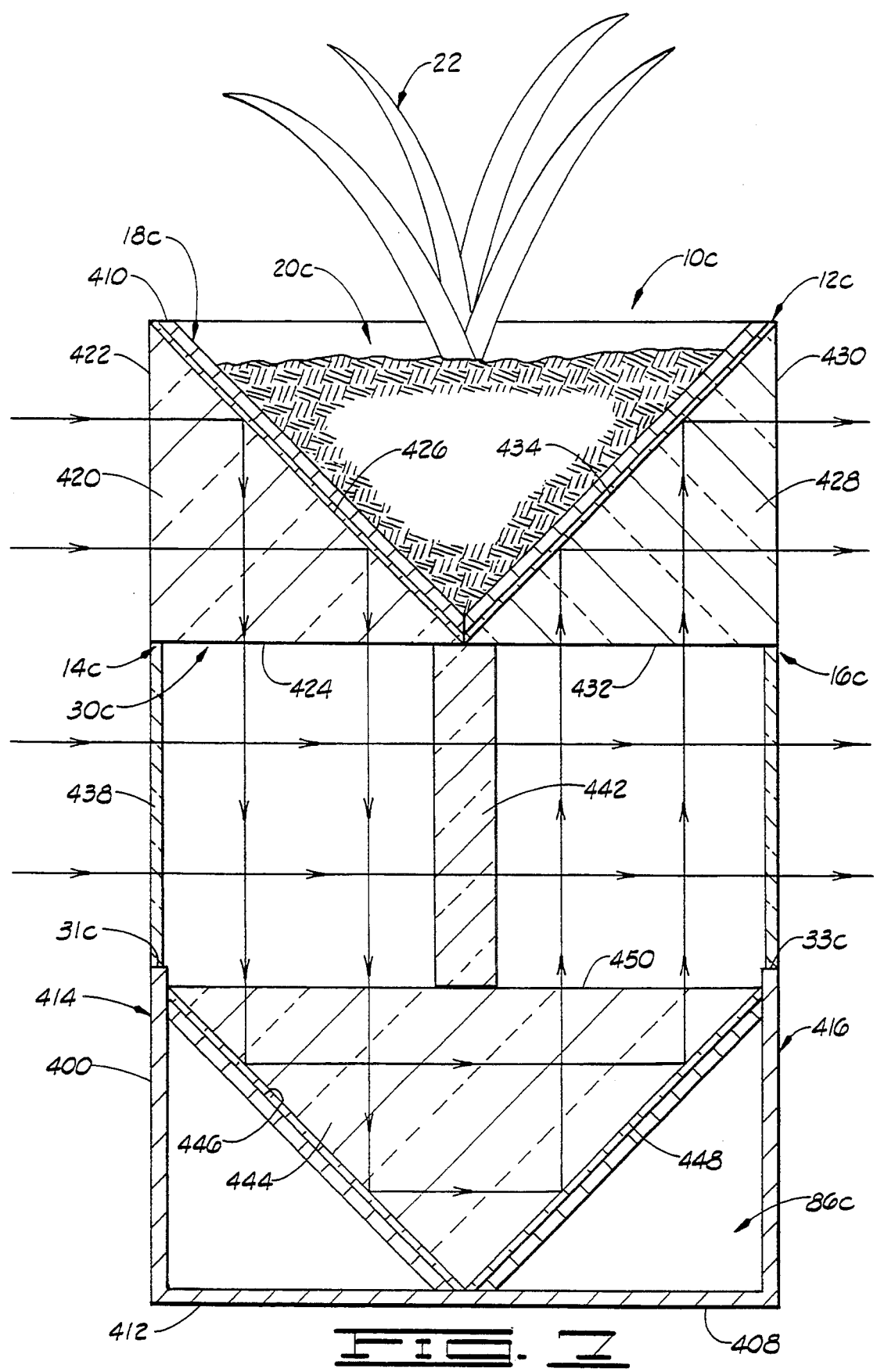
FIG. 7 is a sectional view of still another modified illusion assembly.

Embodiment of FIGS. 7 and 8

Shown in FIGS. 7 and 8 is another modified illusion assembly 10c having a modified container 12c. The illusion assembly 10c also includes a modified retainer assembly 18c having a modified retaining space 20c and modified illusion devices 30c.

The illusion assembly 10c has a front wall 400, a rear wall 402, a first end wall 404 (FIG. 8), a second end wall 406 (FIG. 8) and a bottom wall 408 (FIG. 7). The walls 400, 402, 404 and 406 are interconnected in a manner like that described before with respect to the illusion assemblies 10, 10a and 10b to form a generally square or rectangularly shaped container 12c. Each of the walls 400, 402, 404 and 406 is connected to the bottom wall 408. The walls 400, 402, 404 and 406 each extend upwardly about perpendicularly from the bottom wall 408 terminating with the tops of the walls 400, 402, 404 and 406 forming a top 410 of the container 12c. The walls 400, 402, 404, 406 and 408 cooperate to form a bottom 412 (FIG. 7), a front 414 (FIG. 7) and a rear 416 (FIG. 7) of the container 12c. The walls 400, 402, 404, 406 and 408 cooperate to at least partially enclose the container space 86c (FIG. 7).

The front opening 31c is formed through the front wall 400. The rear opening 33c is formed through the rear wall 402.

A portion of the floral grouping 22 is disposed in the retaining space 20c. At least a portion of the retainer assembly 18c is disposed between the front opening 31c and the rear opening 33c of the container 12c.

The illusion assembly 10c also includes illusion devices 30c for creating the illusion of seeing through the front opening 31c and through the rear opening 33c without seeing the retainer assembly 18c or the portion of the floral grouping 22 disposed in the retaining space 20c, in a manner like that described before with respect to the illusion assemblies 10, 10a and 10b.

A first total reflection prism 420 is disposed in the container space 86c. The first total reflection prism 420 has a front face 422, a bottom face 424 and a rear face 426. The front face 422 of the first total reflection prism 420 is disposed adjacent the front opening 31c and is disposed in a plane about coplaner with the front wall 400. The bottom face 424 extends at an angle about perpendicular to the front wall 400. The rear face 426 extends at an angle of about forty five degrees to the front 414 of the container 12c and at an angle of about forty five degrees with respect to the front face 422 and about forty five degrees with respect to the bottom face 424. The front face 422 of the first total reflection prism 420 extends at an angle of about ninety degrees with respect to the bottom face 424 of the first total reflection prism 420. The front face 422 of the first total reflection prism 420 is disposed adjacent the front transparent area 14c and comprises a portion of the front transparent area 14c.

A second total reflection prism 428 is disposed in the container space 86c. The second total reflection prism 428 has a front face 430, a bottom face 432 and a rear face 434. The front face 430 of the second total reflection prism 428 is disposed in the rear transparent area 16c and is disposed in a plane about coplaner with the rear 416 of the container 12c. The bottom face 432 extends at an angle of about ninety degrees to the rear wall 402 and at an angle of about ninety degrees to the front face 430. The rear face 434 extends at an angle about forty five degrees to the rear wall 402 and about forty five degrees to the bottom face 432. The rear face 434 extends at an angle of about forty five degrees to the front face 430 of the second total reflection prism 428.

The first total reflection prism 420 is aligned with the second total reflection prism 428, but the front face 422 of the first total reflection prism 420 faces the front opening 31c and the front face 430 of the second total reflection prism 428 faces the rear opening 33c. The bottom faces 424 and 432 of the first and the second total reflection prisms 420 and 428 are disposed in a substantially coplaner disposition.

The intersection of the rear face 426 and the bottom face 424 of the first total reflection prism 420 is disposed adjacent the intersection of the rear face 434 and the bottom face 432 of the second total reflection prism 428. The rear face 426 of the first total reflection prism 420 extends at an angle of about ninety degrees to the rear face 434 of the second total reflection prism 428. The rear face 434 of the second total reflection prism 428 comprises a portion of the rear transparent area 16c.

A first light transparent window 438 (FIG. 7) is disposed in the front opening 31c. The front face 422 of the first total reflection prism 420 and the first transparent window 438 cooperate to substantially encompass the front opening 31c and comprise the front transparent area 14c.

A second light transparent window 440 (FIG. 7) is disposed in the rear opening 33c. The front face 430 of the second total reflection prism 428 and the second light transparent window 440 cooperate to substantially encompass the rear opening 33c and comprise the rear transparent area 16c.

The first and the second transparent windows 438 and 440 are aligned. An optical path matching plate 442 is disposed between the first and the second transparent windows 438 and 440 with the matching plate 442 also being disposed in the container space 86c. The optical path matching plate 442 is disposed between the first and the second total reflection prisms 420 and 428.

A Porro prism 444 is disposed in the container space 86c. The Porro prism 444 is disposed below and spaced a distance from the bottom faces 424 and 432 of the first and the second total reflection prisms 420 and 428.

The Porro prism 444 has a first rear face 446 and a second rear face 448. The first rear face 446 of the Porro prism 444 extends from the front wall 400 toward the rear wall 402 at an angle of about forty five degrees from the front wall 402 of the front opening 31c. The second rear face 448 of the Porro prism 444 extends from the rear wall 402 toward the front wall 400 at an angle of about forty five degrees with respect to the rear wall 402 or the rear opening 33c.

The Porro prism 444 is disposed below the front opening 31c and below the rear opening 33c. The first rear face 446 of the Porro prism 444 is disposed in a plane about parallel with the rear face 426 of the first total reflection prism 420. The first rear face 446 of the Porro prism 444 is spaced a distance from the rear face 426 of the first total reflection prism 420.

The second rear face 448 of the Porro prism 444 is spaced a distance from the bottom face 432 of the second total reflection prism 428. The second rear face 448 of the Porro prism 444 is disposed in a plane about parallel with the rear face 434 of the second total reflection prism 428.

The Porro prism 444 has a front face 450. The front face 450 of the Porro prism 444 extends between the front opening 31c and the rear opening 33c. The front face 450 of the Porro prism 444 is disposed in a plane about parallel with the planer dispositions of the bottom faces 424 and 432 of the first and the second total reflection prisms 420 and 428. The front face 450 of the Porro prism 444 extends in a plane disposed about adjacent the lower end of the front opening 31c and about adjacent the lower end of the rear opening 33c. The front face 450 extends at an angle of about forty five degrees with respect to the first rear face 446 and at an angle of about forty five degrees with respect to the second rear face 448. The first rear face 446 extends at an angle of about ninety degrees with respect to the second rear face 448. The optical path matching plate 442 extends between the bottom faces 424 and 432 of the first and the second total reflection prisms 420 and 428 and the front face 450 of the Porro prism 444. The optical path matching plate 442 is disposed about midway between the front transparent area 14c and the rear transparent area 16c.

The first and the second total reflection prisms 420 and 428 and the Porro prism 444 comprise the illusion devices 30c. If used, the optical path matching plate 582 also comprises a portion of the illusion devices 30c.

Light rays are diagrammatically illustrated in FIG. 7 and designated therein by the designations A, B, C and D.

Some of the light rays (light rays A and light rays B) are normally incident on the front face 422 of the first total reflection prism 420 and pass through the first total reflection prism 422 to the diagonal or rear face 426 where the light rays A and B are totally internally reflected and pass through the lower portion of the first total reflection prism 422 and exit out the bottom face 424 thereof. The light rays A and B then transverse the open space between the first total reflection prism 420 and the Porro prism 444 and are normally incident upon a left half of the front face 450 of the Porro prism 444. After passing through the Porro prism 444 to the left most first rear face 446, the light rays A and B are totally internally reflected toward the right most diagonal second rear face 448 of the Porro prism 444. At this point, the ordering of the rays A and B is inverted. Upon encountering the right most diagonal second rear face 448, the light rays A and B are again totally internally reflected upwardly. The light rays A and B exit the Porro prism 444, upwardly traversing the open space between the Porro prism 444 and the second total reflection prism 428 to become normally incident upon the bottom face 432 of the second total reflection prism 428. The rays A and B enter the second total reflection prism 428, encounter the rear face 434 from which they are totally internally reflected, and finally exit the second total reflection prism 428. It should be noted at this point that the ordering of the light rays A and B has returned to the original state.

Some of the light rays pass directly through the open space between the total reflection prisms 420 and 428 and the Porro prism 444, and these rays are designated in FIG. 7 by the letter designations C and D. The light rays C and D pass through the first transparent window 438. The light rays C and D then traverse the open space between the total reflection prisms 420 and 428 and the Porro prism 444 and encounter the optical path matching plate 442 located near the center of the container 12c. The purpose of the optical path matching plate 442 is to insure that the light rays C and D experience the same effective optical path distance through the container 12c as the light rays A and B.

It should be noted that, in some instances, the optical patch matching plate 442 may not be needed or essential. If the optical path matching plate 442 were absent, the worst case would be that the view of the objects on the front 414 side of the container 12c was split into two distinct images, one formed by light rays that passed through the prisms 420, 428 and 444 and one formed by light rays that pass only through the open space between the prisms 420, 428 and the Porro prism 444.

After the light rays C and D encounter and pass through the optical path matching plate 442, the light rays C and D then continue to transverse the remaining open space between the second total reflection prism 428 and the Porro prism 444 and exit through the second transparent window 440 on the rear 416 side of the container 12c.

It should be noted that, since the light passing through the container 12c should be polychromatic and incoherent, there should be no constructive or destructive interference occurring when the rays A and B simultaneously pass through the same regions as the rays C and D. Thus, the vertical extent of the open space region between the total reflection prisms 420 and 428 and the Porro prism 444 can be virtually any reasonable dimension. This allows the "see through" area to be larger than that possible using mirrors, as shown in the designs in FIGS. 1 through 5.

The prisms 420, 428 and 444 may be constructed from either glass or plastic depending on the desired quality of images and the desired economics of the design.

It also should be noted that the combination of the prisms 420, 428 and 444 could be placed on their sides, back to back with another symmetric prism combination to equivalently function as the mirror design shown in FIGS. 3 and 4. Further, these modules could be arranged in tandem to form a container similar to that shown in FIG. 5.

Embodiment of FIGS. 9 and 10

Shown in FIGS. 9 and 10 is another modified illusion assembly 10d having a modified container 12d. The illusion assembly 10d also includes a modified retainer assembly 18d having a retaining space 20d for holding the floral grouping 22, and modified illusion devices 30d.

The container 12d has a front wall 500, a rear wall 502, a first end wall 504 (FIG. 10) and a second end wall 506. The container 12d also has a bottom wall 508. The walls 500, 502, 504 and 506 each are connected to the bottom wall 508. The walls 500, 502, 504 and 506 each extend upwardly from the bottom wall 508 terminating with a top 510 of the container 12d. The walls 500, 502, 504, 506 and 508 also cooperate to form a bottom 512, a front 514 and a rear 516 of the container 12d. The walls 500, 502, 504, 506 and 508 cooperate to encompass a container space somewhat similar to the container spaces 86, 86a, 86b and 86c described before, except the container space of the container 12d more particularly is solid as will be made more apparent below.

The container 12d more particularly comprises a Dove prism 520. The walls 500, 502, 504, 506 and 508 more particularly comprise walls forming the sides and bottom of the Dove prism 520. The front opening 14d comprises the front wall 500 of the Dove prism 520. The rear opening 16b comprises the rear wall 502 of the Dove prism 520. The walls 504 and 506 comprise the first and the second end wall of the Dove prism 520.

In this embodiment, the illusion devices 30c comprise the Dove prism 520 and the Dove prism 520 also comprises the container 12d. The retaining space 20d is formed in the top 510 of the Dove prism 520. It should be noted that a separate container also could be enclosed about the Dove prism 520 if desired in a particular application.

Light rays pass through the Dove prism 520 as indicated in FIG. 9 by the light rays designated with the letter designations A, B and C. Each light ray undergoes refraction according to Snell's law at the front face or front wall 500 of the Dove prism 520 and is directed toward the bottom face or bottom wall 508 of the Dove prism 520. At the bottom wall 508, each ray A, B and C undergoes internal reflection which inverts the ordering. As the light rays A, B and C encounter the rear face or rear wall 502 of the Dove prism 520, the light rays A, B and C again undergo refraction to their original direction of travel.

Considering the travel paths of the light rays A, B and C, essentially no light passes through the upper portion of the Dove prism 520 near the top 510. Thus, the retaining space 20d is formed by making a recess in the top 510 of the Dove prism 520 with the retaining space 20d extending a distance from the top 510 toward the bottom 512 of the Dove prism 520. In this embodiment, clearly the image viewed from the front wall 500 is reversed or inverted.

The front wall 500 extends at an angle of about forty five degrees with respect to the bottom wall 508 and the top 510. The rear wall 502 also extends at an angle of about forty five degrees with respect to the bottom wall 508 and the top 510. The first and the second end walls 504 and 506 each extend about perpendicularly upwardly from the bottom wall 508. This yields a bottom wall 508 length to height ratio of about four to one.

Embodiment of FIGS. 11 and 12

Shown in FIG. 11 is a modified illusion device 10e which incorporates two Dove prisms 520a and 520b connected in tandem. As mentioned before with respect to the embodiments shown in FIGS. 9 and 10, the images are inverted. By connecting or placing the Dove prisms 520a and 520b in tandem, the inverted rays passing from the first Dove prism 520a are passed through the second Dove prism 520b where the rays again are inverted back to their original orientation. Thus, a viewer on the right or front 514 of the Dove prism 520a will be able to "see through" the combination of the two Dove prisms 520a and 520b without the image being inverted.

Shown in FIG. 12 are four Dove prisms 520c, 520d, 520e and 520f connected in an array to provide yet another modified illusion device 10f.

Embodiment of FIG. 13

Shown in FIG. 13 is a modified illusion assembly 10g which is constructed exactly like the illusion assembly 10d shown in FIGS. 9 and 10, except the first and the second end walls 504g and 506g also extend at an angle of about forty five degrees from the bottom wall 508g and the top 510g. This provides a modified Dove prism 520g.

The Dove prism 520g will operate exactly like the Dove prism 520 shown in FIGS. 9 and 10 and described in detail before, except the first end wall 504g and the second end wall 506g also cooperate to provide a first side opening 600 and a second side opening 602. In this embodiment, a viewer looking through the first side opening 600 sees through the Dove prism 520g and through the second side opening 602 in a manner exactly like that described before with respect to the front opening 31d and the rear opening 33d of the illusion assembly 10d shown in FIGS. 9 and 10.

Embodiment of FIGS. 14, 14A, 15, 16, 17 and 17A

Figure 14:
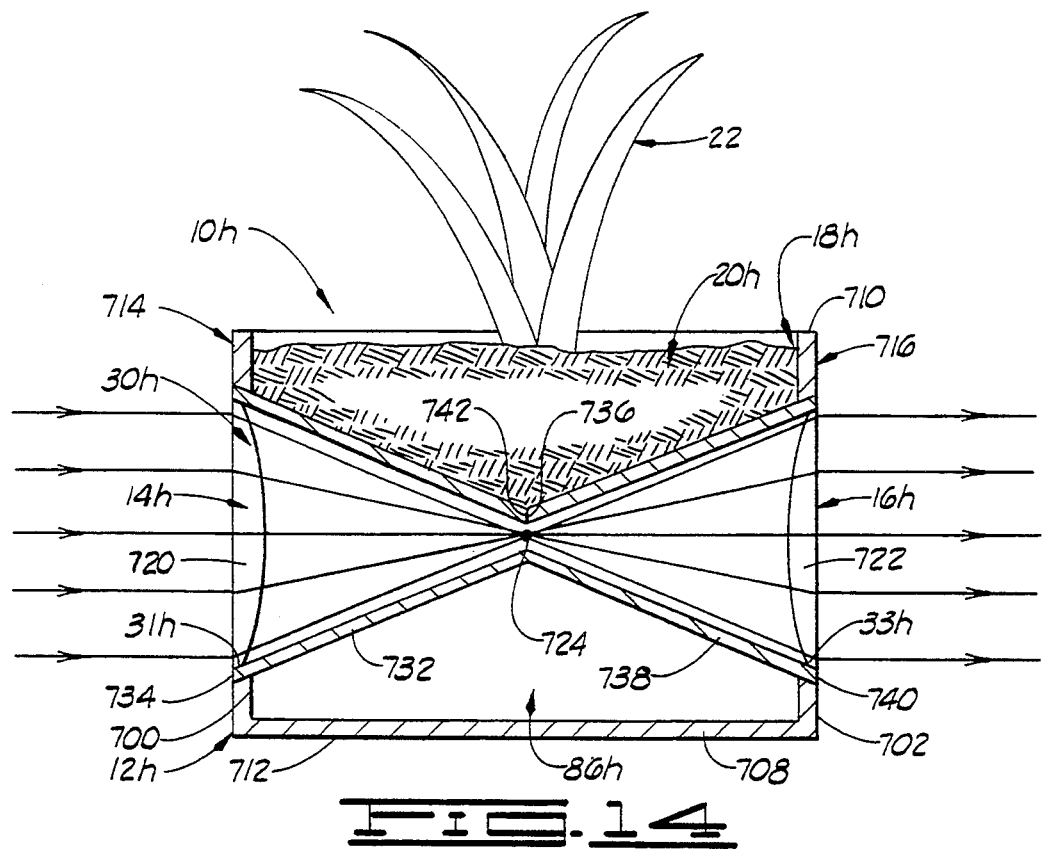
FIG. 14 is a sectional view of yet another modified illusion assembly.
Figure 14A:
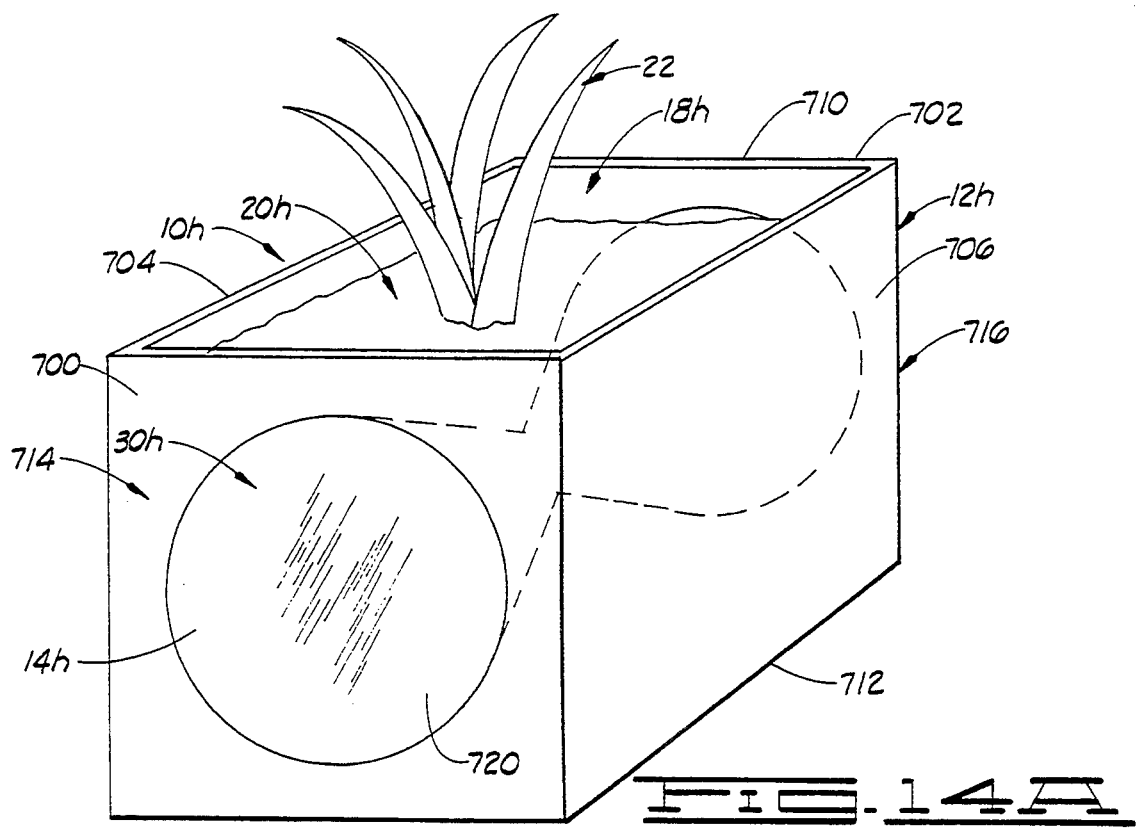
FIG. 14A is a perspective view of the illusion assembly shown in FIG. 14.

Shown in FIGS. 14 and 14A is another modified illusion assembly 10h having a modified container 12h. The illusion assembly 10h also includes a modified retainer assembly 18h and modified illusion devices 30h.

The container 12h includes a front wall 700, a rear wall 702, a first end wall 704 (FIG. 14A) and a second end wall 706 (FIG. 14A). The container 12h also includes a bottom wall 708 (FIG. 14).

The walls 700, 702, 704 and 706 are interconnected to form a generally square or rectangularly shaped container 12h in a manner like that described before with respect to the other containers shown herein. The walls 700, 702, 704 and 706 each extend about perpendicularly upwardly from the bottom wall 708 terminating with a top 710 of the container 12h. The walls 700, 702, 704, 706 and 708 cooperate to form a bottom 712, a front 714 and a rear 716 of the container 12h.

The walls 700, 702, 704, 706 and 708 cooperate to at least partially encompass the container space 20h.

The front opening 31h is formed through the front wall 700. The front opening 31h is circularly shaped and encompasses a substantial portion of the area encompassed by the front wall 700. Preferably, the front opening 31h is sized to encompass the maximum area of the front wall 700.

The rear opening 33h is formed through the rear wall 702. The rear opening 33h is circularly shaped and encompasses a substantial portion of the area encompassed by the rear wall 702. Preferably, the rear opening 33h is sized to encompass the maximum area of the rear wall 702.

The retainer assembly 18h defines the retaining space 20h. A portion of the floral grouping 22 is disposed in the retaining space 20h. At least a portion of the retainer assembly 18h is disposed between the front opening 31h and the rear opening 16b of the container 33h.

The illusion assembly 10h also includes the illusion devices 30h for creating the illusion of seeing through the front opening 31h and through the rear opening 33h without seeing the retainer assembly 18h in a manner like that described before with respect to the other illusion assemblies.

A first lens 720 is disposed in the front opening 31h. A second lens 722 (FIG. 14) is disposed in the rear opening 33h. The first and the second lenses 720 and 722 are aligned. The first and the second lenses 720 and 722 are circularly shaped and the front and the rear openings 31h and 33h also are circularly shaped.

The first lens 720 is spaced a distance from the second lens 722. The first lens 720 is constructed such that the first lens 720 has a focal length equal to about one half of the distance between the first and the second lenses 720 and 722. The second lens 722 is constructed such that the second lens 722 has a focal length equal to about one half the distance between the front and second lenses 720 and 722. The focal lengths of the first and second lenses 720 and 722 are substantially equal. The focal points of the first and the second lenses 720 and 722 about coincide.

The light rays are illustrated in FIG. 14 and designated therein by the reference characters A, B, C, D and E. In operation, when the lenses 720 and 722 cooperate to form an image of an object that is more than one focal length away from the lenses 720 and 722, the rays emanating from the object encounter either the lens 720 or the lens 722 and the light rays are focused to a focal point 724 (FIG. 14) at a distance one focal length from the respective lenses 720 and 722.

Light rays A, B, C, D and E entering or passing through the first lens 720 are focused to the focal point 724. The rays then diverge away from the focal point 724 and encounter the second lens 722. The second lens 722 then redirects the light rays to form an image of the original object.

The lenses 720 and 722 act as windows while at the same time focusing the light rays to the focal point 724 on the interior of the container 12h. Since the light rays are focused to the focal point 724, there is a substantial portion of the container 12g that is not used for the transmission of light rays.

A first opaque hollow cone light house 732 (FIG. 14) is disposed in the container space 86h. The first light house 732 has a circularly shaped first end 734 and a circularly shaped second end 736. The first end 734 is connected to the front wall 700 and the first end 734 of the light housing 732 surrounds the front opening 31h. The second end 736 of the first light housing 732 is disposed about at the focal point 724.

A second opaque hollow cone light housing 738 (FIG. 14) is disposed in the container space 86h. The second light housing 738 has a circularly shaped first end 740 and a circularly shaped second end 742. The first end 740 of the second light housing 738 is connected to the rear wall 702 and encompasses the rear opening 33h. The second end 742 of the second light housing 738 is disposed about adjacent the focal point 724 and the second end 742 of the second light housing 738 is connected to the second end 736 of the first light housing 732. The first and the second light housings 732 and 738 cooperate to substantially encompass the light path between the first and the second lenses 720 and 722.

The first and the second light housing 732 and 738 cooperate with portions of the walls 700, 702, 704 and 706 to form the retainer assembly 18h partially encompassing the retainer space 20h. A portion of the floral grouping 22 is disposed in the retaining space 20h.

Figure 15:
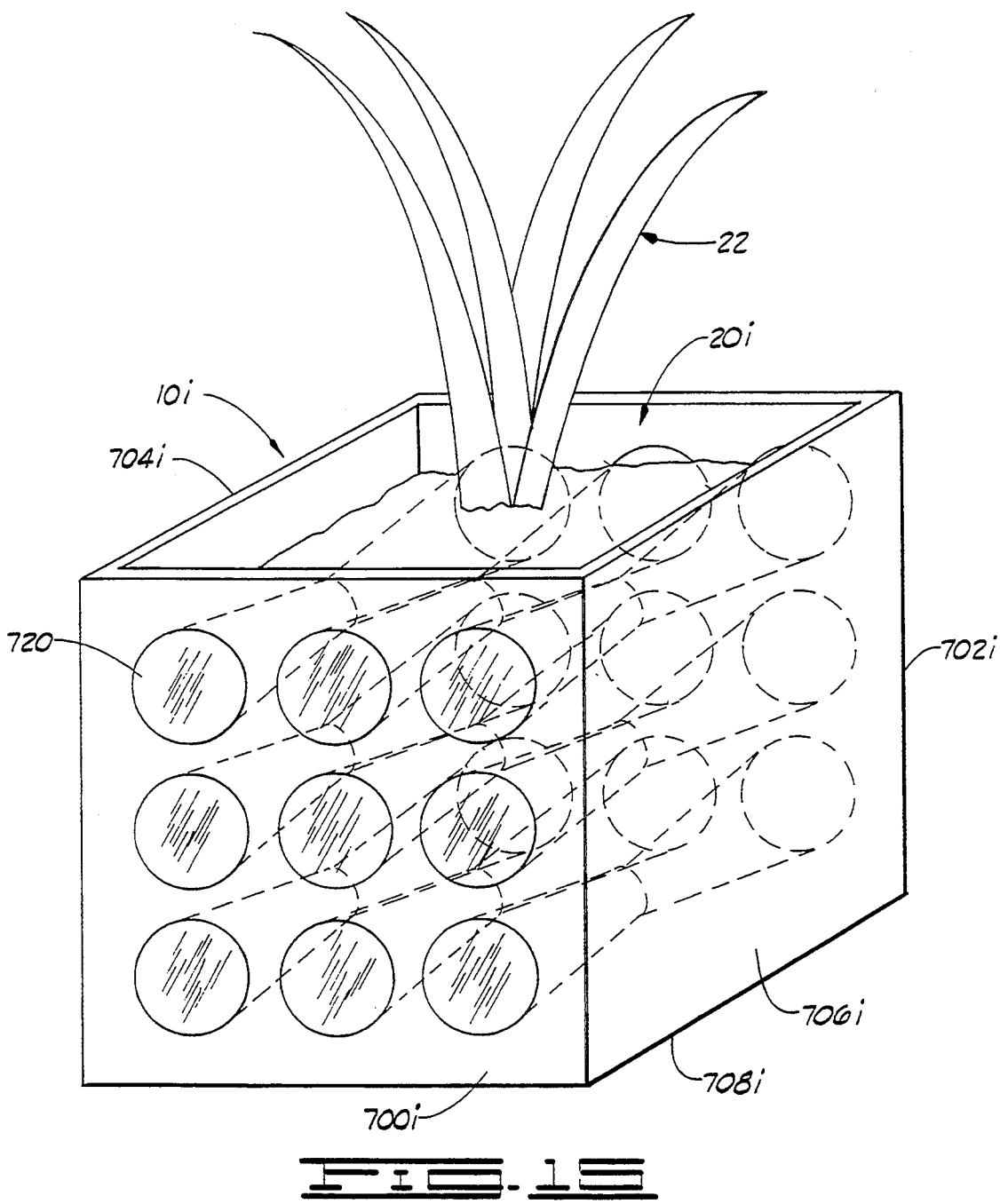
FIG. 15 is a diagrammatic, partial perspective view of still another modified illusion assembly.
Figure 16:
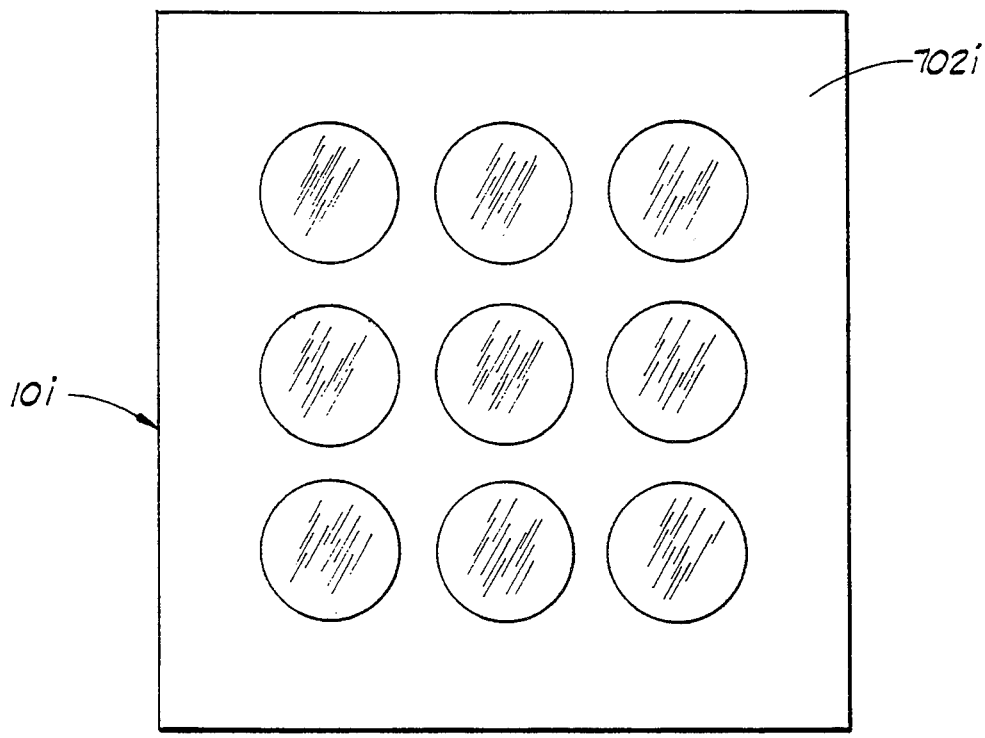
FIG. 16 is a front elevational view of the illusion assembly of FIG. 15.
Figure 17:
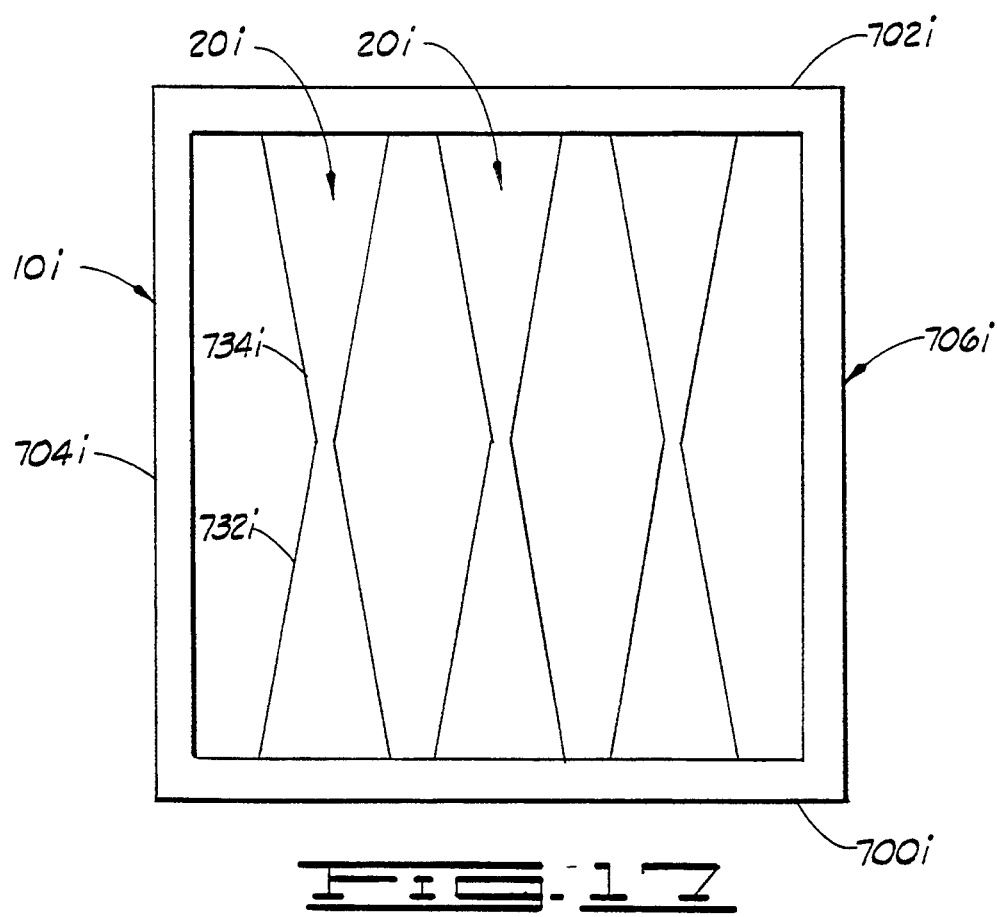
FIG. 17 is a top plan view of the illusion assembly of FIG. 15.

The size of the front opening 31h and the rear opening 33h is limited by the diameter of the lenses 720 and 722. In general, the cost of lenses increases with the diameter. An alternate to using large diameter lenses for the lenses 720 and 722 to increase the size of the front opening 31h and the rear opening 33h is shown in FIGS. 15, 16 and 17 as the modified illusion assembly 10i. In this embodiment, a plurality of first lenses 720 are disposed in the front wall 700i and a plurality of second lenses 722 are disposed in the rear wall 702i with each of the first lenses 720i being aligned with one of the second lenses 722i. In this embodiment, a plurality of light housings 731i and 734i interconnect the respective aligned pairs of first and second lenses 720 and 722. The lenses 720 and 722 shown in FIGS. 15 and 16 are constructed and operate and cooperate in a manner exactly like that described before with respect to the lenses 720 and 722 shown in FIGS. 14 and 14A. The lenses 720 and 722 are identical converging lenses (either by-convex or plano-convex). Referring to FIG. 14, if an object is located to the left of the illusion assembly 10h, we are interested in viewing the object from the right side of the illusion assembly 10h. This means the lenses 720 and 722 must produce a virtual image of the object, such that the image appears as though it were on the left side of the illusion assembly 10h. As a working definition, a "real image" is one that is formed on the right side of the illusion assembly 10h and would have to be projected onto a screen before it could be viewed. The individual's eyes would not be able to bring the real image into focus unless it were projected. A "virtual image" is one that is formed on the left side of the illusion assembly 10h and the individual's eyes would be able to focus the image.

It is desired of course that the virtual images be upright, i.e., they posses the same vertical orientation as the object. Also, it is desired that virtual images be unmagnified, i.e., appear no larger nor smaller than the original object.

Using identical converging lenses 720 and 722, a virtual image will be formed for nearly all objects. The exceptional case of a real image formation occurs when the object is located very close to the left side of the illusion assembly 10h. Furthermore, in all cases of virtual image formation, the images are unmagnified. However, the images will be inverted (upside down). Image inversion may be desired in some applications and might make an interesting effect since the illusion assembly 10h still will be "see through". The viewer on the right side of the illusion assembly 10h will see an inverted view of everything to the left of the illusion assembly 10h.

Shown in FIG. 17A is a schematic view of a modified illusion assembly 10k which is constructed exactly like the illusion assembly 10h shown in FIGS. 14 and 15, except the illusion assembly 10k includes a converging lens 750 and a diverging lens 752 such as a by-concave lens. In this embodiment, the focal lengths of the lenses 750 and 752 are adjusted to achieve an upright, virtual image. In this embodiment, the retaining space 20k will be shaped similar to the retaining space 20h shown in FIGS. 14 and 15, but somewhat modified due to the use of the diverging lens 752. For specific object distances, the images produced by this specific combination of lenses 750 and 752 will be approximately unmagnified. However, for most cases (object distances) the image will be either magnified or reduced.

This change in apparent size of objects viewed "through" the illusion assembly 10k might make for an interesting visual effect as it is closely tied to the image distance. For example, the viewer could place the viewer's hand behind the illusion assembly 10k and vary its apparent size by moving it closer or farther from the far face of the illusion assembly 10k. There is a maximum object distance which, if exceeded, will result in the cessation of virtual image formation.

Figure 18:
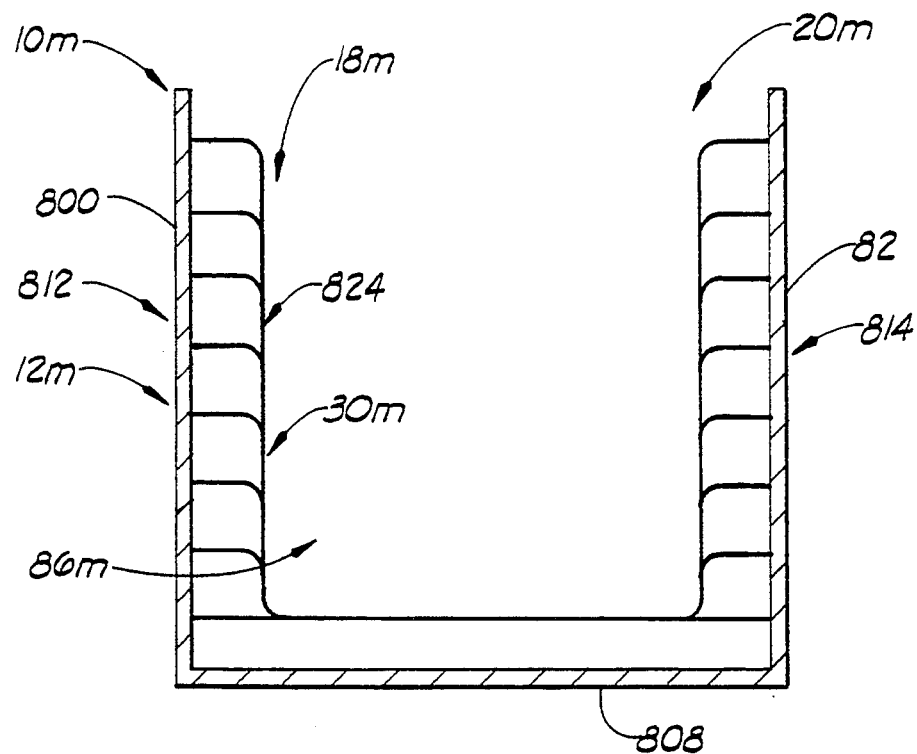
FIG. 18 is a sectional view of yet another modified illusion assembly.
Figure 19:
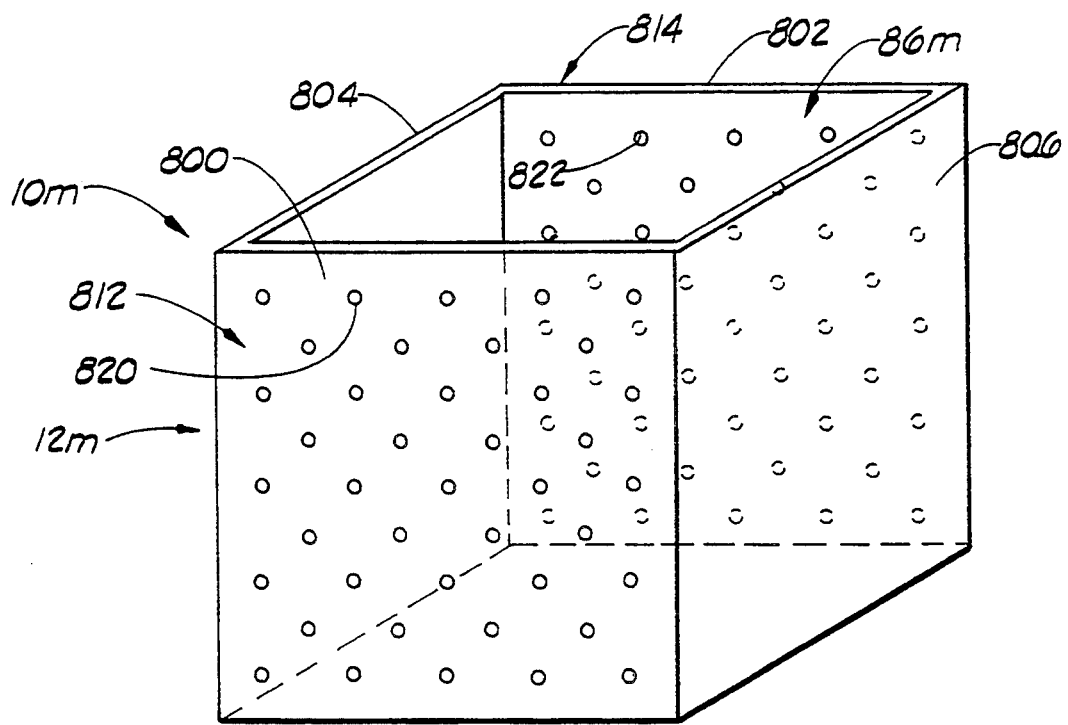
FIG. 19 is a perspective view of the container of the modified illusion assembly shown in FIG. 18.

Embodiment of FIGS. 18 and 19

Shown in FIGS. 18 and 19 is another modified illusion assembly 10m having a modified container 12m. The illusion assembly 10m also includes a modified retainer assembly 18m having a retaining space 20m and modified illusion devices 30m (FIG. 18). The container 12m has a front wall 800, a rear wall 802, a first end wall 804 (FIG. 19) and a second end wall 806 (FIG. 19). The container 12m also has a bottom wall 808. The walls 800, 802, 804 and 806 each are connected to the bottom wall 808. The walls 800, 802, 804 and 806 each extend perpendicularly upwardly from the bottom wall 808 to form a generally square or rectangularly shaped container, although the container could be any other shape desired in a particular application. The walls 800, 802, 804, 806 and 808 are interconnected in a manner very similar to that described before with respect to the other containers shown herein. The walls 800, 802, 804, 806 and 808 form the container 12h having a front 812 and a rear 814.

The walls 800, 802, 804, 806 and 808 cooperate to at least partially encompass a container space 86m. The walls 800, 802, 804 and 806 cooperate so that the tops of the respective walls 800, 802, 804 and 806 form a top 810 of the container 12m.

A plurality of openings 820 are formed through the front wall 800 (only one of the openings 820 is designated in FIG. 19 with a reference numeral). A plurality of openings 822 are formed through the rear wall 802 (only one of the openings 822 is designated with a reference numeral in FIG. 19). Each of the openings 822 in the front wall 800 is aligned with one of the openings 822 in the rear wall 802.

The illusion devices 30m comprise a plurality of optical fibers 824 (FIG. 18). Each optical fiber 824 has a first end and a second end. The first end of each optical fiber 824 is disposed in one of the openings 820 in the front wall 800 and the first end of each optical fiber 824 is secured to the front wall 800. The second end of each optical fiber 824 is disposed in one of the openings 822 in the rear wall 802 and the second end of each of the optical fibers 824 secured to the rear wall 802.

As mentioned before, each of the openings 820 is aligned with one of the openings 822 to form an aligned pair of openings 820 and 822. Each optical fiber 824 extends between an aligned pair of openings 820 and 822.

The optical fibers 824 extend from the front wall 800 through the container space 86m to the rear wall 802. The optical fibers 824 are of a length greater than the length between the front wall 800 and the rear wall 802 so that the optical fibers 824 extend from the front wall 800 downwardly along the front wall 800 to the bottom wall 808, extend along the bottom wall 808 and upwardly along the rear wall 802. The portion of the container space 86m which is not occupied by the optical fibers 824 forms the retaining space 20m.

The optical fibers 824 transmit light from the front to the rear of the container 12m. The actual image formed by the optical fibers 824 on the rear of the container 12m is essentially a shadow casting of objects on the front of the container 12m. It should be noted that the clarity of the image would increase with fiber density, but as fiber density increases, the retaining space 20m available for the floral grouping 22 (not shown) is reduced.

The openings 820 cooperate to form the front opening and the openings 822 cooperate to form the rear opening. Further, the openings 820 cooperate to form the front transparent area and the openings 822 cooperate to form the rear transparent area.

Figure 20:
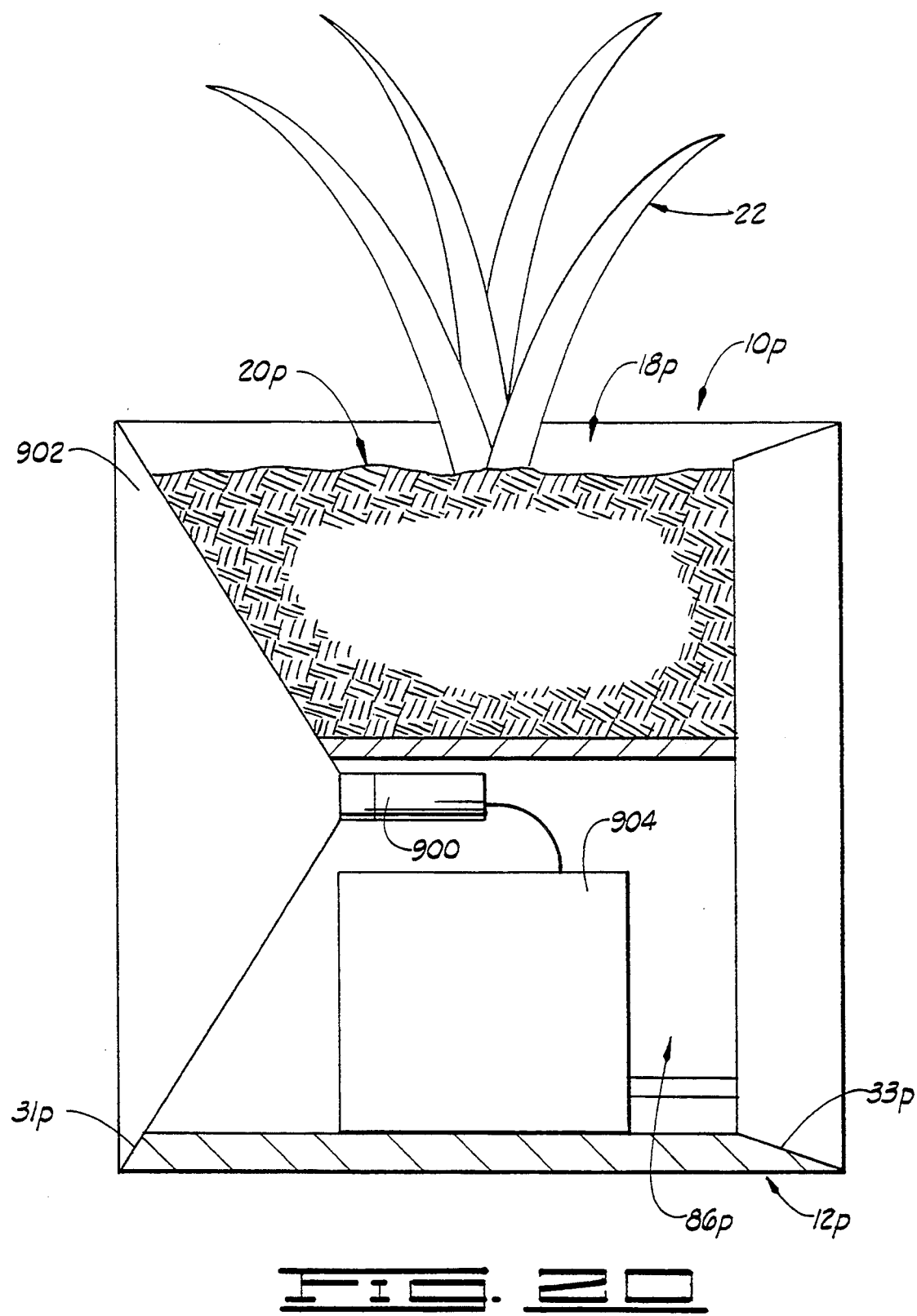
FIG. 20 is a partial sectional view of yet another modified illusion assembly.

Embodiment of FIG. 20

Shown in FIG. 20 is a partial sectional, partial diagrammatic view of another modified illusion assembly 10p. The illusion assembly 10p includes a container 12p which is constructed like the containers described before having a front opening 31p and a rear opening 33p. In this embodiment, a camera 900, preferably a chargecoupled device, with a wide angle lens 902 is positioned in the container space 86p between the front opening 31p and the rear opening 33p.

The camera 900 records the scene observed through the front opening 31p in a digital format and outputs this information to an electronics cluster 904. The electronics cluster 904 consists of power supplies for the camera 900 and the electronics necessary to send the recorded image from the camera 900 out a flat panel display 906. Preferably, the flat panel display 906 is a thin color model. The image viewed by the camera 900 on the front of the container 12p is displayed and reproduced on the rear side of the container 12p by the display 906.

Embodiment of FIG. 21

Shown in FIG. 21 is an illusion assembly 10r having a modified container 12r with a modified retainer assembly 18r forming a modified retaining space 20r for holding a portion of a floral grouping in a manner like that described before with respect to the other illusion assemblies. The modified illusion assembly 10r is similar to the illusion assembly 10a shown in FIGS. 3 and 4 and includes the mirror assembly 224r which is positioned in the container space 86r between the front transparent area 14r and the rear transparent area 16r in a manner like that described before in connection with the illusion assembly 10a. The mirror assembly 224r includes the four mirrors 216r, 218r, 220r and 224r. In lieu of the mirrors 230, 242, 256 and 268 of the illusion assembly 10a, the illusion assembly 10r includes four prisms, namely, a first right triangle prism 950, a second right triangle prism 952 and a Porro prism 954. The right triangle prisms 950 and 952 are constructed like the right triangle prisms 420 and 428 shown in FIG. 7 and the Porro prism 954 is constructed like the Porro prism 444 shown in FIG. 7.

The mirror assembly 224r and the prisms 950, 952 and 954 are positioned in the container space 86r such that some of the light rays A entering the front transparent area 14r are reflected from the mirror 216r through the first right triangle prism 950 and reflected from the first right triangle prism 950 through the second right triangle prism 952. The light rays A are reflected from the second right triangle prism 952 onto the mirror 218r and reflected from the mirror 218r out the rear transparent area 16r. Some of the light rays B entering the front transparent area 14r are reflected from the mirror 222r through the Porro prism 954, reflected internally within the Porro prism 954 and reflected out from the Porro prism 954 onto the mirror 220r. The light rays B then are reflected from the mirror 220r out the rear transparent area 16r.

The illusion devices in the illusion assembly 10r comprise the mirror assembly 224r and the prisms 950, 952 and 954.

Embodiment of FIG. 22

Shown in FIG. 22 is another modified illusion assembly 10s having a modified container 12s with a front transparent area 14s and a rear transparent area 16s. The container 12s at least partially encompasses the container space 86s. The container 12s is constructed in a manner like that described before with respect to the other containers herein. The illusion assembly 10s includes a modified retainer assembly 12s at least partially encompassing a modified retaining space 20s for retaining at least a portion of the floral grouping 22.

The illusion assembly 10s includes a first right triangle prism 960, a second right triangle prism 962, a third right triangle prism 964 and a fourth right triangle prism 966. The right triangle prisms 960, 962, 964, 966 each are constructed similar to the prisms 420 and 428 shown in FIG. 7 and described in detail before.

The illusion devices 30s comprise the prisms 960, 962, 964 and 966.

In this embodiment, light rays A entering the front transparent 14s pass through the first right triangle prism 960 and are reflected from the first right triangle prism 960 into the second right triangle prism 962. The rays A are reflected internally within the second right triangle prism 962 and reflected out from the second right triangle prism 962 through the third right triangle prism 964. The light rays A are reflected internally within the third right triangle prism 964 and reflected out from the right triangle prism 964 into and through the fourth right triangle prism 966. The light rays A are reflected by the fourth right triangle prism 966 out through the rear transparent area 16s.

Embodiment of FIG. 23

Shown in FIG. 23 is a diagrammatic, schematic view of another modified illusion assembly 10r having a modified container 12r with a front transparent area 14r and a rear transparent area 16r. The illusion assembly 10r includes a modified retainer assembly 18r at least partially surrounding a modified retaining space 20r for retaining at least a portion of the floral grouping 22.

The illusion assembly 10r is constructed similar to the illusion assembly 10 shown in FIGS. 1 and 2 and described in detail before and includes the mirrors 88r, 100r, 112r and 124r which are disposed and positioned in the container space 86r in a manner similar to the arrangement of the mirrors 88, 100, 112 and 124 shown in FIGS. 1 and 2, except the mirrors 88r and 112r are spaced a greater distance from the mirrors 100r and 124r as compared to the spacing shown in FIGS. 1 and 2. A transparent window 970 encompasses the front transparent opening 14r. A transparent window 972 encompasses the rear transparent area 16r.

In this embodiment, light rays A enter the front transparent area and pass through the transparent window 970r and encounter the mirror 88r, the light rays A being reflected from the mirror 88r onto the mirror 100r. The light rays A are reflected from the mirror 100r onto the mirror 124r. The light rays A are reflected from the mirror 124r onto the mirror 112r and the light rays A are reflected from the mirror 112r out through the transparent window 972 and out through the front transparent area 16r.

In this embodiment, more area is provided for the retaining space 20r, but the area of the front transparent opening 14r and the rear transparent opening 16r is smaller compared to the area of the front and the rear of the container 12r.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. An illusion assembly for retaining an item comprising:

a container having a first transparent area, a second transparent area, the container at least partially encompassing a container space with at least a portion of the container space being disposed between the first transparent area and the second transparent area of the container, the container having a retaining space opening formed through a portion of the container;

a retainer assembly defining a retaining space with at least a portion of the retainer assembly being disposed between the first transparent area and the second transparent area, the retaining space opening being positioned to provide access to the retaining space, and at least a portion of the item being disposable in the retaining space via the retaining space opening; and illusion means for enabling an individual to look through the first transparent area, and through the second transparent area without the individual seeing the portion of the retainer assembly disposed between the first transparent area and the second transparent area, whereby from the point of view of the individual looking through the first transparent area, it would appear as though the individual was looking through the first transparent area and through the second transparent area without the individual seeing any obstructions between the first transparent area and the second transparent area.

2. The illusion assembly of claim 1 wherein the illusion means are selected from a group of illusion means consisting of mirrors, lenses, prisms and combinations thereof.

3. The illusion assembly of claim 1 wherein the container is defined further as being formed of opaque material and wherein the item is opaque.

4. The illusion assembly of claim 1 wherein the first and the second transparent areas are aligned and spaced a distance apart.

5. The illusion assembly of claim 4 wherein the container is defined further as having a front and a rear, and wherein the first transparent area is on the front of the container and the second transparent area is on the rear of the container.

6. The illusion assembly of claim 5 wherein the first transparent area encompasses substantially the entire front of the container, and wherein the second transparent area encompasses substantially the entire rear of the container.

7. The illusion assembly of claim 1 wherein the illusion devices comprise:

a first mirror positioned in the container space for receiving and reflecting light rays entering the first transparent area;

a second mirror positioned in the container space for receiving light rays reflected from the first mirror and for reflecting the light rays received from the first mirror;

a third mirror positioned in the container space for reflecting light rays out the second transparent area and for receiving light rays; and a fourth mirror positioned in the container space for receiving light rays reflected from the second mirror and for reflecting the light rays onto the third mirror, the light rays passing through the first transparent area and being reflected from the first mirror onto the second mirror and being reflected from the second mirror onto the fourth mirror and being reflected from the fourth mirror onto the third mirror and being reflected from the third mirror out through the second transparent area.

8. The illusion assembly of claim 1 wherein the container has a front, a rear, a top and a bottom, and wherein the first mirror further comprises a first end, a second end, a first side, and a second side, the first side of the first mirror being positioned near the front of the container and the first mirror extending at an angle of about forty five degrees from the front of the container, the first mirror extending at the angle of about forty five degrees in a direction from the top of the container a distance toward the bottom of the container; and wherein the second mirror further comprises a first end, a second end, a first side, and a second side, and wherein the first side of the second mirror is disposed near the front of the container and wherein the second mirror extends at an angle of about forty five degrees from the front of the container, the second mirror extending at the angle of about forty five degrees in a direction from the top of the container a distance toward the bottom of the container, the second mirror being disposed in a plane about parallel with the first mirror, the first side of the first mirror being aligned with and spaced a distance from the first side of the second mirror and the space between the first side of the first mirror and the first side of the second mirror cooperating to define the first transparent area; and wherein the third mirror further comprises a first end, a second end, a first side and a second side, and wherein the first side of the third mirror is disposed near the rear of the container and wherein the third mirror extends at an angle of about forty five degrees from the rear of the container with the third mirror extending at the angle of about forty five degrees in a direction from the top a distance toward the bottom of the container, the third mirror being disposed at an angle of about ninety degrees with respect to the first mirror, and the second side of the first mirror being disposed near the second side of the first mirror; and wherein the fourth mirror further comprises a first end, a second end, a first side and a second side, and wherein the fourth mirror extends at an angle from the rear of the container of about forty five degrees extending in a direction from the top of the container toward the bottom of the container, the first side of the fourth mirror being disposed near the rear of the container and the second side of the fourth mirror being disposed near the second side of the second mirror, the fourth mirror extending at an angle of about ninety degrees from the second mirror, the fourth mirror extending in a plane about parallel with the third mirror, the first side of the third mirror being aligned and spaced a distance from the first side of the fourth mirror and the space between the first side of the third mirror and the first side of the fourth mirror cooperating to define the second transparent area, the first and the third mirror cooperating with portions of the container to form the retainer assembly, the first side of the first mirror and the first side of the third mirror being disposed near the top of the container and the first side of the first mirror being spaced a distance from the first side of the third mirror and the first side of the first mirror and the first side of the third mirror cooperating to define the retaining space opening in the top of the container for providing access to the retaining space, a space between the first mirror and the third mirror cooperating to define the retaining space, the fourth mirror extending in a plane about parallel with the third mirror.

9. The illusion assembly of claim 8 wherein the first end of the first mirror is substantially aligned with the first end of the second mirror, the second end of the first mirror substantially aligned with the second end of the second mirror, the second side of the first mirror is substantially aligned with the second side of the second mirror, and wherein the first end of the third mirror substantially aligned with the first end of the fourth mirror, the second end of the third mirror being substantially aligned with the second end of the fourth mirror, and the second side of the third mirror substantially aligned with the second side of the fourth mirror, and wherein the first mirror is spaced a distance from the second mirror, and wherein the third mirror is spaced a distance from the fourth mirror.

10. The illusion assembly of claim 1 wherein the container further comprises:
a front wall having a first end, a second end, a bottom and a top;
a rear wall having a first end, a second end, a bottom and a top;
a first end wall having a first end, a second end, a bottom and a top;
a second end wall having a first end, a second end, a bottom and a top;
a bottom wall, the first end of the front wall being connected to the first end of the first end wall and the second end of the front wall being connected to the first end of the second end wall, the second end of the second end wall being connected to the second end of the rear wall and the first end of the rear wall being connected to the second end of the first end wall, and the bottoms of the front wall, the rear wall, the first end wall and the second end wall being connected to the bottom wall, and the front wall, the rear wall, the first end wall and the second end wall each extending a distance upwardly from the bottom wall terminating with the tops of the front wall, the rear wall, the first end wall and the second end wall and forming a top of the container, a front opening being formed through the front wall with the front opening defining the first transparent area and a rear opening being formed through the rear wall with the rear opening defining the second transparent area.

11. The illusion assembly of claim 10 wherein the illusion devices comprise:
a first mirror having a first end, second end, a first side and a second side, the first side of the first mirror being disposed near the front wall and the first mirror extending a distance angularly downwardly from the front wall in a direction toward the bottom wall at an angle of about forty five degrees with respect to the front wall;
a second mirror having a first end, a second end, a first side and a second side, the first side of the second mirror being disposed near the front wall and the first side of the first mirror being spaced a distance from the first side of the second mirror, and the second mirror extending at an angle in a direction downwardly from the front wall at an angle of about forty five degrees toward the bottom wall, the first mirror being disposed in a plane about parallel with the second mirror, and a space between the first side of the first mirror and the first side of the second mirror cooperating to define the first transparent area, light entering the first transparent area encountering the first mirror and being reflected downwardly onto the second mirror where the light is reflected from the second mirror generally toward the rear opening;
a third mirror having a first end, a second end, a first side and a second side, the first side of the third mirror being disposed near the rear wall, the third mirror extending at an angle of about forty five degrees from the rear wall a distance in a direction from the top toward the bottom wall, and the second side of the third mirror being disposed near the second side of the first mirror with the third mirror extending an angle of about ninety degrees from the first mirror; and
a fourth mirror having a first end, a second end, a first side and a second side, the first side of the fourth mirror being disposed near the rear wall, the fourth mirror extending at an angle of about forty five degrees with respect to the rear wall downwardly in a direction from the top toward the bottom wall, the second side of the fourth mirror being disposed near the second side of the third mirror, and the fourth mirror extending at a plane about parallel with the third mirror, the fourth mirror extending at an angle about ninety degrees with respect to the second mirror, the first side of the third mirror being spaced a distance from the first side of the fourth mirror and the space between the first side of the third mirror and the first side of the fourth mirror cooperating to define the second transparent area, light reflected from the second mirror encountering the fourth mirror and being reflected onto the third mirror and reflected from the third mirror out the second transparent area.

12. The illusion assembly of claim 11 wherein the first side of the first mirror and the first side of the third mirror cooperate to form a retaining space opening in the top of the container providing access to the retaining space of the retaining assembly, the space between the first mirror and the third mirror cooperating to form the retaining space.

13. The illusion assembly of claim 12 wherein the first end of the first mirror is aligned with the first end of the second mirror, and wherein the second end of the first mirror is aligned with the second end of the second mirror, and wherein the first end of the third mirror is aligned with the first end of the fourth mirror, and wherein the second end of the third mirror is aligned with the second end of the fourth mirror.

14. The illusion assembly of claim 13 wherein the front wall further comprises a front opening formed through the front wall with the front opening comprising the first transparent area, and a rear opening formed through the rear wall comprising the second transparent area.

15. The illusion assembly of claim 14 wherein the front opening is defined further as being rectangularly shaped and having a first end, a second end, a first side and a second side, the first side of the first mirror being disposed near the first side of the front opening and the first mirror extending between the first end and the second end of the front opening, the first side of the second mirror being disposed near the second side of the front opening and the second mirror extending between the first end and the second end of the front opening, and wherein the rear opening is defined further as being rectangularly shaped having a first end, a second end, a first side and a second side, the first side of the third mirror being disposed near the first side of the rear opening and the third mirror extending between the first and the second ends of the rear opening, and the first side of the fourth mirror being disposed adjacent the second side of the rear opening and the fourth mirror extending between the first and the second ends of the rear opening.

16. The illusion assembly of claim 1 the container further comprises a front and a rear, and wherein the illusion means further comprise:

a first mirror, a second mirror, a third mirror and a fourth mirror interconnected to form a generally square shaped mirror assembly with the mirror assembly being disposed between the first transparent area and the second transparent area;

a fifth mirror having a first end, a second end, a first side and a second side, the first side of the fifth mirror being positioned near the first transparent area and the fifth mirror extending at an angle of about forty five degrees from the front of the container and the fifth mirror extending in a plane about parallel with the first mirror and the fifth mirror being spaced a distance from the first mirror;

a sixth mirror having a first end, a second end, a first side and a second side, the second side of the sixth mirror being positioned near the second transparent area and the sixth mirror extending at an angle of about forty five degrees from the rear of the container, the first side of the sixth mirror being positioned near the second side of the fifth mirror and the sixth mirror extending at an angle of about ninety degrees with respect to the fifth mirror, the sixth mirror extending at a plane about parallel with the second mirror, and the sixth mirror being spaced a distance from the second mirror; and a seventh mirror having a first end, second end, a first side and a second side, the first side of the seventh mirror being positioned near the first transparent area, and the second mirror extending at an angle of about forty five degrees from the front of the container, the seventh mirror being spaced a distance from the fourth mirror and extending in a plane about parallel with the fourth mirror; and an eighth mirror having a first end, a second end, a first side and a second side, the second side of the eighth mirror being disposed near the second transparent area and the eighth mirror extending at an angle of about forty five degrees from the rear of the container, the first side of the eighth mirror being disposed near the second side of the seventh mirror, and the eighth mirror extending at an angle of about ninety degrees from the seventh mirror, the eighth mirror extending a plane about parallel with the third mirror and the eighth mirror being spaced a distance from the third mirror, whereby some of the light entering the first transparent area is reflected from the first mirror onto the fifth mirror and from the fifth mirror onto the sixth mirror and from the sixth mirror onto the second mirror and from the second mirror out the second transparent area, and some of the light entering the first transparent area is reflected from the fourth mirror onto the seventh mirror and reflected from the seventh mirror onto the eighth mirror and reflected from the eighth mirror onto the third mirror and reflected from the third mirror out of the second transparent area, the mirror assembly cooperating to form a portion of the retainer assembly and the space between the first mirror, the second mirror, the third mirror and the fourth mirror forming the retaining space.

17. The illusion assembly of claim 10 wherein the illusion means further comprise:

a first mirror, a second mirror, a third mirror and a fourth mirror interconnected to form a generally rectangularly shaped mirror assembly with the mirror assembly being disposed between the front opening and the rear opening and extending generally between the top and the bottom wall of the container;

a fifth mirror having a first end, a second end, a first side and a second side, the first side of the fifth mirror being positioned near the front wall and near the front opening and the fifth mirror extending at an angle of about forty five degrees from the front wall and the fifth mirror extending in a plane about parallel with the first mirror and the fifth mirror being spaced a distance from the first mirror;

a sixth mirror having a first end, a second end, a first side and a second side, the second side of the sixth mirror being positioned near the rear opening and near the rear wall and the sixth mirror extending at an angle of about forty five degrees from the rear wall, the first side of the sixth mirror being positioned near the second side of the fifth mirror and the sixth mirror extending at an angle of about ninety degrees with respect to the fifth mirror, the sixth mirror extending in a plane about parallel with the second mirror, and the sixth mirror being spaced a distance from the second mirror;

a seventh mirror having a first end, a second end, a first side and a second side, the first side of the seventh mirror being positioned near the front opening and near the front wall, the second mirror extending at an angle of about forty five degrees from the front wall, the seventh mirror being spaced a distance from the fourth mirror and extending in a plane about parallel with the fourth mirror; and an eighth mirror having a first end, a second end, a first side and a second side, the second side of the eighth mirror being disposed near the rear wall and near the rear opening and the eighth mirror extending at an angle of about forty five degrees from the rear wall, the first side of the eighth mirror being disposed near the second side of the seventh mirror, and the eighth mirror extending at an angle of about ninety degrees from the seventh mirror, the eighth mirror extending in a plane about parallel with the third mirror and the eighth mirror being spaced a distance from the third mirror, whereby some of the light entering the front opening is reflected from the first mirror onto the fifth mirror and from the fifth mirror onto the sixth mirror and from the sixth mirror onto the second mirror and from the second mirror out the rear opening, and some of the light entering the front opening is reflected from the fourth mirror onto the seventh mirror and reflected from the seventh mirror onto the eighth mirror and reflected from the eighth mirror onto the third mirror and reflected from the third mirror out the rear opening, the mirror assembly cooperating to form a portion of the retainer assembly and the space between the first mirror, the second mirror, the third mirror and the fourth mirror forming the retaining space.

18. The illusion assembly of claim 1 wherein the illusion devices further comprise:
a front concave mirror having a focal point and being disposed about adjacent the first transparent area, an opening being formed through a central portion of the front concave mirror;
a rear concave mirror having a focal point and being disposed about adjacent the second transparent area, an opening being formed through a portion of the rear concave mirror;
a front convex mirror disposed near the focal point of the front concave mirror whereby the light entering the front transparent area is reflected from the front concave mirror and onto the front convex mirror and the light being reflected from the front convex mirror out the opening in the front concave mirror; and
a rear convex mirror positioned near the focal point of the rear concave mirror, light being reflected through the first transparent area onto the front concave mirror and reflected from the front concave mirror onto the front convex mirror, the light being reflected from the front convex mirror through the opening in the front concave mirror and through the opening in rear concave mirror and onto the rear convex mirror, and the light being reflected from the rear convex mirror onto the rear concave mirror and the light being reflected from the rear concave mirror out the second transparent area, the front concave mirror being spaced a distance from the rear concave mirror and at least a portion of the space between the front concave mirror and the rear concave mirror cooperating to form a portion of the retaining space.

19. The illusion assembly of claim 18 wherein the opening in the front concave mirror is aligned with the opening in the rear concave mirror.

20. The illusion assembly of claim 18 wherein the container is defined further to include a front and a rear with a front opening being formed through the front of the container and a rear opening being formed through the rear of the container, the front opening being circularly shaped and defining the first transparent area, and the rear opening being circularly shaped and defining the second transparent area, and wherein the front concave mirror is defined further as having a circularly shaped front face with the front face of the front concave mirror being disposed about adjacent the front of the container and the front face of the front concave mirror substantially encompassing the front opening, and wherein the rear concave mirror is defined further as comprising a front face having a circular shape with the front face of the rear concave mirror being disposed near the rear of the container and the front face of the rear concave mirror substantially encompassing the rear opening.

21. The illusion assembly of claim 20 wherein the focal point of the front concave mirror is disposed in a plane about coplaner with the front of the container, and wherein the focal point of the rear concave mirror is disposed in a plane about coplaner with the rear of the container.

22. The illusion assembly of claim 18 further comprising:
an opaque light tube having a first end and a second end, the first end of the light tube being connected to the front concave mirror and the light tube encompassing the opening in the front concave mirror, and the second end of the light tube being connected to the rear concave mirror with the second end of the light tube encompassing the opening in the rear concave mirror, the light tube extending between the front concave mirror and the rear concave mirror, the light reflected from the front convex mirror traveling through the light tube and onto the rear convex mirror, a portion of the light tube cooperating with a portion of the front concave mirror and a portion of the rear concave mirror to form the retainer assembly.

23. The illusion assembly of claim 10 wherein the front opening is defined further as being circularly shaped and the rear opening is defined further as being circularly shaped, and wherein the illusion devices further comprise:
a front concave mirror having a focal point and being disposed near the front wall of the container and substantially encompassing the front opening in the container, an opening being formed through a portion of the front concave mirror;
a rear concave mirror having a focal point and being disposed near the rear wall of the container with the rear concave mirror substantially encompassing the rear opening of the container, an opening being formed through a portion of the rear concave mirror;
a front convex mirror disposed near the focal point of the front concave mirror whereby the light entering the front opening is reflected from the front concave mirror and onto the front convex mirror and the light being reflected from the front convex mirror out the opening in the front concave mirror; and
a rear convex mirror positioned near the focal point of the rear convex mirror, light being reflected through the front opening onto the front convex mirror and reflected from the front convex mirror onto the front convex mirror, the light being reflected from the front convex mirror through the opening in the front concave mirror and through the opening in rear concave mirror and onto the rear convex mirror, and the light being reflected from the rear convex mirror onto the rear concave mirror and the light being reflected from the rear concave mirror out the rear opening, the front concave mirror being spaced a distance from the rear concave mirror and at least a portion of the space between the front concave mirror and the rear concave mirror cooperating to form a portion of the retaining space.

24. The illusion assembly of claim 23 further comprising:
an opaque light tube having a first end and a second end, the first end of the light tube being connected to the front concave mirror and the light tube encompassing the opening in the front concave mirror, and the second end of the light tube being connected to the rear concave mirror with the second end of the light tube encompassing the opening in the rear concave mirror, the light tube extending between the front concave mirror and the rear concave mirror, the light reflected from the front convex mirror traveling through the light tube and onto the rear convex mirror, a portion of the light tube cooperating with a portion of the front concave mirror and a portion of the rear concave mirror to form the retainer assembly.

25. The illusion assembly of claim 23 wherein the opening in the front concave mirror is aligned with the opening in the rear concave mirror.

26. The illusion assembly of claim 23 wherein the container is defined further to include a front and a rear with a front opening being formed through the front of the container and a rear opening being formed through the rear of the container, the front opening being circularly shaped and defining the first transparent area, in the rear opening being circularly shaped and defining the second transparent area, and wherein the front concave mirror is defined further as having a circularly shaped front face with the front face of the front concave mirror being disposed adjacent the front of the container and the front face of the front concave mirror substantially encompassing the front opening, and wherein the rear concave mirror is defined further as comprising a front face having a circular shape with the front face of the rear concave mirror being disposed near the rear of the container and the front face of the rear concave mirror substantially encompassing the rear opening.

27. The illusion assembly of claim 26 wherein the focal point of the front concave mirror is disposed in a plane about coplaner with the front of the container, and wherein the focal point of the rear concave mirror is disposed in a plane about coplaner with the rear of the container.

28. The illusion assembly of claim 1 wherein the container has a front and a rear, and wherein the illusion devices further comprise:
    a first total reflection prism having a front face, a bottom face and a rear face, the front face being disposed near the first transparent area;
    a second total reflection prism having a front face, a bottom face and a rear face, the front face being positioned near the second transparent area; and
    a Porro prism having a first rear face, a second rear face and a front face, the first and the second total reflection prisms and the Porro prism being positioned in the container whereby at least some of the light is passed through the first transparent area and through the front face of the first total reflection prism onto the rear face of the first total reflection prism, the light being reflected from the rear face of the first total reflection prism onto the front face of the Porro prism, the light being passed from the front face of the Porro prism through the Porro prism and onto the first rear face of the Porro prism, the light being reflected from the first rear face of the Porro prism through the Porro prism and onto the second rear face of the Porro prism, and the light being reflected from the second rear face of the Porro prism through the Porro prism and through the front face of the Porro prism and through the bottom face of the second total reflection prism and through the second total reflection prism onto the rear face of the second total reflection prism and the light being reflected from the rear face of the second total reflection prism through the second total reflection prism and out through the front face of the second total reflection prism and out through the second transparent area.

29. The illusion assembly of claim 28 wherein the front face of the Porro prism extends between the first transparent area and the second transparent area and is disposed in a plane about parallel with the bottom faces of the first and the second total reflection prisms, the first rear face of the Porro prism extending at an angle of about forty five degrees with respect to the front of the container about forty five degrees with respect to the front face of the Porro prism, and the second rear face of the Porro prism extending at an angle of about forty five degrees with respect to the rear of the container and at an angle of about ninety degrees with respect to the first rear face of the Porro prism, and the second rear face of the Porro prism extending at an angle of about forty five degrees with respect to the front face of the Porro prism.

30. The illusion assembly of claim 29 wherein the rear face of the first total reflection prism extends at an angle of about forty five degrees with respect to the front of the container and at an angle of about forty five degrees with respect to the front face of the first total reflection prism and at an angle of about forty five degrees with respect to the bottom face of the first total reflection prism, and wherein the front face of the first total reflection prism extends at an angle of about ninety degrees with respect to the bottom face of the first total reflection prism, the front face of the first total reflection prism being disposed adjacent the first transparent area and comprising a portion of the first transparent area, and wherein the rear face of the second total reflection prism extends at an angle of about forty five degrees with respect to the front face of the second total reflection prism and at an angle of about forty five degrees with respect to the bottom face of the second total reflection prism, and the front face of the second total reflection prism extends at an angle of about ninety degrees with respect to the bottom face of the second total reflection prism, the front face of the second total reflection prism being disposed adjacent the second transparent area and comprising a portion of the second transparent area, the bottom faces of the first and the second total reflection prisms extending in a coplaner disposition and the bottom faces of the first and the second total reflection prisms extending in a plane about parallel with the front face of the Porro prism.

31. The illusion assembly of claim 30 wherein the bottom faces of the first and the second total reflection prisms are spaced a distance from the front face of the Porro prism, and wherein some of the light passes through a portion of the first transparent area and through the space between the first and the second total reflection prisms and the Porro prism and out the second transparent area, a portion of the space between the first and the second total reflection prisms and the Porro prism comprising a portion of the first transparent area and a portion of the space between the first and the second total reflection prisms and the Porro prism comprising a portion of the second transparent area.

32. The illusion assembly of claim 31 wherein one end of the rear face of the first total reflection prism is disposed near one end of the rear face of the second total reflection prism, and the rear face of the first total reflection prism extends at an angle of about ninety degrees with respect to the rear face of the second total reflection prism.

33. The illusion assembly of claim 10 wherein the illusion devices further comprise:
- a first total reflection prism having a front face, a bottom face and a rear face, the front face being disposed adjacent the front opening in the container and the front face comprising a portion of the front opening in the container;
- a second total reflection prism having a front face, a bottom face and a rear face, the front face being positioned adjacent the rear opening in the container; and
- a Porro prism having a first rear face, a second rear face, and a front face, the first and the second total reflection prisms and the Porro prism being positioned in the container whereby at least some of the light is passed through the front opening in the container and through the front face of the first total reflection prism onto the rear face of the first total reflection prism, the light being reflected from the rear face of the first total reflection prism onto the front face of the Porro prism, the light being passed from the front face of the Porro prism through the Porro prism and onto the first rear face of the Porro prism, the light being reflected from the first rear face of the Porro prism through the Porro prism and onto the second rear face of the Porro prism, and the light being reflected from the second rear face of the Porro prism through the Porro prism and through the front face of the Porro prism and through the bottom face of the second total reflection prism and through the second total reflection prism onto the rear face of the second total reflection prism and the light being reflected from the rear face of the second total reflection prism through the second total reflection prism and out through the front face of the second total reflection prism and out through the front opening in the container.

34. The illusion assembly of claim 33 wherein the front face of the Porro prism extends between the first transparent area and the second transparent area and is disposed in a plane about parallel with the bottom faces of the first and the second total reflection prisms, the first rear face of the Porro prism extending at an angle of about forty five degrees with respect to the front of the container about forty five degrees with respect to the front face of the Porro prism, and the second rear face of the Porro prism extending at an angle of about forty five degrees with respect to the rear of the container and at an angle of about ninety degrees with respect to the first rear face of the Porro prism and the second rear face of the Porro prism extending at an angle of about forty five degrees with respect to the front face of the Porro prism.

35. The illusion assembly of claim 34 wherein the rear face of the first total reflection prism extends at an angle of about forty five degrees with respect to the front of the container and at an angle of about forty five degrees with respect to the front face of the first total reflection prism and at an angle of about forty five degrees with respect to the bottom face of the first total reflection prism, and wherein the front face of the first total reflection prism extends at an angle of about ninety degrees with respect to the bottom face of the first total reflection prism, the front face of the first total reflection prism being disposed about adjacent the first transparent area and comprising a portion of the first transparent area, and wherein the rear face of the second total reflection prism extends at an angle of about forty five degrees with respect to the front face of the second total reflection prism and at an angle of about forty five degrees with respect to the bottom face of the second total reflection prism, and the front face of the second total reflection prism extends at an angle of about ninety degrees with respect to the bottom face of the second total reflection prism, the front face of the second total reflection prism being disposed adjacent the second transparent area and comprising a portion of the second transparent area, the bottom faces of the first and the second total reflection prisms extending in a coplaner disposition and the bottom faces of the first and the second total reflection prisms extending in a plane about parallel with the front face of the Porro prism.

36. The illusion assembly of claim 35 wherein the bottom faces of the first and the second total reflection prisms are spaced a distance from the front face of the Porro prism, and wherein some of the light passes through a portion of the first transparent area and through the space between the first and the second total reflection prisms and the Porro prism and out the second transparent area.

37. The illusion assembly of claim 36 wherein one end of the rear face of the first total reflection prism is disposed near one end of the rear face of the second total reflection prism and the rear face of the first total reflection prism extends at an angle of about ninety degrees with respect to the rear face of the second total reflection prism, a portion of the space between the first and the second total reflection prisms and the Porro prism comprising a portion of the first transparent area and a portion of the space between the first and the second total reflection prisms and the Porro prism comprising a portion of the second transparent area.

38. The illusion assembly of claim 1 wherein the illusion devices comprise:
- a Dove prism having a front wall, a rear wall, a first end wall, a second end wall, a bottom wall and a top, the top extending in a plane about parallel with the bottom wall, the front wall extending between the bottom wall and the top at an angle of about forty five degrees from the bottom wall and the front wall being angled generally toward the rear wall, the rear wall being spaced a distance from the front wall, and the rear wall extending between the bottom wall and the top and the rear wall extending from the bottom wall generally toward the front wall at an angle of about forty five degrees with respect to the bottom wall, the light rays entering the front wall and being reflected in the Dove prism and reflected out the rear wall.

39. The illusion assembly of claim 38 wherein the Dove prism is defined further as comprising at least a portion of the container, the retaining space being formed in the top of the Dove prism and extending a distance through the Dove prism toward the bottom wall of the Dove prism, the retaining space being positioned so that the light rays reflected in the Dove prism do not pass through the retaining space.

40. The illusion assembly of claim 38 wherein the Dove prism is defined further as having the first end wall angled from the bottom wall to the top and toward the second end wall at an angle of about forty five degrees with respect to the bottom wall and having the second end wall extending between the bottom wall and the top at an angle of about forty five degrees with respect to the bottom wall and extending generally toward the first end wall.

41. The illusion assembly of claim 1 wherein the illusion devices comprise:

a pair of Dove prisms, each Dove prism having a front wall, a rear wall, a first end wall, a second end wall, a bottom wall and a top, the top extending in a plane about parallel with the bottom wall, the front wall extending between the bottom wall and the top at an angle of about forty five degrees from the bottom wall, and the front wall being angled generally toward the rear wall, the rear wall being spaced a distance from the front wall and extending between the bottom wall and the top and the rear wall extending from the bottom wall generally toward the front wall at an angle of about forty five degrees with respect to the bottom wall, the light rays entering the front wall and being reflected in the Dove prism and reflected out the rear wall, the rear wall of one of the Dove prisms being disposed near the front wall of the other Dove prism and positioned so that the light rays passing from the rear wall of the one Dove prisms enters the front wall of the other Dove prism and are reflected within the other Dove prism and out the rear wall of the other Dove prism.

42. The illusion assembly of claim 41 wherein each Dove prism comprises at least a portion of the container and wherein the retaining space is defined further to comprise a retaining space formed in the top of each of the Dove prisms with each retaining space being positioned in the respective Dove prism so that the light rays passing through the respective Dove prisms do not pass through the retaining space in that Dove prism.

43. The illusion assembly of claim 1 wherein the illusion devices comprise:

a first lens having a focal point spaced a first focal length from the first lens, the first lens being disposed about adjacent the first transparent area, the first lens comprising at least a portion of the first transparent area; and a second lens having a focal point spaced a second focal length from the second lens with the second lens being disposed about adjacent the second transparent area, and with the second lens comprising at least a portion of the second transparent area, the first lens and the second lens being aligned and the first focal length being about equal to the second focal length, the focal point of the first lens about coinciding with the focal point of the second lens, the light rays passing through the first transparent area and through the first lens and being focused at the focal points of the first and second lenses and the light passing from the focal points of the first and the second lenses through the second lens and out the second transparent area.

44. The illusion assembly of claim 43 further comprising:

a first hollow cone shaped opaque light housing having a first end and a second end, the first end of the first light housing being positioned adjacent the first lens and the first lens of the first light housing substantially encompassing the first end, the first light housing extending a distance into the container space terminating with the second end of the first light housing positioned at about the focal points of the first and the second lenses; and a second hollow cone shaped opaque light housing having a first end and a second end, the first end of the second light housing substantially encompassing the second lens, the second light housing extending a distance into the container space terminating with the second end of the second light housing positioned near the second end of the first light housing and positioned at about the focal points of the first and the second lenses, the first and the second light housing cooperating with portions of the container to form the retainer assembly and define the retaining space.

45. The illusion of claim 10 wherein the illusion devices comprise:

a first lens having a first focal point spaced a first focal length from the first lens, the first lens being disposed in the front opening in the front wall and the first lens substantially encompassing the front opening, the first lens comprising at least a portion of the first transparent area; and a second lens having a focal point spaced a second focal length from the second lens with the second lens being disposed in the rear opening in the rear wall and substantially encompassing the rear opening, the second lens comprising at least a portion of the second transparent area, the first lens and the second lens being aligned and the first focal length being about equal to the second focal length, the focal point of the first focal lens about coinciding with the focal point of the second lens, the light rays passing through the first lens and being focused at the focal points of the first and the second lenses and the light rays passing from the focal points of the first and the second lenses through the second lens and out the rear opening.

46. The illusion assembly of claim 45 further comprising:

a first hollow cone shaped opaque light housing having a first end and a second end, the first end of the first light housing being positioned adjacent the first lens and the first lens of the first light housing substantially encompassing the first end, the first light housing extending a distance into the container space terminating with the second end of the first light housing positioned at about the focal points of the first and the second lenses; and a second hollow cone shaped opaque light housing having a first end and a second end, the first end of the second light housing substantially encompassing the second lens, the second light housing extending a distance into the container space terminating with the second end of the second light housing positioned near the second end of the first light housing and positioned at about the focal points of the first and the second lenses, the first and the second light housing cooperating with portions of the container to form the retainer assembly and define the retaining space.

47. The illusion assembly of claim 10 wherein the front opening is defined further as comprising a plurality of spaced apart front openings, and wherein the rear opening is defined further as comprising a plurality of spaced apart rear openings, each front opening being aligned with one of the rear openings to form an aligned pair of front openings and rear openings, and wherein the illusion devices comprise:

a plurality of first lenses, each first lens being positioned in one of the front openings, each first lens having a focal point spaced a first focal length from the first lens, the first lenses cooperating to comprise the first transparent area;

a plurality of second lenses, each second lens being positioned in one of the rear openings, each second lens having a focal point spaced a second focal length from the second lens, the second lenses cooperating to define the second transparent area, each first lens being aligned with one of the second lenses to form an aligned pair of lenses and the first focal length and the second focal length of each aligned pair of lenses being about equal whereby the focal points of each pair of aligned lenses about coincide, light rays passing through each of the first lenses being focused at the focal points of the respective first and second lenses of each aligned pair of lenses and the light rays passing from the focal points through the respective second lenses of the aligned pair of lenses.

48. The illusion assembly of claim 17 further comprising:

a plurality of first hollow cone shaped opaque light housings, each first light housing having a first end and a second end, the first end of each of the first light housing being positioned adjacent one of the first lenses and the first end of the first light housing substantially encompassing one of the first lenses, each first light housing extending a distance into the container space terminating with the second end of the first light housing positioned at about the focal point of the respective first lens; and a plurality of second hollow cone shaped light housings, each second light housing having a first end and a second end, the first end of each of the second light housings substantially encompassing one of the second lenses, each of the second light housings extending a distance into the container space terminating with the second end of the second light housing positioned near the second end of one of the first light housings and positioned at about the focal point of the second lens, the first and the second light housings cooperating with portions of the container to form the retainer assembly and define the retaining space.

49. The illusion assembly of claim 1 wherein the container comprises a front and a rear, and wherein the illusion devices comprise:

a first lens disposed near the front of the container and the first lens comprising at least a portion of the first transparent area; and a second lens disposed near the rear of the container with the second lens being spaced a distance from the first lens and the second lens comprising at least a portion of the second transparent area, light passing through the first lens and passing from the first lens through the second lens.

50. The illusion assembly of claim 49 wherein each of the first and the second lenses is defined further as comprising a converging lens.

51. The illusion assembly of claim 50 wherein the first lens is a converging lens and the second lens is a diverging lens.

52. The illusion assembly of claim 10 wherein the front opening is defined further as comprising a plurality of front openings and wherein the rear opening is defined further as comprising a plurality of rear openings, and wherein the illusion devices further comprise:

a plurality of optical fibers, one end of each optical fiber being disposed in one of the front openings and the opposite end of each optical fiber being disposed in one of the rear openings, light passing from the front openings through the optical fibers and out the rear openings.

53. The illusion assembly of claim 52 wherein each front opening is aligned with one of the rear openings, and wherein each optical fiber extends from one of the front openings to the rear opening aligned therewith.

54. The illusion assembly of claim 1 wherein the illusion devices comprise:

a video camera disposed in the container space having a lens disposed near the front opening;

a display disposed in the rear opening with the display substantially encompassing the rear opening and comprising the second transparent area; and means interconnecting the video camera and the display whereby images received by the video camera are displayed on the display.

55. The illusion assembly of claim 1 wherein the illusion devices further comprise:

a first right triangle prism;

a second right triangle prism;

a third right triangle prism; and a fourth right triangle prism, the first right triangle prism, the second right triangle prism, the third right triangle prism and the fourth right triangle prism being positioned whereby light enters the first transparent areas and passes through the first right triangle prism wherein the light is reflected from the first right triangle prism to the second right triangle prism and wherein the light is passed through the second right triangle prism and reflected through the third right triangle prism, and wherein the light is passed through the third right triangle prism and reflected to the fourth right triangle prism and wherein the light is passed through the fourth right triangle prism and reflected out of the fourth right triangle prism and out through the second transparent area.

56. An illusion assembly comprising:

a floral grouping;

a container having a first transparent area and a second transparent area, the container at least partially encompassing a container space with at least a portion of the container space being disposed between the first transparent area and the second transparent area of the container;

a retainer assembly defining a retaining space with at least a portion of the retainer assembly being disposed between the first transparent area and the second transparent area, at least a portion of the floral grouping being disposed in the retaining space; and illusion devices for creating the illusion of seeing through the first transparent area, and through the second transparent area without seeing the portion of the retainer assembly disposed between the first transparent area and the second transparent area and without seeing any portion of the floral grouping disposed in the retainer assembly.

57. The illusion assembly of claim 56 wherein the illusion devices are selected from a group of illusion devices consisting of mirrors, lenses or prisms or combinations thereof.

58. The illusion assembly of claim 56 wherein the container is defined further as being formed of opaque material and wherein the floral grouping is opaque.

59. The illusion assembly of claim 56 wherein the front and the second transparent areas are aligned and spaced a distance apart.

60. The illusion assembly of claim 59 wherein the container is defined further as having a front and a rear, and wherein the first transparent area is on the front of the container and the second transparent area is on the rear of the container.

61. The illusion assembly of claim 56 wherein the container is defined further as having a top and a bottom, and wherein a retaining space opening is formed through the top of the container and extends a distance toward the bottom of the container forming the retaining space.

62. The illusion assembly of claim 60 wherein the first transparent area encompasses substantially the entire front of the container, and wherein the second transparent area encompasses substantially the entire rear of the container.

63. The illusion assembly of claim 56 wherein the illusion devices comprise:
- a first mirror positioned in the container space for receiving and reflecting light rays entering the first transparent area;
- a second mirror positioned in the container space for receiving light rays reflected from the first mirror and for reflecting the light rays received from the first mirror;
- a third mirror positioned in the container space for reflecting light rays out the second transparent area and for receiving light rays; and
- a fourth mirror positioned in the container space for receiving light rays reflected from the second mirror and for reflecting the light rays onto the third mirror, the light rays passing through the first transparent area and being reflected from the first mirror onto the second mirror and being reflected from the second mirror onto the fourth mirror and being reflected from the fourth mirror onto the third mirror and being reflected from the third mirror out through the second transparent area.

64. The illusion assembly of claim 56 wherein the container has a front, a rear, a top and a bottom, and wherein the first mirror further comprises a first end, a second end, a first side, and a second side, the first side of the first mirror being positioned near the front of the container and the first mirror extending at an angle of about forty five degrees from the front of the container, the first mirror extending at the angle of about forty five degrees in a direction from the top of the container a distance toward the bottom of the container; and wherein the second mirror further comprises a first end, a second end, a first side, and a second side, and wherein the first side of the second mirror is disposed near the front of the container and wherein the second mirror extends at an angle of about forty five degrees from the front of the container, the second mirror extending at the angle of about forty five degrees in a direction from the top of the container a distance toward the bottom of the container, the second mirror being disposed in a plane about parallel with the first mirror, the first side of the first mirror being aligned with and spaced a distance from the first side of the second mirror and the space between the first side of the first mirror and the first side of the second mirror cooperating to define the first transparent area; and wherein the third mirror further comprises a first end, a second end, a first side and a second side, and wherein the first side of the third mirror is disposed near the rear of the container and wherein the third mirror extends at an angle of about forty five degrees from the rear of the container with the third mirror extending at the angle of about forty five degrees in a direction from the top a distance toward the bottom of the container, the third mirror being disposed at an angle of about ninety degrees with respect to the first mirror, and the second side of the first mirror being disposed near the second side of the first mirror; and wherein the fourth mirror further comprises a first end, a second end, a first side and a second side, and wherein the fourth mirror extends at an angle from the rear of the container of about forty five degrees extending in a direction from the top of the container toward the bottom of the container, the first side of the fourth mirror being disposed near the rear of the container and the second side of the fourth mirror being disposed near the second side of the second mirror, the fourth mirror extending at an angle of about ninety degrees from the second mirror, the fourth mirror extending in a plane about parallel with the third mirror, the first side of the third mirror being aligned and spaced a distance from the first side of the fourth mirror and the space between the first side of the third mirror and the first side of the fourth mirror cooperating to define the second transparent area, the first and the third mirror cooperating with portions of the container to form the retainer assembly, the first side of the first mirror and the first side of the third mirror being disposed near the top of the container and the first side of the first mirror being spaced a distance from the first side of the third mirror and the first side of the first mirror and the first side of the third mirror cooperating to define the retaining space opening in the top of the container for providing access to the retaining space, a space between the first mirror and the third mirror cooperating to define the retaining space, the fourth mirror extending in a plane about parallel with the third mirror.

65. The illusion assembly of claim 64 wherein the first end of the first mirror is substantially aligned with the first end of the second mirror, the second end of the first mirror substantially aligned with the second end of the second mirror, the second side of the first mirror is substantially aligned with the second side of the second mirror, and wherein the first end of the third mirror substantially aligned with the first end of the fourth mirror, the second end of the third mirror being substantially aligned with the second end of the fourth mirror, and the second side of the third mirror substantially aligned with the second side of the fourth mirror, and wherein the first mirror is spaced a distance from the second mirror, and wherein the third mirror is spaced a distance from the fourth mirror.

66. The illusion assembly of claim 56 wherein the container further comprises:
- a front wall having a first end, a second end, a bottom and a top;
- a rear wall having a first end, a second end, a bottom and a top;

a first end wall having a first end, a second end, a bottom and a top;

a second end wall having a first end, a second end, a bottom and a top;

a bottom wall, the first end of the front wall being connected to the first end of the first end wall and the second end of the front wall being connected to the first end of the second end wall, the second end of the second end wall being connected to the second end of the rear wall and the first end of the rear wall being connected to the second end of the first end wall, and the bottoms of the front wall, the rear wall, the first end wall and the second end wall being connected to the bottom wall, and the front wall, the rear wall, the first end wall and the second end wall each extending a distance upwardly from the bottom wall terminating with the tops of the front wall, the rear wall, the first end wall and the second end wall and forming a top of the container, a front opening being formed through the front wall with the front opening defining the first transparent area and a rear opening being formed through the rear wall with the rear opening defining the second transparent area.

67. The illusion assembly of claim 66 wherein the illusion devices comprise:

a first mirror having a first end, second end, a first side and a second side, the first side of the first mirror being disposed near the front wall and the first mirror extending a distance angularly downwardly from the front wall in a direction toward the bottom wall at an angle of about forty five degrees with respect to the front wall;

a second mirror having a first end, a second end, a first side and a second side, the first side of the second mirror being disposed near the front wall and the first side of the first mirror being spaced a distance from the first side of the second mirror, and the second mirror extending at an angle in a direction downwardly from the front wall at an angle of about forty five degrees toward the bottom wall, the first mirror being disposed in a plane about parallel with the second mirror, and a space between the first side of the first mirror and the first side of the second mirror cooperating to define the first transparent area, light entering the first transparent area encountering the first mirror and being reflected downwardly onto the second mirror where the light is reflected from the second mirror generally toward the rear opening;

a third mirror having a first end, a second end, a first side and a second side, the first side of the third mirror being disposed near the rear wall, the third mirror extending at an angle of about forty five degrees from the rear wall a distance in a direction from the top toward the bottom wall, and the second side of the third mirror being disposed near the second side of the first mirror with the third mirror extending an angle of about ninety degrees from the first mirror; and a fourth mirror having a first end, a second end, a first side and a second side, the first side of the fourth mirror being disposed near the rear wall, the fourth mirror extending at an angle of about forty five degrees with respect to the rear wall downwardly in a direction from the top toward the bottom wall, the second side of the fourth mirror being disposed near the second side of the third mirror, and the fourth mirror extending at a plane about parallel with the third mirror, the fourth mirror extending at an angle about ninety degrees with respect to the second mirror, the first side of the third mirror being spaced a distance from the first side of the fourth mirror and the space between the first side of the third mirror and the first side of the fourth mirror cooperating to define the second transparent area, light reflected from the second mirror encountering the fourth mirror and being reflected onto the third mirror and reflected from the third mirror out the second transparent area.

68. The illusion assembly of claim 67 wherein the first side of the first mirror and the first side of the third mirror cooperate to form a retaining space opening in the top of the container providing access to the retaining space of the retaining assembly, the space between the first mirror and the third mirror cooperating to form the retaining space.

69. The illusion assembly of claim 68 wherein the first end of the first mirror is aligned with the first end of the second mirror, and wherein the second end of the first mirror is aligned with the second end of the second mirror, and wherein the first end of the third mirror is aligned with the first end of the fourth mirror, and wherein the second end of the third mirror is aligned with the second end of the fourth mirror.

70. The illusion assembly of claim 69 wherein the front wall further comprises a front opening formed through the front wall with the front opening comprising the first transparent area, and a rear opening formed through the rear wall comprising the second transparent area.

71. The illusion assembly of claim 70 wherein the front opening is defined further as being rectangularly shaped and having a first end, a second end, a first side and a second side, the first side of the first mirror being disposed near the first side of the front opening and the first mirror extending between the first end and the second end of the front opening, the first side of the second mirror being disposed near the second side of the front opening and the second mirror extending between the first end and the second end of the front opening, and wherein the rear opening is defined further as being rectangularly shaped having a first end, a second end, a first side and a second side, the first side of the third mirror being disposed near the first side of the rear opening and the third mirror extending between the first and the second ends of the rear opening, and the first side of the fourth mirror being disposed adjacent the second side of the rear opening and the fourth mirror extending between the first and the second ends of the rear opening.

72. The illusion assembly of claim 56 the container further comprises a front and a rear, and wherein the illusion devices further comprise:

a first mirror, a second mirror, a third mirror and a fourth mirror interconnected to form a generally square shaped mirror assembly with the mirror assembly being disposed between the first transparent area and the second transparent area;

a fifth mirror having a first end, a second end, a first side and a second side, the first side of the fifth mirror being positioned near the first transparent area and the fifth mirror extending at an angle of about forty five degrees from the front of the container and the fifth mirror extending in a plane about parallel with the first mirror and the fifth mirror being spaced a distance from the first mirror;

a sixth mirror having a first end, a second end, a first side and a second side, the second side of the sixth mirror being positioned near the second transparent area and the sixth mirror extending at an angle of about forty five degrees from the rear of the container, the first side of the sixth mirror being positioned near the second side of the fifth mirror and the sixth mirror extending at an angle of about ninety degrees with respect to the fifth mirror, the sixth mirror extending at a plane about parallel with the second mirror, and the sixth mirror being spaced a distance from the second mirror; and a seventh mirror having a first end, second end, a first side and a second side, the first side of the seventh mirror being positioned near the first transparent area, and the second mirror extending at an angle of about forty five degrees from the front of the container, the seventh mirror being spaced a distance from the fourth mirror and extending in a plane about parallel with the fourth mirror; and an eighth mirror having a first end, a second end, a first side and a second side, the second side of the eighth mirror being disposed near the second transparent area and the eighth mirror extending at an angle of about forty five degrees from the rear of the container, the first side of the eighth mirror being disposed near the second side of the seventh mirror, and the eighth mirror extending at an angle of about ninety degrees from the seventh mirror, the eighth mirror extending a plane about parallel with the third mirror and the eighth mirror being spaced a distance from the third mirror, whereby some of the light entering the first transparent area is reflected from the first mirror onto the fifth mirror and from the fifth mirror onto the sixth mirror and from the sixth mirror onto the second mirror and from the second mirror out the second transparent area, and some of the light entering the first transparent area is reflected from the fourth mirror onto the seventh mirror and reflected from the seventh mirror onto the eighth mirror and reflected from the eighth mirror onto the third mirror and reflected from the third mirror out of the second transparent area, the mirror assembly cooperating to form a portion of the retainer assembly and the space between the first mirror, the second mirror, the third mirror and the fourth mirror forming the retaining space.

73. The illusion assembly of claim 66 wherein the illusion devices further comprise:

a first mirror, a second mirror, a third mirror and a fourth mirror interconnected to form a generally rectangularly shaped mirror assembly with the mirror assembly being disposed between the front opening and the rear opening and extending generally between the top and the bottom wall of the container;

a fifth mirror having a first end, a second end, a first side and a second side, the first side of the fifth mirror being positioned near the front wall and near the front opening and the fifth mirror extending at an angle of about forty five degrees from the front wall and the fifth mirror extending in a plane about parallel with the first mirror and the fifth mirror being spaced a distance from the first mirror;

a sixth mirror having a first end, a second end, a first side and a second side, the second side of the sixth mirror being positioned near the rear opening and near the rear wall and the sixth mirror extending at an angle of about forty five degrees from the rear wall, the first side of the sixth mirror being positioned near the second side of the fifth mirror and the sixth mirror extending at an angle of about ninety degrees with respect to the fifth mirror, the sixth mirror extending in a plane about parallel with the second mirror, and the sixth mirror being spaced a distance from the second mirror;

a seventh mirror having a first end, a second end, a first side and a second side, the first side of the seventh mirror being positioned near the front opening and near the front wall, the second mirror extending at an angle of about forty five degrees from the front wall, the seventh mirror being spaced a distance from the fourth mirror and extending in a plane about parallel with the fourth mirror; and an eighth mirror having a first end, a second end, a first side and a second side, the second side of the eighth mirror being disposed near the rear wall and near the rear opening and the eighth mirror extending at an angle of about forty five degrees from the rear wall, the first side of the eighth mirror being disposed near the second side of the seventh mirror, and the eighth mirror extending at an angle of about ninety degrees from the seventh mirror, the eighth mirror extending in a plane about parallel with the third mirror and the eighth mirror being spaced a distance from the third mirror, whereby some of the light entering the front opening is reflected from the first mirror onto the fifth mirror and from the fifth mirror onto the sixth mirror and from the sixth mirror onto the second mirror and from the second mirror out the rear opening, and some of the light entering the front opening is reflected from the fourth mirror onto the seventh mirror and reflected from the seventh mirror onto the eighth mirror and reflected from the eighth mirror onto the third mirror and reflected from the third mirror out the rear opening, the mirror assembly cooperating to form a portion of the retainer assembly and the space between the first mirror, the second mirror, the third mirror and the fourth mirror forming the retaining space.

74. The illusion assembly of claim 56 wherein the illusion devices further comprise:

a front concave mirror having a focal point and being disposed about adjacent the first transparent area, an opening being formed through a central portion of the front concave mirror;

a rear concave mirror having a focal point and being disposed about adjacent the second transparent area, an opening being formed through a portion of the rear concave mirror;

a front convex mirror disposed near the focal point of the front concave mirror whereby the light entering the first transparent area is reflected from the front concave mirror and onto the front convex mirror and the light being reflected from the front convex mirror out the opening in the front concave mirror; and a rear convex mirror positioned near the focal point of the rear concave mirror, light being reflected through the first transparent area onto the front concave mirror and reflected from the front concave mirror onto the front convex mirror, the light being reflected from the front convex mirror through the opening in the front concave mirror and through the opening in rear concave mirror and onto the rear convex mirror, and the light being reflected from the rear convex mirror onto the rear concave mirror and the light being reflected from the rear concave mirror out the second transparent area, the front concave mirror being spaced a distance from the rear concave mirror and at least a portion of the space between the front concave mirror and the rear concave mirror cooperating to form a portion of the retaining space.

75. The illusion assembly of claim 74 wherein the opening in the front concave mirror is aligned with the opening in the rear concave mirror.

76. The illusion assembly of claim 74 wherein the container is defined further to include a front and a rear with a front opening being formed through the front of the container and a rear opening being formed through the rear of the container, the front opening being circularly shaped and defining the first transparent area, and the rear opening being circularly shaped and defining the second transparent area, and wherein the front concave mirror is defined further as having a circularly shaped front face with the front face of the front concave mirror being disposed about adjacent the front of the container and the front face of the front concave mirror substantially encompassing the front opening, and wherein the rear concave mirror is defined further as comprising a front face having a circular shape with the front face of the rear concave mirror being disposed near the rear of the container and the front face of the rear concave mirror substantially encompassing the rear opening.

77. The illusion assembly of claim 76 wherein the focal point of the front concave mirror is disposed in a plane about coplaner with the front of the container, and wherein the focal point of the rear concave mirror is disposed in a plane about coplaner with the rear of the container.

78. The illusion assembly of claim 74 further comprising:
an opaque light tube having a first end and a second end, the first end of the light tube being connected to the front concave mirror and the light tube encompassing the opening in the front concave mirror, and the second end of the light tube being connected to the rear concave mirror with the second end of the light tube encompassing the opening in the rear concave mirror, the light tube extending between the front concave mirror and the rear concave mirror, the light reflected from the front convex mirror traveling through the light tube and onto the rear convex mirror, a portion of the light tube cooperating with a portion of the front concave mirror and a portion of the rear concave mirror to form the retainer assembly.

79. The illusion assembly of claim 66 wherein the front opening is defined further as being circularly shaped and the rear opening is defined further as being circularly shaped, and wherein the illusion devices further comprise:
a front concave mirror having a focal point and being disposed near the front wall of the container and substantially encompassing the front opening in the container, an opening being formed through a portion of the front concave mirror;
a rear concave mirror having a focal point and being disposed near the rear wall of the container with the rear concave mirror substantially encompassing the rear opening of the container, an opening being formed through a portion of the rear concave mirror;
a front convex mirror disposed near the focal point of the front concave mirror whereby the light entering the front opening is reflected from the front concave mirror and onto the front convex mirror and the light being reflected from the front convex mirror out the opening in the front concave mirror; and
a rear convex mirror positioned near the focal point of the rear convex mirror, light being reflected through the front opening onto the front convex mirror and reflected from the front convex mirror onto the front convex mirror, the light being reflected from the front convex mirror through the opening in the front concave mirror and through the opening in rear concave mirror and onto the rear convex mirror, and the light being reflected from the rear convex mirror onto the rear concave mirror and the light being reflected from the rear concave mirror out the rear opening, the front concave mirror being spaced a distance from the rear concave mirror and at least a portion of the space between the front concave mirror and the rear concave mirror cooperating to form a portion of the retaining space.

80. The illusion assembly of claim 79 further comprising:
an opaque light tube having a first end and a second end, the first end of the light tube being connected to the front concave mirror and the light tube encompassing the opening in the front concave mirror, and the second end of the light tube being connected to the rear concave mirror with the second end of the light tube encompassing the opening in the rear concave mirror, the light tube extending between the front concave mirror and the rear concave mirror, the light reflected from the front convex mirror traveling through the light tube and onto the rear convex mirror, a portion of the light tube cooperating with a portion of the front concave mirror and a portion of the rear concave mirror to form the retainer assembly.

81. The illusion assembly of claim 79 wherein the opening in the front concave mirror is aligned with the opening in the rear concave mirror.

82. The illusion assembly of claim 79 wherein the container is defined further to include a front and a rear with a front opening being formed through the front of the container and a rear opening being formed through the rear of the container, the front opening being circularly shaped and defining the first transparent area, in the rear opening being circularly shaped and defining the second transparent area, and wherein the front concave mirror is defined further as having a circularly shaped front face with the front face of the front concave mirror being disposed adjacent the front of the container and the front face of the front concave mirror substantially encompassing the front opening, and wherein the rear concave mirror is defined further as comprising a front face having a circular shape with the front face of the rear concave mirror being disposed near the rear of the container and the front face of the rear concave mirror substantially encompassing the rear opening.

83. The illusion assembly of claim 82 wherein the focal point of the front concave mirror is disposed in a plane about coplaner with the front of the container, and wherein the focal point of the rear concave mirror is disposed in a plane about coplaner with the rear of the container.

84. The illusion assembly of claim 56 wherein the container has a front and a rear, and wherein the illusion devices further comprise:
   a first total reflection prism having a front face, a bottom face and a rear face, the front face being disposed near the first transparent area;
   a second total reflection prism having a front face, a bottom face and a rear face, the front face being positioned near the second transparent area; and
   a Porro prism having a first rear face, a second rear face and a front face, the first and the second total reflection prisms and the Porro prism being positioned in the container whereby at least some of the light is passed through the first transparent area and through the front face of the first total reflection prism onto the rear face of the first total reflection prism, the light being reflected from the rear face of the first total reflection prism onto the front face of the Porro prism, the light being passed from the front face of the Porro prism through the Porro prism and onto the first rear face of the Porro prism, the light being reflected from the first rear face of the Porro prism through the Porro prism and onto the second rear face of the Porro prism, and the light being reflected from the second rear face of the Porro prism through the Porro prism and through the front face of the Porro prism and through the bottom face of the second total reflection prism and through the second total reflection prism onto the rear face of the second total reflection prism and the light being reflected from the rear face of the second total reflection prism through the second total reflection prism and out through the front face of the second total reflection prism and out through the second transparent area.

85. The illusion assembly of claim 84 wherein the front face of the Porro prism extends between the first transparent area and the second transparent area and is disposed in a plane about parallel with the bottom faces of the first and the second total reflection prisms, the first rear face of the Porro prism extending at an angle of about forty five degrees with respect to the front of the container about forty five degrees with respect to the front face of the Porro prism, and the second rear face of the Porro prism extending at an angle of about forty five degrees with respect to the rear of the container and at an angle of about ninety degrees with respect to the first rear face of the Porro prism and the second rear face of the Porro prism extending at an angle of about forty five degrees with respect to the front face of the Porro prism.

86. The illusion assembly of claim 85 wherein the rear face of the first total reflection prism extends at an angle of about forty five degrees with respect to the front of the container and at an angle of about forty five degrees with respect to the front face of the first total reflection prism and at an angle of about forty five degrees with respect to the bottom face of the first total reflection prism, and wherein the front face of the first total reflection prism extends at an angle of about ninety degrees with respect to the bottom face of the first total reflection prism, the front face of the first total reflection prism being disposed adjacent the first transparent area and comprising a portion of the first transparent area, and wherein the rear face of the second total reflection prism extends at an angle of about forty five degrees with respect to the front face of the second total reflection prism and at an angle of about forty five degrees with respect to the bottom face of the second total reflection prism, and the front face of the second total reflection prism extends at an angle of about ninety degrees with respect to the bottom face of the second total reflection prism, the front face of the second total reflection prism being disposed adjacent the second transparent area and comprising a portion of the second transparent area, the bottom faces of the first and the second total reflection prisms extending in a coplaner disposition and the bottom faces of the first and the second total reflection prisms extending in a plane about parallel with the front face of the Porro prism.

87. The illusion assembly of claim 86 wherein the bottom faces of the first and the second total reflection prisms are spaced a distance from the front face of the Porro prism, and wherein some of the light passes through a portion of the first transparent area and through the space between the first and the second total reflection prisms and the Porro prism and out the second transparent area, a portion of the space between the first and the second total reflection prisms and the Porro prism comprising a portion of the first transparent area and a portion of the space between the first and the second total reflection prisms and the Porro prism comprising a portion of the second transparent area.

88. The illusion assembly of claim 87 wherein one end of the rear face of the first total reflection prism is disposed near one end of the rear face of the second total reflection prism, and the rear face of the first total reflection prism extends at an angle of about ninety degrees with respect to the rear face of the second total reflection prism.

89. The illusion assembly of claim 66 wherein the illusion devices further comprise:
   a first total reflection prism having a front face, a bottom face and a rear face, the front face being disposed adjacent the front opening in the container and the front face comprising a portion of the front opening in the container;
   a second total reflection prism having a front face, a bottom face and a rear face, the front face being positioned adjacent the rear opening in the container; and
   a Porro prism having a first rear face, a second rear face, and a front face, the first and the second total reflection prisms and the Porro prism being positioned in the container whereby at least some of the light is passed through the front opening in the container and through the front face of the first total reflection prism onto the rear face of the first total reflection prism, the light being reflected from the rear face of the first total reflection prism onto the front face of the Porro prism, the light being passed from the front face of the Porro prism through the Porro prism and onto the first rear face of the Porro prism, the light being reflected from the first rear face of the Porro prism through the Porro prism and onto the second rear face of the Porro prism, and the light being reflected from the second rear face of the Porro prism through the Porro prism and through the front face of the Porro prism and through the bottom face of the second total reflection prism and through the second total reflection prism onto the rear face of the second total reflection prism and the light being reflected from the rear face of the second total reflection prism through the second total reflection prism and out through the front face of the second total reflection prism and out through the front opening in the container.

90. The illusion assembly of claim 89 wherein the front face of the Porro prism extends between the first transparent area and the second transparent area and is disposed in a plane about parallel with the bottom faces of the first and the second total reflection prisms, the first rear face of the Porro prism extending at an angle of about forty five degrees with respect to the front of the container about forty five degrees with respect to the front face of the Porro prism, and the second rear face of the Porro prism extending at an angle of about forty five degrees with respect to the rear of the container and at an angle of about ninety degrees with respect to the first rear face of the Porro prism and the second rear face of the Porro prism extending at an angle of about forty five degrees with respect to the front face of the Porro prism.

91. The illusion assembly of claim 90 wherein the rear face of the first total reflection prism extends at an angle of about forty five degrees with respect to the front of the container and at an angle of about forty five degrees with respect to the front face of the first total reflection prism and at an angle of about forty five degrees with respect to the bottom face of the first total reflection prism, and wherein the front face of the first total reflection prism extends at an angle of about ninety degrees with respect to the bottom face of the first total reflection prism, the front face of the first total reflection prism being disposed about adjacent the first transparent area and comprising a portion of the first transparent area, and wherein the rear face of the second total reflection prism extends at an angle of about forty five degrees with respect to the front face of the second total reflection prism and at an angle of about forty five degrees with respect to the bottom face of the second total reflection prism, and the front face of the second total reflection prism extends at an angle of about ninety degrees with respect to the bottom face of the second total reflection prism, the front face of the second total reflection prism being disposed adjacent the second transparent area and comprising a portion of the second transparent area, the bottom faces of the first and the second total reflection prisms extending in a coplaner disposition and the bottom faces of the first and the second total reflection prisms extending in a plane about parallel with the front face of the Porro prism.

92. The illusion assembly of claim 91 wherein the bottom faces of the first and the second total reflection prisms are spaced a distance from the front face of the Porro prism, and wherein some of the light passes through a portion of the first transparent area and through the space between the first and the second total reflection prisms and the Porro prism and out the second transparent area.

93. The illusion assembly of claim 92 wherein one end of the rear face of the first total reflection prism is disposed near one end of the rear face of the second total reflection prism and the rear face of the first total reflection prism extends at an angle of about ninety degrees with respect to the rear face of the second total reflection prism, a portion of the space between the first and the second total reflection prisms and the Porro prism comprising a portion of the first transparent area and a portion of the space between the first and the second total reflection prisms and the Porro prism comprising a portion of the second transparent area.

94. The illusion assembly of claim 56 wherein the illusion devices comprise:
   a Dove prism having a front wall, a rear wall, a first end wall, a second end wall, a bottom wall and a top, the top extending in a plane about parallel with the bottom wall, the front wall extending between the bottom wall and the top at an angle of about forty five degrees from the bottom wall and the front wall being angled generally toward the rear wall, the rear wall being spaced a distance from the front wall, and the rear wall extending between the bottom wall and the top and the rear wall extending from the bottom wall generally toward the front wall at an angle of about forty five degrees with respect to the bottom wall, the light rays entering the front wall and being reflected in the Dove prism and reflected out the rear wall.

95. The illusion assembly of claim 94 wherein the Dove prism is defined further as comprising at least a portion of the container, the retaining space being formed in the top of the Dove prism and extending a distance through the Dove prism toward the bottom wall of the Dove prism, the retaining space being positioned so that the light rays reflected in the Dove prism do not pass through the retaining space.

96. The illusion assembly of claim 94 wherein the Dove prism is defined further as having the first end wall angled from the bottom wall to the top and toward the second end wall at an angle of about forty five degrees with respect to the bottom wall and having the second end wall extending between the bottom wall and the top at an angle of about forty five degrees with respect to the bottom wall and extending generally toward the first end wall.

97. The illusion assembly of claim 56 wherein the illusion devices comprise:
   a pair of Dove prisms, each Dove prism having a front wall, a rear wall, a first end wall, a second end wall, a bottom wall and a top, the top extending in a plane about parallel with the bottom wall, the front wall extending between the bottom wall and the top at an angle of about forty five degrees from the bottom wall, and the front wall being angled generally toward the rear wall, the rear wall being spaced a distance from the front wall and extending between the bottom wall and the top and the rear wall extending from the bottom wall generally toward the front wall at an angle of about forty five degrees with respect to the bottom wall, the light rays entering the front wall and being reflected in the Dove prism and reflected out the rear wall, the rear wall of one of the Dove prisms being disposed near the front wall of the other Dove prism and positioned so that the light rays passing from the rear wall of the one Dove prism enter the front wall of the other Dove prism and are reflected within the other Dove prism and out the rear wall of the other Dove prism.

98. The illusion assembly of claim 97 wherein each Dove prism comprises at least a portion of the container and wherein the retaining space is defined further to comprise a retaining space formed in the top of each of the Dove prisms with each retaining space being positioned in the respective Dove prism so that the light rays passing through the respective Dove prisms do not pass through the retaining space in that Dove prism.

99. The illusion assembly of claim 56 wherein the illusion devices comprise:
- a first lens having a focal point spaced a first focal length from the first lens, the first lens being disposed about adjacent the first transparent area, the first lens comprising at least a portion of the first transparent area; and
- a second lens having a focal point spaced a second focal length from the second lens with the second lens being disposed about adjacent the second transparent area, and with the second lens comprising at least a portion of the second transparent area, the first lens and the second lens being aligned and the first focal length being about equal to the second focal length, the focal point of the first lens about coinciding with the focal point of the second lens, the light rays passing through the first transparent area and through the first lens and being focused at the focal points of the first and second lenses and the light passing from the focal points of the first and the second lenses through the second lens and out the second transparent area.

100. The illusion assembly of claim 99 further comprising:
- a first hollow cone shaped opaque light housing having a first end and a second end, the first end of the first light housing being positioned adjacent the first lens and the first lens of the first light housing substantially encompassing the first end, the first light housing extending a distance into the container space terminating with the second end of the first light housing positioned at about the focal points of the first and the second lenses; and
- a second hollow cone shaped opaque light housing having a first end and a second end, the first end of the second light housing substantially encompassing the second lens, the second light housing extending a distance into the container space terminating with the second end of the second light housing positioned near the second end of the first light housing and positioned at about the focal points of the first and the second lenses, the first and the second light housing cooperating with portions of the container to form the retainer assembly and define the retaining space.

101. The illusion of claim 66 wherein the illusion devices comprise:
- a first lens having a first focal point spaced a first focal length from the first lens, the first lens being disposed in the front opening in the front wall and the first lens substantially encompassing the front opening, the first lens comprising at least a portion of the first transparent area; and
- a second lens having a focal point spaced a second focal length from the second lens with the second lens being disposed in the rear opening in the rear wall and substantially encompassing the rear opening, the second lens comprising at least a portion of the second transparent area, the first lens and the second lens being aligned and the first focal length being about equal to the second focal length, the focal point of the first focal lens about coinciding with the focal point of the second lens, the light rays passing through the first lens and being focused at the focal points of the first and the second lenses and the light rays passing from the focal points of the first and the second lenses through the second lens and out the rear opening.

102. The illusion assembly of claim 101 further comprising:
- a first hollow cone shaped opaque light housing having a first end and a second end, the first end of the first light housing being positioned adjacent the first lens and the first lens of the first light housing substantially encompassing the first end, the first light housing extending a distance into the container space terminating with the second end of the first light housing positioned at about the focal points of the first and the second lenses; and
- a second hollow cone shaped opaque light housing having a first end and a second end, the first end of the second light housing substantially encompassing the second lens, the second light housing extending a distance into the container space terminating with the second end of the second light housing positioned near the second end of the first light housing and positioned at about the focal points of the first and the second lenses, the first and the second light housing cooperating with portions of the container to form the retainer assembly and define the retaining space.

103. The illusion assembly of claim 66 wherein the front opening is defined further as comprising a plurality of spaced apart front openings, and wherein the rear opening is defined further as comprising a plurality of spaced apart rear openings, each front opening being aligned with one of the rear openings to form an aligned pair of front openings and rear openings, and wherein the illusion devices comprise:
- a plurality of first lenses, each first lens being positioned in one of the front openings, each first lens having a focal point spaced a first focal length from the first lens, the first lenses cooperating to comprise the first transparent area;
- a plurality of second lenses, each second lens being positioned in one of the rear openings, each second lens having a focal point spaced a second focal length from the second lens, the second lenses cooperating to define the second transparent area, each first lens being aligned with one of the second lenses to form an aligned pair of lenses and the first focal length and the second focal length of each aligned pair of lenses being about equal whereby the focal points of each pair of aligned lenses about coincide, light rays passing through each of the first lenses being focused at the focal points of the respective first and second lenses of each aligned pair of lenses and the light rays passing from the focal points through the respective second lenses of the aligned pair of lenses.

104. The illusion assembly of claim 73 further comprising:
- a plurality of first hollow cone shaped opaque light housings, each first light housing having a first end and a second end, the first end of each of the first light housing being positioned adjacent one of the first lenses and the first end of the first light housing substantially encompassing one of the first lenses, each first light housing extending a distance into the container space terminating with the second end of the first light housing positioned at about the focal point of the respective first lens; and a plurality of second hollow cone shaped light housings, each second light housing having a first end and a second end, the first end of each of the second light housings substantially encompassing one of the second lenses, each of the second light housings extending a distance into the container space terminating with the second end of the second light housing positioned near the second end of one of the first light housings and positioned at about the focal point of the second lens, the first and the second light housings cooperating with portions of the container to form the retainer assembly and define the retaining space.

105. The illusion assembly of claim 56 wherein the container comprises a front and a rear, and wherein the illusion devices comprise:

a first lens disposed near the front of the container and the first lens comprising at least a portion of the first transparent area; and a second lens disposed near the rear of the container with the second lens being spaced a distance from the first lens and the second lens comprising at least a portion of the second transparent area, light passing through the first lens and passing from the first lens through the second lens.

106. The illusion assembly of claim 104 wherein each of the first and the second lenses is defined further as comprising a converging lens.

107. The illusion assembly of claim 105 wherein the first lens if a converging lens and the second lens is a diverging lens.

108. The illusion assembly of claim 106 wherein the front opening is defined further as comprising a plurality of front openings and wherein the rear opening is defined further as comprising a plurality of rear openings, and wherein the illusion devices further comprise:

a plurality of optical fibers, one end of each optical fiber being disposed in one of the front openings and the opposite end of each optical fiber being disposed in one of the rear openings, light passing from the front openings through the optical fibers and out the rear openings.

109. The illusion assembly of claim 66 wherein each front opening is aligned with one of the rear openings, and wherein each optical fiber extends from one of the front openings to the rear opening aligned therewith.

110. The illusion assembly of claim 109 wherein the illusion devices comprise:

a video camera disposed in the container space having a lens disposed near the front opening;

a display disposed in the rear opening with the display substantially encompassing the rear opening and comprising the second transparent area; and means interconnecting the video camera and the display whereby images received by the video camera are displayed on the display.

111. The illusion assembly of claim 56 wherein the illusion devices further comprise:

a first right triangle prism;
a second right triangle prism;
a third right triangle prism; and
a fourth right triangle prism, the first right triangle prism, the second right triangle prism, the third right triangle prism and the fourth right triangle prism being positioned whereby light enters the first transparent areas and passes through the first right triangle prism wherein the light is reflected from the first right triangle prism to the second right triangle prism and wherein the light is passed through the second right triangle prism and reflected through the third right triangle prism, and wherein the light is passed through the third right triangle prism and reflected to the fourth right triangle prism and wherein the light is passed through the fourth right triangle prism and reflected out of the fourth right triangle prism and out through the second transparent area.

112. A method comprising:

providing an item;

providing an illusion assembly comprising a container having a first transparent area and a second transparent area, the container at least partially encompassing a container space disposed between the first transparent area and the second transparent area of the container, the container having a retaining space opening formed through a portion of the container a retainer assembly defining a retaining space with at least a portion of the retainer assembly being disposed between the first transparent area and the second transparent area; and illusion means for enabling an individual to look through the first transparent area, and through the second transparent area without the individual seeing any portion of the retainer assembly disposed between the first transparent area and the second transparent area;

disposing at least a portion of the item through the retaining space opening into the retaining space; and looking, by the individual, through the first transparent area and seeing the illusion created by the illusion means of looking through the second transparent area without the individual seeing the portion of the retainer assembly disposed between the first transparent area and the second transparent area and without seeing the portion of the item disposed in the retaining space.

113. The method of claim 112 wherein the step of providing the illusion assembly is defined further as providing the illusion assembly with the illusion means selected from a group of illusion means consisting of mirrors, lenses, prisms and combinations thereof.

114. The method of claim 112 wherein the step of providing the illusion assembly is defined further as providing the illusion assembly with the container being defined further as being formed of opaque material and wherein the item is opaque.

115. The method of claim 112 wherein the step of providing the illusion assembly is defined further as providing the illusion assembly with the first and the second transparent areas being aligned and spaced a distance apart.

116. The method of claim 115 wherein the step of providing the illusion assembly is defined further as providing the illusion assembly with the container being defined further as having a front and a rear, and wherein the first transparent area is on the front of the container and the second transparent area is on the rear of the container.

117. The method of claim 116 wherein the step of providing the illusion assembly is defined further as providing the illusion assembly with the first transparent area encompassing substantially the entire front of the container, and wherein the second transparent area encompasses substantially the entire rear of the container.

118. The method of claim 112 wherein the step of providing the illusion assembly is defined further as providing the illusion assembly with the illusion devices comprising a first mirror positioned in the container space for receiving and reflecting light rays entering the first transparent area; a second mirror positioned in the container space for receiving light rays reflected from the first mirror and for reflecting the light rays received from the first mirror; a third mirror positioned in the container space for reflecting light rays out the second transparent area and for receiving light rays; and a fourth mirror positioned in the container space for receiving light rays reflected from the second mirror and for reflecting the light rays onto the third mirror, the light rays passing through the first transparent area and being reflected from the first mirror onto the second mirror and being reflected from the second mirror onto the fourth mirror and being reflected from the fourth mirror onto the third mirror and being reflected from the third mirror out through the second transparent area.

119. The method of claim 112 wherein the step of providing the illusion assembly is defined further as providing the illusion assembly with the container having a front, a rear, a top and a bottom, and wherein the first mirror further comprises a first end, a second end, a first side, and a second side, the first side of the first mirror being positioned near the front of the container and the first mirror extending at an angle of about forty five degrees from the front of the container, the first mirror extending at the angle of about forty five degrees in a direction from the top of the container a distance toward the bottom of the container; and wherein the second mirror further comprises a first end, a second end, a first side, and a second side, and wherein the first side of the second mirror is disposed near the front of the container and wherein the second mirror extends at an angle of about forty five degrees from the front of the container, the second mirror extending at the angle of about forty five degrees in a direction from the top of the container a distance toward the bottom of the container, the second mirror being disposed in a plane about parallel with the first mirror, the first side of the first mirror being aligned with and spaced a distance from the first side of the second mirror and the space between the first side of the first mirror and the first side of the second mirror cooperating to define the first transparent area; and wherein the third mirror further comprises a first end, a second end, a first side and a second side, and wherein the first side of the third mirror is disposed near the rear of the container and wherein the third mirror extends at an angle of about forty five degrees from the rear of the container with the third mirror extending at the angle of about forty five degrees in a direction from the top a distance toward the bottom of the container, the third mirror being disposed at an angle of about ninety degrees with respect to the first mirror, and the second side of the first mirror being disposed near the second side of the first mirror; and wherein the fourth mirror further comprises a first end, a second end, a first side and a second side, and wherein the fourth mirror extends at an angle from the rear of the container of about forty five degrees extending in a direction from the top of the container toward the bottom of the container, the first side of the fourth mirror being disposed near the rear of the container and the second side of the fourth mirror being disposed near the second side of the second mirror, the fourth mirror extending at an angle of about ninety degrees from the second mirror, the fourth mirror extending in a plane about parallel with the third mirror, the first side of the third mirror being aligned and spaced a distance from the first side of the fourth mirror and the space between the first side of the third mirror and the first side of the fourth mirror cooperating to define the second transparent area, the first and the third mirror cooperating with portions of the container to form the retainer assembly, the first side of the first mirror and the first side of the third mirror being disposed near the top of the container and the first side of the first mirror being spaced a distance from the first side of the third mirror and the first side of the first mirror and the first side of the third mirror cooperating to define the retaining space opening in the top of the container for providing access to the retaining space, a space between the first mirror and the third mirror cooperating to define the retaining space, the fourth mirror extending in a plane about parallel with the third mirror.

120. The method of claim 119 wherein the step of providing the illusion assembly is defined further as providing the illusion assembly with the first end of the first mirror being substantially aligned with the first end of the second mirror, the second end of the first mirror substantially aligned with the second end of the second mirror, the second side of the first mirror being substantially aligned with the second side of the second mirror, and wherein the first end of the third mirror is substantially aligned with the first end of the fourth mirror, the second end of the third mirror being substantially aligned with the second end of the fourth mirror, and the second side of the third mirror being substantially aligned with the second side of the fourth mirror, and wherein the first mirror is spaced a distance from the second mirror, and wherein the third mirror is spaced a distance from the fourth mirror.

121. The method of claim 112 wherein the step of providing the illusion assembly is defined further as providing the illusion assembly with the container further comprising a front wall having a first end, a second end, a bottom and a top; a rear wall having a first end, a second end, a bottom and a top; a first end wall having a first end, a second end, a bottom and a top; a second end wall having a first end, a second end, a bottom and a top; a bottom wall, the first end of the front wall being connected to the first end of the first end wall and the second end of the front wall being connected to the first end of the second end wall, the second end of the second end wall being connected to the second end of the rear wall and the first end of the rear wall being connected to the second end of the first end wall, and the bottoms of the front wall, the rear wall, the first end wall and the second end wall being connected to the bottom wall, and the front wall, the rear wall, the first end wall and the second end wall each extending a distance upwardly from the bottom wall terminating with the tops of the front wall, the rear wall, the first end wall and the second end wall and forming a top of the container, a front opening being formed through the front wall with the front opening defining the first transparent area and a rear opening being formed through the rear wall with the rear opening defining the second transparent area.

122. The method of claim 121 wherein the step of providing the illusion assembly is defined further as providing the illusion assembly with the illusion devices comprising a first mirror having a first end, second end, a first side and a second side, the first side of the first mirror being disposed near the front wall and the first mirror extending a distance angularly downwardly from the front wall in a direction toward the bottom wall at an angle of about forty five degrees with respect to the front wall; a second mirror having a first end, a second end, a first side and a second side, the first side of the second mirror being disposed near the front wall and the first side of the first mirror being spaced a distance from the first side of the second mirror, and the second mirror extending at an angle in a direction downwardly from the front wall at an angle of about forty five degrees toward the bottom wall, the first mirror being disposed in a plane about parallel with the second mirror, and a space between the first side of the first mirror and the first side of the second mirror cooperating to define the first transparent area, light entering the first transparent area encountering the first mirror and being reflected downwardly onto the second mirror where the light is reflected from the second mirror generally toward the rear opening; a third mirror having a first end, a second end, a first side and a second side, the first side of the third mirror being disposed near the rear wall, the third mirror extending at an angle of about forty five degrees from the rear wall a distance in a direction from the top toward the bottom wall, and the second side of the third mirror being disposed near the second side of the first mirror with the third mirror extending an angle of about ninety degrees from the first mirror; and a fourth mirror having a first end, a second end, a first side and a second side, the first side of the fourth mirror being disposed near the rear wall, the fourth mirror extending at an angle of about forty five degrees with respect to the rear wall downwardly in a direction from the top toward the bottom wall, the second side of the fourth mirror being disposed near the second side of the third mirror, and the fourth mirror extending at a plane about parallel with the third mirror, the fourth mirror extending at an angle about ninety degrees with respect to the second mirror, the first side of the third mirror being spaced a distance from the first side of the fourth mirror and the space between the first side of the third mirror and the first side of the fourth mirror cooperating to define the second transparent area, light reflected from the second mirror encountering the fourth mirror and being reflected onto the third mirror and reflected from the third mirror out the second transparent area.

123. The method of claim 122 wherein the step of providing the illusion assembly is defined further as providing the illusion assembly with the first side of the first mirror and the first side of the third mirror cooperating to form a retaining space opening in the top of the container providing access to the retaining space of the retaining assembly, the space between the first mirror and the third mirror cooperating to form the retaining space.

124. The method of claim 123 wherein the step of providing the illusion assembly is defined further as providing the illusion assembly with the first end of the first mirror is aligned with the first end of the second mirror, and wherein the second end of the first mirror is aligned with the second end of the second mirror, and wherein the first end of the third mirror is aligned with the first end of the fourth mirror, and wherein the second end of the third mirror is aligned with the second end of the fourth mirror.

125. The method of claim 124 wherein the step of providing the illusion assembly is defined further as providing the illusion assembly with the front wall further comprising a front opening formed through the front wall with the front opening comprising the first transparent area, and a rear opening formed through the rear wall comprising the second transparent area.

126. The method of claim 125 wherein the step of providing the illusion assembly is defined further as providing the illusion assembly with the front opening being defined further as being rectangularly shaped and having a first end, a second end, a first side and a second side, the first side of the first mirror being disposed near the first side of the front opening and the first mirror extending between the first end and the second end of the front opening, the first side of the second mirror being disposed near the second side of the front opening and the second mirror extending between the first end and the second end of the front opening, and wherein the rear opening is defined further as being rectangularly shaped having a first end, a second end, a first side and a second side, the first side of the third mirror being disposed near the first side of the rear opening and the third mirror extending between the first and the second ends of the rear opening, and the first side of the fourth mirror being disposed adjacent the second side of the rear opening and the fourth mirror extending between the first and the second ends of the rear opening.

127. The method of claim 112 wherein the step of providing the illusion assembly is defined further as providing the illusion assembly with the container further comprising a front and a rear, and the illusion means further comprising a first mirror, a second mirror, a third mirror and a fourth mirror interconnected to form a generally square shaped mirror assembly with the mirror assembly being disposed between the first transparent area and the second transparent area; a fifth mirror having a first end, a second end, a first side and a second side, the first side of the fifth mirror being positioned near the first transparent area and the fifth mirror extending at an angle of about forty five degrees from the front of the container and the fifth mirror extending in a plane about parallel with the first mirror and the fifth mirror being spaced a distance from the first mirror; a sixth mirror having a first end, a second end, a first side and a second side, the second side of the sixth mirror being positioned near the second transparent area and the sixth mirror extending at an angle of about forty five degrees from the rear of the container, the first side of the sixth mirror being positioned near the second side of the fifth mirror and the sixth mirror extending at an angle of about ninety degrees with respect to the fifth mirror, the sixth mirror extending at a plane about parallel with the second mirror, and the sixth mirror being spaced a distance from the second mirror; and a seventh mirror having a first end, second end, a first side and a second side, the first side of the seventh mirror being positioned near the first transparent area, and the second mirror extending at an angle of about forty five degrees from the front of the container, the seventh mirror being spaced a distance from the fourth mirror and extending in a plane about parallel with the fourth mirror; and an eighth mirror having a first end, a second end, a first side and a second side, the second side of the eighth mirror being disposed near the second transparent area and the eighth mirror extending at an angle of about forty five degrees from the rear of the container, the first side of the eighth mirror being disposed near the second side of the seventh mirror, and the eighth mirror extending at an angle of about ninety degrees from the seventh mirror, the eighth mirror extending in a plane about parallel with the third mirror and the eighth mirror being spaced a distance from the third mirror, whereby some of the light entering the first transparent area is reflected from the first mirror onto the fifth mirror and from the fifth mirror onto the sixth mirror and from the sixth mirror onto the second mirror and from the second mirror out the second transparent area, and some of the light entering the first transparent area is reflected from the fourth mirror onto the seventh mirror and reflected from the seventh mirror onto the eighth mirror and reflected from the eighth mirror onto the third mirror and reflected from the third mirror out of the second transparent area, the mirror assembly cooperating to form a portion of the retainer assembly and the space between the first mirror, the second mirror, the third mirror and the fourth mirror forming the retaining space.

128. The method of claim 112 wherein the step of providing the illusion assembly is defined further as providing the illusion assembly with the illusion means further comprising a first mirror, a second mirror, a third mirror and a fourth mirror interconnected to form a generally rectangularly shaped mirror assembly with the mirror assembly being disposed between the front opening and the rear opening and extending generally between the top and the bottom wall of the container; a fifth mirror having a first end, a second end, a first side and a second side, the first side of the fifth mirror being positioned near the front wall and near the front opening and the fifth mirror extending at an angle of about forty five degrees from the front wall and the fifth mirror extending in a plane about parallel with the first mirror and the fifth mirror being spaced a distance from the first mirror; a sixth mirror having a first end, a second end, a first side and a second side, the second side of the sixth mirror being positioned near the rear opening and near the rear wall and the sixth mirror extending at an angle of about forty five degrees from the rear wall, the first side of the sixth mirror being positioned near the second side of the fifth mirror and the sixth mirror extending at an angle of about ninety degrees with respect to the fifth mirror, the sixth mirror extending in a plane about parallel with the second mirror, and the sixth mirror being spaced a distance from the second mirror; a seventh mirror having a first end, a second end, a first side and a second side, the first side of the seventh mirror being positioned near the front opening and near the front wall, the second mirror extending at an angle of about forty five degrees from the front wall, the seventh mirror being spaced a distance from the fourth mirror and extending in a plane about parallel with the fourth mirror; and an eighth mirror having a first end, a second end, a first side and a second side, the second side of the eighth mirror being disposed near the rear wall and near the rear opening and the eighth mirror extending at an angle of about forty five degrees from the rear wall, the first side of the eighth mirror being disposed near the second side of the seventh mirror, and the eighth mirror extending at an angle of about ninety degrees from the seventh mirror, the eighth mirror extending in a plane about parallel with the third mirror and the eighth mirror being spaced a distance from the third mirror, whereby some of the light entering the front opening is reflected from the first mirror onto the fifth mirror and from the fifth mirror onto the sixth mirror and from the sixth mirror onto the second mirror and from the second mirror out the rear opening, and some of the light entering the front opening is reflected from the fourth mirror onto the seventh mirror and reflected from the seventh mirror onto the eighth mirror and reflected from the eighth mirror onto the third mirror and reflected from the third mirror out the rear opening, the mirror assembly cooperating to form a portion of the retainer assembly and the space between the first mirror, the second mirror, the third mirror and the fourth mirror forming the retaining space.

129. The method of claim 113 wherein the step of providing the illusion assembly is defined further as providing the illusion assembly with the illusion devices further comprising a front concave mirror having a focal point and being disposed about adjacent the first transparent area, an opening being formed through a central portion of the front concave mirror; a rear concave mirror having a focal point and being disposed about adjacent the second transparent area, an opening being formed through a portion of the rear concave mirror; a front convex mirror disposed near the focal point of the front concave mirror whereby the light entering the first transparent area is reflected from the front concave mirror and onto the front convex mirror and the light being reflected from the front convex mirror out the opening in the front concave mirror; and a rear convex mirror positioned near the focal point of the rear concave mirror, light being reflected through the first transparent area onto the front concave mirror and reflected from the front concave mirror onto the front convex mirror, the light being reflected from the front convex mirror through the opening in the front concave mirror and through the opening in rear concave mirror and onto the rear convex mirror, and the light being reflected from the rear convex mirror onto the rear concave mirror and the light being reflected from the rear concave mirror out the second transparent area, the front concave mirror being spaced a distance from the rear concave mirror and at least a portion of the space between the front concave mirror and the rear concave mirror cooperating to form a portion of the retaining space.

130. The method of claim 129 wherein the step of providing the illusion assembly is defined further as providing the illusion assembly with the opening in the front concave mirror being aligned with the opening in the rear concave mirror.

131. The method of claim 129 wherein the step of providing the illusion assembly is defined further as providing the illusion assembly with the container being defined further to include a front and a rear with a front opening being formed through the front of the container and a rear opening being formed through the rear of the container, the front opening being circularly shaped and defining the first transparent area, and the rear opening being circularly shaped and defining the second transparent area, and wherein the front concave mirror is defined further as having a circularly shaped front face with the front face of the front concave mirror being disposed about adjacent the front of the container and the front face of the front concave mirror substantially encompassing the front opening, and wherein the rear concave mirror is defined further as comprising a front face having a circular shape with the front face of the rear concave mirror being disposed near the rear of the container and the front face of the rear concave mirror substantially encompassing the rear opening.

132. The method of claim 131 wherein the step of providing the illusion assembly is defined further as providing the illusion assembly with the focal point of the front concave mirror being disposed in a plane about coplaner with the front of the container, and wherein the focal point of the rear concave mirror is disposed in a plane about coplaner with the rear of the container.

133. The method of claim 129 the step of providing the illusion assembly is defined further as providing the illusion assembly further comprising an opaque light tube having a first end and a second end, the first end of the light tube being connected to the front concave mirror and the light tube encompassing the opening in the front concave mirror, and the second end of the light tube being connected to the rear concave mirror with the second end of the light tube encompassing the opening in the rear concave mirror, the light tube extending between the front concave mirror and the rear concave mirror, the light reflected from the front convex mirror traveling through the light tube and onto the rear convex mirror, a portion of the light tube cooperating with a portion of the front concave mirror and a portion of the rear concave mirror to form the retainer assembly.

134. The method of claim 121 wherein the step of providing the illusion assembly is defined further as providing the illusion assembly with the front opening being defined further as being circularly shaped and the rear opening being defined further as being circularly shaped, and wherein the illusion devices further comprise a front concave mirror having a focal point and being disposed near the front wall of the container and substantially encompassing the front opening in the container, an opening being formed through a portion of the front concave mirror; a rear concave mirror having a focal point and being disposed near the rear wall of the container with the rear concave mirror substantially encompassing the rear opening of the container, an opening being formed through a portion of the rear concave mirror; a front convex mirror disposed near the focal point of the front concave mirror whereby the light entering the front opening is reflected from the front concave mirror and onto the front convex mirror and the light being reflected from the front convex mirror out the opening in the front concave mirror; and a rear convex mirror positioned near the focal point of the rear convex mirror, light being reflected through the front opening onto the front convex mirror and reflected from the front convex mirror onto the front convex mirror, the light being reflected from the front convex mirror through the opening in the front concave mirror and through the opening in rear concave mirror and onto the rear convex mirror, and the light being reflected from the rear convex mirror onto the rear concave mirror and the light being reflected from the rear concave mirror out the rear opening, the front concave mirror being spaced a distance from the rear concave mirror and at least a portion of the space between the front concave mirror and the rear concave mirror cooperating to form a portion of the retaining space.

135. The method of claim 134 the step of providing the illusion assembly is defined further as providing the illusion assembly further comprising an opaque light tube having a first end and a second end, the first end of the light tube being connected to the front concave mirror and the light tube encompassing the opening in the front concave mirror, and the second end of the light tube being connected to the rear concave mirror with the second end of the light tube encompassing the opening in the rear concave mirror, the light tube extending between the front concave mirror and the rear concave mirror, the light reflected from the front convex mirror traveling through the light tube and onto the rear convex mirror, a portion of the light tube cooperating with a portion of the front concave mirror and a portion of the rear concave mirror to form the retainer assembly.

136. The method of claim 134 wherein the step of providing the illusion assembly is defined further as providing the illusion assembly the opening in the front concave mirror is aligned with the opening in the rear concave mirror.

137. The method of claim 134 wherein the step of providing the illusion assembly is defined further as providing the illusion assembly with the container being defined further to include a front and a rear with a front opening being formed through the front of the container and a rear opening being formed through the rear of the container, the front opening being circularly shaped and defining the first transparent area, and the rear opening being circularly shaped and defining the second transparent area, and wherein the front concave mirror is defined further as having a circularly shaped front face with the front face of the front concave mirror being disposed adjacent the front of the container and the front face of the front concave mirror substantially encompassing the front opening, and wherein the rear concave mirror is defined further as comprising a front face having a circular shape with the front face of the rear concave mirror being disposed near the rear of the container and the front face of the rear concave mirror substantially encompassing the rear opening.

138. The method of claim 137 wherein the step of providing the illusion assembly is defined further as providing the illusion assembly with the focal point of the front concave mirror being disposed in a plane about coplaner with the front of the container, and wherein the focal point of the rear concave mirror is disposed in a plane about coplaner with the rear of the container.

139. The method of claim 112 wherein the step of providing the illusion assembly is defined further as providing the illusion assembly with the container having a front and a rear, and wherein the illusion devices further comprise a first total reflection prism having a front face, a bottom face and a rear face, the front face being disposed near the first transparent area; a second total reflection prism having a front face, a bottom face and a rear face, the front face being positioned near the second transparent area; and a Porro prism having a first rear face, a second rear face and a front face, the first and the second total reflection prisms and the Porro prism being positioned in the container whereby at least some of the light is passed through the first transparent area and through the front face of the first total reflection prism onto the rear face of the first total reflection prism, the light being reflected from the rear face of the first total reflection prism onto the front face of the Porro prism, the light being passed from the front face of the Porro prism through the Porro prism and onto the first rear face of the Porro prism, the light being reflected from the first rear face of the Porro prism through the Porro prism and onto the second rear face of the Porro prism, and the light being reflected from the second rear face of the Porro prism through the Porro prism and through the front face of the Porro prism and through the bottom face of the second total reflection prism and through the second total reflection prism onto the rear face of the second total reflection prism and the light being reflected from the rear face of the second total reflection prism through the second total reflection prism and out through the front face of the second total reflection prism and out through the second transparent area.

140. The method of claim 139 wherein the step of providing the illusion assembly is defined further as providing the illusion assembly with the front face of the Porro prism extending between the first transparent area and the second transparent area being disposed in a plane about parallel with the bottom faces of the first and the second total reflection prisms, the first rear face of the Porro prism extending at an angle of about forty five degrees with respect to the front of the container about forty five degrees with respect to the front face of the Porro prism, and the second rear face of the Porro prism extending at an angle of about forty five degrees with respect to the rear of the container and at an angle of about ninety degrees with respect to the first rear face of the Porro prism, and the second rear face of the Porro prism extending at an angle of about forty five degrees with respect to the front face of the Porro prism.

141. The method of claim 140 wherein the step of providing the illusion assembly is defined further as providing the illusion assembly with the rear face of the first total reflection prism extending at an angle of about forty five degrees with respect to the front of the container and at an angle of about forty five degrees with respect to the front face of the first total reflection prism and at an angle of about forty five degrees with respect to the bottom face of the first total reflection prism, and wherein the front face of the first total reflection prism extends at an angle of about ninety degrees with respect to the bottom face of the first total reflection prism, the front face of the first total reflection prism being disposed adjacent the first transparent area and comprising a portion of the first transparent area, and wherein the rear face of the second total reflection prism extends at an angle of about forty five degrees with respect to the front face of the second total reflection prism and at an angle of about forty five degrees with respect to the bottom face of the second total reflection prism, and the front face of the second total reflection prism extends at an angle of about ninety degrees with respect to the bottom face of the second total reflection prism, the front face of the second total reflection prism being disposed adjacent the second transparent area and comprising a portion of the second transparent area, the bottom faces of the first and the second total reflection prisms extending in a coplaner disposition and the bottom faces of the first and the second total reflection prisms extending in a plane about parallel with the front face of the Porro prism.

142. The method of claim 141 wherein the step of providing the illusion assembly is defined further as providing the illusion assembly with the bottom faces of the first and the second total reflection prisms being spaced a distance from the front face of the Porro prism, and wherein some of the light passes through a portion of the first transparent area and through the space between the first and the second total reflection prisms and the Porro prism and out the second transparent area, a portion of the space between the first and the second total reflection prisms and the Porro prism comprising a portion of the first transparent area and a portion of the space between the first and the second total reflection prisms and the Porro prism comprising a portion of the second transparent area.

143. The method of claim 142 wherein the step of providing the illusion assembly is defined further as providing the illusion assembly with one end of the rear face of the first total reflection prism being disposed near one end of the rear face of the second total reflection prism, and the rear face of the first total reflection prism extends at an angle of about ninety degrees with respect to the rear face of the second total reflection prism.

144. The method of claim 121 wherein the step of providing the illusion assembly is defined further as providing the illusion assembly with the illusion devices further comprising a first total reflection prism having a front face, a bottom face and a rear face, the front face being disposed adjacent the front opening in the container and the front face comprising a portion of the front opening in the container; a second total reflection prism having a front face, a bottom face and a rear face, the front face being positioned adjacent the rear opening in the container; and a Porro prism having a first rear face, a second rear face, and a front face, the first and the second total reflection prisms and the Porro prism being positioned in the container whereby at least some of the light is passed through the front opening in the container and through the front face of the first total reflection prism onto the rear face of the first total reflection prism, the light being reflected from the rear face of the first total reflection prism onto the front face of the Porro prism, the light being passed from the front face of the Porro prism through the Porro prism and onto the first rear face of the Porro prism, the light being reflected from the first rear face of the Porro prism through the Porro prism and onto the second rear face of the Porro prism, and the light being reflected from the second rear face of the Porro prism through the Porro prism and through the front face of the Porro prism and through the bottom face of the second total reflection prism and through the second total reflection prism onto the rear face of the second total reflection prism and the light being reflected from the rear face of the second total reflection prism through the second total reflection prism and out through the front face of the second total reflection prism and out through the front opening in the container.

145. The method of claim 144 wherein the step of providing the illusion assembly is defined further as providing the illusion assembly with the front face of the Porro prism extending between the first transparent area and the second transparent area being disposed in a plane about parallel with the bottom faces of the first and the second total reflection prisms, the first rear face of the Porro prism extending at an angle of about forty five degrees with respect to the front of the container about forty five degrees with respect to the front face of the Porro prism, and the second rear face of the Porro prism extending at an angle of about forty five degrees with respect to the rear of the container and at an angle of about ninety degrees with respect to the first rear face of the Porro prism and the second rear face of the Porro prism extending at an angle of about forty five degrees with respect to the front face of the Porro prism.

146. The method of claim 145 wherein the step of providing the illusion assembly is defined further as providing the illusion assembly with the rear face of the first total reflection prism extending at an angle of about forty five degrees with respect to the front of the container and at an angle of about forty five degrees with respect to the front face of the first total reflection prism and at an angle of about forty five degrees with respect to the bottom face of the first total reflection prism, and wherein the front face of the first total reflection prism extends at an angle of about ninety degrees with respect to the bottom face of the first total reflection prism, the front face of the first total reflection prism being disposed about adjacent the first transparent area and comprising a portion of the first transparent area, and wherein the rear face of the second total reflection prism extends at an angle of about forty five degrees with respect to the front face of the second total reflection prism and at an angle of about forty five degrees with respect to the bottom face of the second total reflection prism, and the front face of the second total reflection prism extends at an angle of about ninety degrees with respect to the bottom face of the second total reflection prism, the front face of the second total reflection prism being disposed adjacent the second transparent area and comprising a portion of the second transparent area, the bottom faces of the first and the second total reflection prisms extending in a coplaner disposition and the bottom faces of the first and the second total reflection prisms extending in a plane about parallel with the front face of the Porro prism.

147. The method of claim 146 wherein the step of providing the illusion assembly is defined further as providing the illusion assembly with the bottom faces of the first and the second total reflection prisms being spaced a distance from the front face of the Porro prism, and wherein some of the light passes through a portion of the first transparent area and through the space between the first and the second total reflection prisms and the Porro prism and out the second transparent area.

148. The method of claim 147 wherein the step of providing the illusion assembly is defined further as providing the illusion assembly with one end of the rear face of the first total reflection prism being disposed near one end of the rear face of the second total reflection prism and the rear face of the first total reflection prism extends at an angle of about ninety degrees with respect to the rear face of the second total reflection prism, a portion of the space between the first and the second total reflection prisms and the Porro prism comprising a portion of the first transparent area and a portion of the space between the first and the second total reflection prisms and the Porro prism comprising a portion of the second transparent area.

149. The method of claim 112 wherein the step of providing the illusion assembly is defined further as providing the illusion assembly with the illusion devices comprising a Dove prism having a front wall, a rear wall, a first end wall, a second end wall, a bottom wall and a top, the top extending in a plane about parallel with the bottom wall, the front wall extending between the bottom wall and the top at an angle of about forty five degrees from the bottom wall and the front wall being angled generally toward the rear wall, the rear wall being spaced a distance from the front wall, and the rear wall extending between the bottom wall and the top and the rear wall extending from the bottom wall generally toward the front wall at an angle of about forty five degrees with respect to the bottom wall, the light rays entering the front wall and being reflected in the Dove prism and reflected out the rear wall.

150. The method of claim 149 wherein the step of providing the illusion assembly is defined further as providing the illusion assembly with the Dove prism being defined further as comprising at least a portion of the container, the retaining space being formed in the top of the Dove prism and extending a distance through the Dove prism toward the bottom wall of the Dove prism, the retaining space being positioned so that the light rays reflected in the Dove prism do not pass through the retaining space.

151. The method of claim 149 wherein the step of providing the illusion assembly is defined further as providing the illusion assembly with the Dove prism being defined further as having the first end wall angled from the bottom wall to the top and toward the second end wall at an angle of about forty five degrees with respect to the bottom wall and having the second end wall extending between the bottom wall and the top at an angle of about forty five degrees with respect to the bottom wall and extending generally toward the first end wall.

152. The method of claim 112 wherein the step of providing the illusion assembly is defined further as providing the illusion assembly with the illusion devices comprising a pair of Dove prisms, each Dove prism having a front wall, a rear wall, a first end wall, a second end wall, a bottom wall and a top, the top extending in a plane about parallel with the bottom wall, the front wall extending between the bottom wall and the top at an angle of about forty five degrees from the bottom wall, and the front wall being angled generally toward the rear wall, the rear wall being spaced a distance from the front wall and extending between the bottom wall and the top and the rear wall extending from the bottom wall generally toward the front wall at an angle of about forty five degrees with respect to the bottom wall, the light rays entering the front wall and being reflected in the Dove prism and reflected out the rear wall, the rear wall of one of the Dove prisms being disposed near the front wall of the other Dove prism and positioned so that the light rays passing from the rear wall of the one Dove prisms enters the front wall of the other Dove prism and are reflected within the other Dove prism and out the rear wall of the other Dove prism.

153. The method of claim 152 wherein the step of providing the illusion assembly is defined further as providing the illusion assembly with each Dove prism comprising at least a portion of the container and wherein the retaining space is defined further to comprise a retaining space formed in the top of each of the Dove prisms with each retaining space being positioned in the respective Dove prism so that the light rays passing through the respective Dove prisms do not pass through the retaining space in that Dove prism.

154. The method of claim 112 wherein the step of providing the illusion assembly is defined further as providing the illusion assembly with the illusion devices comprising a first lens having a focal point spaced a first focal length from the first lens, the first lens being disposed about adjacent the first transparent area, the first lens comprising at least a portion of the first transparent area; and a second lens having a focal point spaced a second focal length from the second lens with the second lens being disposed about adjacent the second transparent area, and with the second lens comprising at least a portion of the second transparent area, the first lens and the second lens being aligned and the first focal length being about equal to the second focal length, the focal point of the first lens about coinciding with the focal point of the second lens, the light rays passing through the first transparent area and through the first lens and being focused at the focal points of the first and second lenses and the light passing from the focal points of the first and the second lenses through the second lens and out the second transparent area.

155. The method of claim 154 the step of providing the illusion assembly is defined further as providing the illusion assembly further comprising a first hollow cone shaped opaque light housing having a first end and a second end, the first end of the first light housing being positioned adjacent the first lens and the first lens of the first light housing substantially encompassing the first end, the first light housing extending a distance into the container space terminating with the second end of the first light housing positioned at about the focal points of the first and the second lenses; and a second hollow cone shaped opaque light housing having a first end and a second end, the first end of the second light housing substantially encompassing the second lens, the second light housing extending a distance into the container space terminating with the second end of the second light housing positioned near the second end of the first light housing and positioned at about the focal points of the first and the second lenses, the first and the second light housing cooperating with portions of the container to form the retainer assembly and define the retaining space.

156. The illusion of claim 121 wherein the step of providing the illusion assembly is defined further as providing the illusion assembly with the illusion devices comprising a first lens having a first focal point spaced a first focal length from the first lens, the first lens being disposed in the front opening in the front wall and the first lens substantially encompassing the front opening, the first lens comprising at least a portion of the first transparent area; and a second lens having a focal point spaced a second focal length from the second lens with the second lens being disposed in the rear opening in the rear wall and substantially encompassing the rear opening, the second lens comprising at least a portion of the second transparent area, the first lens and the second lens being aligned and the first focal length being about equal to the second focal length, the focal point of the first focal lens about coinciding with the focal point of the second lens, the light rays passing through the first lens and being focused at the focal points of the first and the second lenses and the light rays passing from the focal points of the first and the second lenses through the second lens and out the rear opening.

157. The method of claim 156 the step of providing the illusion assembly is defined further as providing the illusion assembly further comprising a first hollow cone shaped opaque light housing having a first end and a second end, the first end of the first light housing being positioned adjacent the first lens and the first lens of the first light housing substantially encompassing the first end, the first light housing extending a distance into the container space terminating with the second end of the first light housing positioned at about the focal points of the first and the second lenses; and a second hollow cone shaped opaque light housing having a first end and a second end, the first end of the second light housing substantially encompassing the second lens, the second light housing extending a distance into the container space terminating with the second end of the second light housing positioned near the second end of the first light housing and positioned at about the focal points of the first and the second lenses, the first and the second light housing cooperating with portions of the container to form the retainer assembly and define the retaining space.

158. The method of claim 121 wherein the step of providing the illusion assembly is defined further as providing the illusion assembly with the front opening being defined further as comprising a plurality of spaced apart front openings, and wherein the rear opening is defined further as comprising a plurality of spaced apart rear openings, each front opening being aligned with one of the rear openings to form an aligned pair of front openings and rear openings, and wherein the illusion devices comprise: a plurality of first lenses, each first lens being positioned in one of the front openings, each first lens having a focal point spaced a first focal length from the first lens, the first lenses cooperating to comprise the first transparent area; a plurality of second lenses, each second lens being positioned in one of the rear openings, each second lens having a focal point spaced a second focal length from the second lens, the second lenses cooperating to define the second transparent area, each first lens being aligned with one of the second lenses to form an aligned pair of lenses and the first focal length and the second focal length of each aligned pair of lenses being about equal whereby the focal points of each pair of aligned lenses about coincide, light rays passing through each of the first lenses being focused at the focal points of the respective first and second lenses of each aligned pair of lenses and the light rays passing from the focal points through the respective second lenses of the aligned pair of lenses.

159. The method of claim 128 the step of providing the illusion assembly is defined further as providing the illusion assembly further comprising a plurality of first hollow cone shaped opaque light housings, each first light housing having a first end and a second end, the first end of each of the first light housing being positioned adjacent one of the first lenses and the first end of the first light housing substantially encompassing one of the first lenses, each first light housing extending a distance into the container space terminating with the second end of the first light housing positioned at about the focal point of the respective first lens; and a plurality of second hollow cone shaped light housings, each second light housing having a first end and a second end, the first end of each of the second light housings substantially encompassing one of the second lenses, each of the second light housings extending a distance into the container space terminating with the second end of the second light housing positioned near the second end of one of the first light housings and positioned at about the focal point of the second lens, the first and the second light housings cooperating with portions of the container to form the retainer assembly and define the retaining space.

160. The method of claim 112 wherein the step of providing the illusion assembly is defined further as providing the illusion assembly with the container comprising a front and a rear, and wherein the illusion devices comprise a first lens disposed near the front of the container and the first lens comprising at least a portion of the first transparent area; and a second lens disposed near the rear of the container with the second lens being spaced a distance from the first lens and the second lens comprising at least a portion of the second transparent area, light passing through the first lens and passing from the first lens through the second lens.

161. The method of claim 159 wherein the step of providing the illusion assembly is defined further as providing the illusion assembly with each of the first and the second lenses being defined further as comprising a converging lens.

162. The method of claim 160 wherein the step of providing the illusion assembly is defined further as providing the illusion assembly with the first lens being a converging lens and the second lens being a diverging lens.

163. The method of claim 161 wherein the step of providing the illusion assembly is defined further as providing the illusion assembly with the front opening being defined further as comprising a plurality of front openings and wherein the rear opening is defined further as comprising a plurality of rear openings, and wherein the illusion devices further comprise a plurality of optical fibers, one end of each optical fiber being disposed in one of the front openings and the opposite end of each optical fiber being disposed in one of the rear openings, light passing from the front openings through the optical fibers and out the rear openings.

164. The method of claim 112 wherein the step of providing the illusion assembly is defined further as providing the illusion assembly with each front opening being aligned with one of the rear openings, and wherein each optical fiber extends from one of the front openings to the rear opening aligned therewith.

165. The method of claim 164 wherein the step of providing the illusion assembly is defined further as providing the illusion assembly with the illusion devices comprising a video camera disposed in the container space having a lens disposed near the front opening; a display disposed in the rear opening with the display substantially encompassing the rear opening and comprising the second transparent area; and means interconnecting the video camera and the display whereby images received by the video camera are displayed on the display.

166. The method of claim 112 wherein the step of providing the illusion assembly is defined further as providing the illusion assembly with the illusion devices further comprising a first right triangle prism; a second right triangle prism; a third right triangle prism; and a fourth right triangle prism, the first right triangle prism, the second right triangle prism, the third right triangle prism and the fourth right triangle prism being positioned whereby light enters the first transparent areas and passes through the first right triangle prism wherein the light is reflected from the first right triangle prism to the second right triangle prism and wherein the light is passed through the second right triangle prism and reflected through the third right triangle prism, and wherein the light is passed through the third right triangle prism and reflected to the fourth right triangle prism and wherein the light is passed through the fourth right triangle prism and reflected out of the fourth right triangle prism and out through the second transparent area.

167. A method comprising:
providing a floral grouping;
providing an illusion assembly comprising a container having a first transparent area and a second transparent area, the container at least partially encompassing a container space with at least a portion of the container space being disposed between the first transparent area and the second transparent area of the container; a retainer assembly defining a retaining space with at least a portion of the retainer assembly being disposed between the first transparent area and the second transparent area; and illusion devices for creating the illusion of seeing through the first transparent area, and through the second transparent area without seeing any portion of the retainer assembly disposed between the first transparent area and the second transparent area;
disposing at least a portion of the floral grouping in the retaining space; and
looking through the first transparent area and seeing the illusion created by the illusion devices of looking through the second transparent area without seeing the portion of the retainer assembly disposed between the first transparent area and the second transparent area and without seeing the portion of the floral grouping disposed in the retaining space.

168. The method of claim 167 wherein the step of providing the illusion assembly is defined further as providing the illusion assembly with the illusion devices selected from a group of illusion devices consisting of mirrors, lenses or prisms or combinations thereof.

169. The method of claim 167 wherein the step of providing the illusion assembly is defined further as providing the illusion assembly with the container being defined further as being formed of opaque material and wherein the floral grouping is opaque.

170. The method of claim 167 wherein the step of providing the illusion assembly is defined further as providing the illusion assembly with the front and the second transparent areas being aligned and spaced a distance apart.

171. The method of claim 170 wherein the step of providing the illusion assembly is defined further as providing the illusion assembly with the container being defined further as having a front and a rear, and wherein the first transparent area is on the front of the container and the second transparent area is on the rear of the container.

172. The method of claim 167 wherein the step of providing the illusion assembly is defined further as providing the illusion assembly with the container being defined further as having a top and a bottom, and wherein a retaining space opening is formed through the top of the container and extends a distance toward the bottom of the container forming the retaining space.

173. The method of claim 171 wherein the step of providing the illusion assembly is defined further as providing the illusion assembly with the first transparent area encompassing substantially the entire front of the container, and wherein the second transparent area encompasses substantially the entire rear of the container.

174. The method of claim 167 wherein the step of providing the illusion assembly is defined further as providing the illusion assembly with the illusion devices comprising a first mirror positioned in the container space for receiving and reflecting light rays entering the first transparent area; a second mirror positioned in the container space for receiving light rays reflected from the first mirror and for reflecting the light rays received from the first mirror; a third mirror positioned in the container space for reflecting light rays out the second transparent area and for receiving light rays; and a fourth mirror positioned in the container space for receiving light rays reflected from the second mirror and for reflecting the light rays onto the third mirror, the light rays passing through the first transparent area and being reflected from the first mirror onto the second mirror and being reflected from the second mirror onto the fourth mirror and being reflected from the fourth mirror onto the third mirror and being reflected from the third mirror out through the second transparent area.

175. The method of claim 167 wherein the step of providing the illusion assembly is defined further as providing the illusion assembly with the container having a front, a rear, a top and a bottom, and wherein the first mirror further comprises a first end, a second end, a first side, and a second side, the first side of the first mirror being positioned near the front of the container and the first mirror extending at an angle of about forty five degrees from the front of the container, the first mirror extending at the angle of about forty five degrees in a direction from the top of the container a distance toward the bottom of the container; and wherein the second mirror further comprises a first end, a second end, a first side, and a second side, and wherein the first side of the second mirror is disposed near the front of the container and wherein the second mirror extends at an angle of about forty five degrees from the front of the container, the second mirror extending at the angle of about forty five degrees in a direction from the top of the container a distance toward the bottom of the container, the second mirror being disposed in a plane about parallel with the first mirror, the first side of the first mirror being aligned with and spaced a distance from the first side of the second mirror and the space between the first side of the first mirror and the first side of the second mirror cooperating to define the first transparent area; and wherein the third mirror further comprises a first end, a second end, a first side and a second side, and wherein the first side of the third mirror is disposed near the rear of the container and wherein the third mirror extends at an angle of about forty five degrees from the rear of the container with the third mirror extending at the angle of about forty five degrees in a direction from the top a distance toward the bottom of the container, the third mirror being disposed at an angle of about ninety degrees with respect to the first mirror, and the second side of the first mirror being disposed near the second side of the first mirror; and wherein the fourth mirror further comprises a first end, a second end, a first side and a second side, and wherein the fourth mirror extends at an angle from the rear of the container of about forty five degrees extending in a direction from the top of the container toward the bottom of the container, the first side of the fourth mirror being disposed near the rear of the container and the second side of the fourth mirror being disposed near the second side of the second mirror, the fourth mirror extending at an angle of about ninety degrees from the second mirror, the fourth mirror extending in a plane about parallel with the third mirror, the first side of the third mirror being aligned and spaced a distance from the first side of the fourth mirror and the space between the first side of the third mirror and the first side of the fourth mirror cooperating to define the second transparent area, the first and the third mirror cooperating with portions of the container to form the retainer assembly, the first side of the first mirror and the first side of the third mirror being disposed near the top of the container and the first side of the first mirror being spaced a distance from the first side of the third mirror and the first side of the first mirror and the first side of the third mirror cooperating to define the retaining space opening in the top of the container for providing access to the retaining space, a space between the first mirror and the third mirror cooperating to define the retaining space, the fourth mirror extending in a plane about parallel with the third mirror.

176. The method of claim 175 wherein the step of providing the illusion assembly is defined further as providing the illusion assembly with the first end of the first mirror being substantially aligned with the first end of the second mirror, the second end of the first mirror substantially aligned with the second end of the second mirror, the second side of the first mirror being substantially aligned with the second side of the second mirror, and wherein the first end of the third mirror is substantially aligned with the first end of the fourth mirror, the second end of the third mirror being substantially aligned with the second end of the fourth mirror, and the second side of the third mirror being substantially aligned with the second side of the fourth mirror, and wherein the first mirror is spaced a distance from the second mirror, and wherein the third mirror is spaced a distance from the fourth mirror.

177. The method of claim 167 wherein the step of providing the illusion assembly is defined further as providing the illusion assembly with the container further comprising a front wall having a first end, a second end, a bottom and a top; a rear wall having a first end, a second end, a bottom and a top; a first end wall having a first end, a second end, a bottom and a top; a second end wall having a first end, a second end, a bottom and a top; a bottom wall, the first end of the front wall being connected to the first end of the first end wall and the second end of the front wall being connected to the first end of the second end wall, the second end of the second end wall being connected to the second end of the rear wall and the first end of the rear wall being connected to the second end of the first end wall, and the bottoms of the front wall, the rear wall, the first end wall and the second end wall being connected to the bottom wall, and the front wall, the rear wall, the first end wall and the second end wall each extending a distance upwardly from the bottom wall terminating with the tops of the front wall, the rear wall, the first end wall and the second end wall and forming a top of the container, a front opening being formed through the front wall with the front opening defining the first transparent area and a rear opening being formed through the rear wall with the rear opening defining the second transparent area.

178. The method of claim 177 wherein the step of providing the illusion assembly is defined further as providing the illusion assembly with the illusion devices comprising a first mirror having a first end, second end, a first side and a second side, the first side of the first mirror being disposed near the front wall and the first mirror extending a distance angularly downwardly from the front wall in a direction toward the bottom wall at an angle of about forty five degrees with respect to the front wall; a second mirror having a first end, a second end, a first side and a second side, the first side of the second mirror being disposed near the front wall and the first side of the first mirror being spaced a distance from the first side of the second mirror, and the second mirror extending at an angle in a direction downwardly from the front wall at an angle of about forty five degrees toward the bottom wall, the first mirror being disposed in a plane about parallel with the second mirror, and a space between the first side of the first mirror and the first side of the second mirror cooperating to define the first transparent area, light entering the first transparent area encountering the first mirror and being reflected downwardly onto the second mirror where the light is reflected from the second mirror generally toward the rear opening; a third mirror having a first end, a second end, a first side and a second side, the first side of the third mirror being disposed near the rear wall, the third mirror extending at an angle of about forty five degrees from the rear wall a distance in a direction from the top toward the bottom wall, and the second side of the third mirror being disposed near the second side of the first mirror with the third mirror extending an angle of about ninety degrees from the first mirror; and a fourth mirror having a first end, a second end, a first side and a second side, the first side of the fourth mirror being disposed near the rear wall, the fourth mirror extending at an angle of about forty five degrees with respect to the rear wall downwardly in a direction from the top toward the bottom wall, the second side of the fourth mirror being disposed near the second side of the third mirror, and the fourth mirror extending at a plane about parallel with the third mirror, the fourth mirror extending at an angle about ninety degrees with respect to the second mirror, the first side of the third mirror being spaced a distance from the first side of the fourth mirror and the space between the first side of the third mirror and the first side of the fourth mirror cooperating to define the second transparent area, light reflected from the second mirror encountering the fourth mirror and being reflected onto the third mirror and reflected from the third mirror out the second transparent area.

179. The method of claim 178 wherein the step of providing the illusion assembly is defined further as providing the illusion assembly with the first side of the first mirror and the first side of the third mirror cooperating to form a retaining space opening in the top of the container providing access to the retaining space of the retaining assembly, the space between the first mirror and the third mirror cooperating to form the retaining space.

180. The method of claim 179 wherein the step of providing the illusion assembly is defined further as providing the illusion assembly with the first end of the first mirror is aligned with the first end of the second mirror, and wherein the second end of the first mirror is aligned with the second end of the second mirror, and wherein the first end of the third mirror is aligned with the first end of the fourth mirror, and wherein the second end of the third mirror is aligned with the second end of the fourth mirror.

181. The method of claim 180 wherein the step of providing the illusion assembly is defined further as providing the illusion assembly with the front wall further comprising a front opening formed through the front wall with the front opening comprising the first transparent area, and a rear opening formed through the rear wall comprising the second transparent area.

182. The method of claim 181 wherein the step of providing the illusion assembly is defined further as providing the illusion assembly with the front opening being defined further as being rectangularly shaped and having a first end, a second end, a first side and a second side, the first side of the first mirror being disposed near the first side of the front opening and the first mirror extending between the first end and the second end of the front opening, the first side of the second mirror being disposed near the second side of the front opening and the second mirror extending between the first end and the second end of the front opening, and wherein the rear opening is defined further as being rectangularly shaped having a first end, a second end, a first side and a second side, the first side of the third mirror being disposed near the first side of the rear opening and the third mirror extending between the first and the second ends of the rear opening, and the first side of the fourth mirror being disposed adjacent the second side of the rear opening and the fourth mirror extending between the first and the second ends of the rear opening.

183. The method of claim 167 wherein the step of providing the illusion assembly is defined further as providing the illusion assembly with the container further comprising a front and a rear, and with the illusion devices further comprising a first mirror, a second mirror, a third mirror and a fourth mirror interconnected to form a generally square shaped mirror assembly with the mirror assembly being disposed between the first transparent area and the second transparent area; a fifth mirror having a first end, a second end, a first side and a second side, the first side of the fifth mirror being positioned near the first transparent area and the fifth mirror extending at an angle of about forty five degrees from the front of the container and the fifth mirror extending in a plane about parallel with the first mirror and the fifth mirror being spaced a distance from the first mirror; a sixth mirror having a first end, a second end, a first side and a second side, the second side of the sixth mirror being positioned near the second transparent area and the sixth mirror extending at an angle of about forty five degrees from the rear of the container, the first side of the sixth mirror being positioned near the second side of the fifth mirror and the sixth mirror extending at an angle of about ninety degrees with respect to the fifth mirror, the sixth mirror extending at a plane about parallel with the second mirror, and the sixth mirror being spaced a distance from the second mirror; and a seventh mirror having a first end, second end, a first side and a second side, the first side of the seventh mirror being positioned near the first transparent area, and the second mirror extending at an angle of about forty five degrees from the front of the container, the seventh mirror being spaced a distance from the fourth mirror and extending in a plane about parallel with the fourth mirror; and an eighth mirror having a first end, a second end, a first side and a second side, the second side of the eighth mirror being disposed near the second transparent area and the eighth mirror extending at an angle of about forty five degrees from the rear of the container, the first side of the eighth mirror being disposed near the second side of the seventh mirror, and the eighth mirror extending at an angle of about ninety degrees from the seventh mirror, the eighth mirror extending a plane about parallel with the third mirror and the eighth mirror being spaced a distance from the third mirror, whereby some of the light entering the first transparent area is reflected from the first mirror onto the fifth mirror and from the fifth mirror onto the sixth mirror and from the sixth mirror onto the second mirror and from the second mirror out the second transparent area, and some of the light entering the first transparent area is reflected from the fourth mirror onto the seventh mirror and reflected from the seventh mirror onto the eighth mirror and reflected from the eighth mirror onto the third mirror and reflected from the third mirror out of the second transparent area, the mirror assembly cooperating to form a portion of the retainer assembly and the space between the first mirror, the second mirror, the third mirror and the fourth mirror forming the retaining space.

184. The method of claim 177 wherein the step of providing the illusion assembly is defined further as providing the illusion assembly with the illusion devices further comprising a first mirror, a second mirror, a third mirror and a fourth mirror interconnected to form a generally rectangularly shaped mirror assembly with the mirror assembly being disposed between the front opening and the rear opening and extending generally between the top and the bottom wall of the container; a fifth mirror having a first end, a second end, a first side and a second side, the first side of the fifth mirror being positioned near the front wall and near the front opening and the fifth mirror extending at an angle of about forty five degrees from the front wall and the fifth mirror extending in a plane about parallel with the first mirror and the fifth mirror being spaced a distance from the first mirror; a sixth mirror having a first end, a second end, a first side and a second side, the second side of the sixth mirror being positioned near the rear opening and near the rear wall and the sixth mirror extending at an angle of about forty five degrees from the rear wall, the first side of the sixth mirror being positioned near the second side of the fifth mirror and the sixth mirror extending at an angle of about ninety degrees with respect to the fifth mirror, the sixth mirror extending in a plane about parallel with the second mirror, and the sixth mirror being spaced a distance from the second mirror; a seventh mirror having a first end, a second end, a first side and a second side, the first side of the seventh mirror being positioned near the front opening and near the front wall, the second mirror extending at an angle of about forty five degrees from the front wall, the seventh mirror being spaced a distance from the fourth mirror and extending in a plane about parallel with the fourth mirror; and an eighth mirror having a first end, a second end, a first side and a second side, the second side of the eighth mirror being disposed near the rear wall and near the rear opening and the eighth mirror extending at an angle of about forty five degrees from the rear wall, the first side of the eighth mirror being disposed near the second side of the seventh mirror, and the eighth mirror extending at an angle of about ninety degrees from the seventh mirror, the eighth mirror extending in a plane about parallel with the third mirror and the eighth mirror being spaced a distance from the third mirror, whereby some of the light entering the front opening is reflected from the first mirror onto the fifth mirror and from the fifth mirror onto the sixth mirror and from the sixth mirror onto the second mirror and from the second mirror out the rear opening, and some of the light entering the front opening is reflected from the fourth mirror onto the seventh mirror and reflected from the seventh mirror onto the eighth mirror and reflected from the eighth mirror onto the third mirror and reflected from the third mirror out the rear opening, the mirror assembly cooperating to form a portion of the retainer assembly and the space between the first mirror, the second mirror, the third mirror and the fourth mirror forming the retaining space.

185. The method of claim 167 wherein the step of providing the illusion assembly is defined further as providing the illusion assembly with the illusion devices further comprising a front concave mirror having a focal point and being disposed about adjacent the first transparent area, an opening being formed through a central portion of the front concave mirror; a rear concave mirror having a focal point and being disposed about adjacent the second transparent area, an opening being formed through a portion of the rear concave mirror; a front convex mirror disposed near the focal point of the front concave mirror whereby the light entering the first transparent area is reflected from the front concave mirror and onto the front convex mirror and the light being reflected from the front convex mirror out the opening in the front concave mirror; and a rear convex mirror positioned near the focal point of the rear concave mirror, light being reflected through the first transparent area onto the front concave mirror and reflected from the front concave mirror onto the front convex mirror, the light being reflected from the front convex mirror through the opening in the front concave mirror and through the opening in rear concave mirror and onto the rear convex mirror, and the light being reflected from the rear convex mirror onto the rear concave mirror and the light being reflected from the rear concave mirror out the second transparent area, the front concave mirror being spaced a distance from the rear concave mirror and at least a portion of the space between the front concave mirror and the rear concave mirror cooperating to form a portion of the retaining space.

186. The method of claim 185 wherein the step of providing the illusion assembly is defined further as providing the illusion assembly with the opening in the front concave mirror being aligned with the opening in the rear concave mirror.

187. The method of claim 185 wherein the step of providing the illusion assembly is defined further as providing the illusion assembly with the container being defined further to include a front and a rear with a front opening being formed through the front of the container and a rear opening being formed through the rear of the container, the front opening being circularly shaped and defining the first transparent area, and the rear opening being circularly shaped and defining the second transparent area, and wherein the front concave mirror is defined further as having a circularly shaped front face with the front face of the front concave mirror being disposed about adjacent the front of the container and the front face of the front concave mirror substantially encompassing the front opening, and wherein the rear concave mirror is defined further as comprising a front face having a circular shape with the front face of the rear concave mirror being disposed near the rear of the container and the front face of the rear concave mirror substantially encompassing the rear opening.

188. The method of claim 187 wherein the step of providing the illusion assembly is defined further as providing the illusion assembly with the focal point of the front concave mirror being disposed in a plane about coplaner with the front of the container, and wherein the focal point of the rear concave mirror is disposed in a plane about coplaner with the rear of the container.

189. The method of claim 185 the step of providing the illusion assembly is defined further as providing the illusion assembly further comprising an opaque light tube having a first end and a second end, the first end of the light tube being connected to the front concave mirror and the light tube encompassing the opening in the front concave mirror, and the second end of the light tube being connected to the rear concave mirror with the second end of the light tube encompassing the opening in the rear concave mirror, the light tube extending between the front concave mirror and the rear concave mirror, the light reflected from the front convex mirror traveling through the light tube and onto the rear convex mirror, a portion of the light tube cooperating with a portion of the front concave mirror and a portion of the rear concave mirror to form the retainer assembly.

190. The method of claim 177 wherein the step of providing the illusion assembly is defined further as providing the illusion assembly with the front opening being defined further as being circularly shaped and the rear opening being defined further as being circularly shaped, and wherein the illusion devices further comprise a front concave mirror having a focal point and being disposed near the front wall of the container and substantially encompassing the front opening in the container, an opening being formed through a portion of the front concave mirror; a rear concave mirror having a focal point and being disposed near the rear wall of the container with the rear concave mirror substantially encompassing the rear opening of the container, an opening being formed through a portion of the rear concave mirror; a front convex mirror disposed near the focal point of the front concave mirror whereby the light entering the front opening is reflected from the front concave mirror and onto the front convex mirror and the light being reflected from the front convex mirror out the opening in the front concave mirror; and a rear convex mirror positioned near the focal point of the rear convex mirror, light being reflected through the front opening onto the front convex mirror and reflected from the front convex mirror onto the front convex mirror, the light being reflected from the front convex mirror through the opening in⁴ the front concave mirror and through the opening in rear concave mirror and onto the rear convex mirror, and the light being reflected from the rear convex mirror onto the rear concave mirror and the light being reflected from the rear concave mirror out the rear opening, the front concave mirror being spaced a distance from the rear concave mirror and at least a portion of the space between the front concave mirror and the rear concave mirror cooperating to form a portion of the retaining space.

191. The method of claim 190 the step of providing the illusion assembly is defined further as providing the illusion assembly further comprising an opaque light tube having a first end and a second end, the first end of the light tube being connected to the front concave mirror and the light tube encompassing the opening in the front concave mirror, and the second end of the light tube being connected to the rear concave mirror with the second end of the light tube encompassing the opening in the rear concave mirror, the light tube extending between the front concave mirror and the rear concave mirror, the light reflected from the front convex mirror traveling through the light tube and onto the rear convex mirror, a portion of the light tube cooperating with a portion of the front concave mirror and a portion of the rear concave mirror to form the retainer assembly.

192. The method of claim 190 wherein the step of providing the illusion assembly is defined further as providing the illusion assembly the opening in the front concave mirror is aligned with the opening in the rear concave mirror.

193. The method of claim 190 wherein the step of providing the illusion assembly is defined further as providing the illusion assembly with the container being defined further to include a front and a rear with a front opening being formed through the front of the container and a rear opening being formed through the rear of the container, the front opening being circularly shaped and defining the first transparent area, and the rear opening being circularly shaped and defining the second transparent area, and wherein the front concave mirror is defined further as having a circularly shaped front face with the front face of the front concave mirror being disposed adjacent the front of the container and the front face of the front concave mirror substantially encompassing the front opening, and wherein the rear concave mirror is defined further as comprising a front face having a circular shape with the front face of the rear concave mirror being disposed near the rear of the container and the front face of the rear concave mirror substantially encompassing the rear opening.

194. The method of claim 193 wherein the step of providing the illusion assembly is defined further as providing the illusion assembly with the focal point of the front concave mirror being disposed in a plane about coplaner with the front of the container, and wherein the focal point of the rear concave mirror is disposed in a plane about coplaner with the rear of the container.

195. The method of claim 167 wherein the step of providing the illusion assembly is defined further as providing the illusion assembly with the container having a front and a rear, and wherein the illusion devices further comprise a first total reflection prism having a front face, a bottom face and a rear face, the front face being disposed near the first transparent area; a second total reflection prism having a front face, a bottom face and a rear face, the front face being positioned near the second transparent area; and a Porro prism having a first rear face, a second rear face and a front face, the first and the second total reflection prisms and the Porro prism being positioned in the container whereby at least some of the light is passed through the first transparent area and through the front face of the first total reflection prism onto the rear face of the first total reflection prism, the light being reflected from the rear face of the first total reflection prism onto the front face of the Porro prism, the light being passed from the front face of the Porro prism through the Porro prism and onto the first rear face of the Porro prism, the light being reflected from the first rear face of the Porro prism through the Porro prism and onto the second rear face of the Porro prism, and the light being reflected from the second rear face of the Porro prism through the Porro prism and through the front face of the Porro prism and through the bottom face of the second total reflection prism and through the second total reflection prism onto the rear face of the second total reflection prism and the light being reflected from the rear face of the second total reflection prism through the second total reflection prism and out through the front face of the second total reflection prism and out through the second transparent area.

196. The method of claim 195 wherein the step of providing the illusion assembly is defined further as providing the illusion assembly with the front face of the Porro prism extending between the first transparent area and the second transparent area and being disposed in a plane about parallel with the bottom faces of the first and the second total reflection prisms, the first rear face of the Porro prism extending at an angle of about forty five degrees with respect to the front of the container about forty five degrees with respect to the front face of the Porro prism, and the second rear face of the Porro prism extending at an angle of about forty five degrees with respect to the rear of the container and at an angle of about ninety degrees with respect to the first rear face of the Porro prism and, the second rear face of the Porro prism extending at an angle of about forty five degrees with respect to the front face of the Porro prism.

197. The method of claim 196 wherein the step of providing the illusion assembly is defined further as providing the illusion assembly with the rear face of the first total reflection prism extending at an angle of about forty five degrees with respect to the front of the container and at an angle of about forty five degrees with respect to the front face of the first total reflection prism and at an angle of about forty five degrees with respect to the bottom face of the first total reflection prism, and wherein the front face of the first total reflection prism extends at an angle of about ninety degrees with respect to the bottom face of the first total reflection prism, the front face of the first total reflection prism being disposed adjacent the first transparent area and comprising a portion of the first transparent area, and wherein the rear face of the second total reflection prism extends at an angle of about forty five degrees with respect to the front face of the second total reflection prism and at an angle of about forty five degrees with respect to the bottom face of the second total reflection prism, and the front face of the second total reflection prism extends at an angle of about ninety degrees with respect to the bottom face of the second total reflection prism, the front face of the second total reflection prism being disposed adjacent the second transparent area and comprising a portion of the second transparent area, the bottom faces of the first and the second total reflection prisms extending in a coplaner disposition and the bottom faces of the first and the second total reflection prisms extending in a plane about parallel with the front face of the Porro prism.

198. The method of claim 197 wherein the step of providing the illusion assembly is defined further as providing the illusion assembly with the bottom faces of the first and the second total reflection prisms being spaced a distance from the front face of the Porro prism, and wherein some of the light passes through a portion of the first transparent area and through the space between the first and the second total reflection prisms and the Porro prism and out the second transparent area, a portion of the space between the first and the second total reflection prisms and the Porro prism comprising a portion of the first transparent area and a portion of the space between the first and the second total reflection prisms and the Porro prism comprising a portion of the second transparent area.

199. The method of claim 198 wherein the step of providing the illusion assembly is defined further as providing the illusion assembly with one end of the rear face of the first total reflection prism being disposed near one end of the rear face of the second total reflection prism and the rear face of the first total reflection prism extends at an angle of about ninety degrees with respect to the rear face of the second total reflection prism.

200. The method of claim 177 wherein the step of providing the illusion assembly is defined further as providing the illusion assembly with the illusion devices further comprising a first total reflection prism having a front face, a bottom face and a rear face, the front face being disposed adjacent the front opening in the container and the front face comprising a portion of the front opening in the container; a second total reflection prism having a front face, a bottom face and a rear face, the front face being positioned adjacent the rear opening in the container; and a Porro prism having a first rear face, a second rear face, and a front face, the first and the second total reflection prisms and the Porro prism being positioned in the container whereby at least some of the light is passed through the front opening in the container and through the front face of the first total reflection prism onto the rear face of the first total reflection prism, the light being reflected from the rear face of the first total reflection prism onto the front face of the Porro prism, the light being passed from the front face of the Porro prism through the Porro prism and onto the first rear face of the Porro prism, the light being reflected from the first rear face of the Porro prism through the Porro prism and onto the second rear face of the Porro prism, and the light being reflected from the second rear face of the Porro prism through the Porro prism and through the front face of the Porro prism and through the bottom face of the second total reflection prism and through the second total reflection prism onto the rear face of the second total reflection prism and the light being reflected from the rear face of the second total reflection prism through the second total reflection prism and out through the front face of the second total reflection prism and out through the front opening in the container.

201. The method of claim 200 wherein the step of providing the illusion assembly is defined further as providing the illusion assembly with the front face of the Porro prism extending between the first transparent area and the second transparent area being disposed in a plane about parallel with the bottom faces of the first and the second total reflection prisms, the first rear face of the Porro prism extending at an angle of about forty five degrees with respect to the front of the container about forty five degrees with respect to the front face of the Porro prism, and the second rear face of the Porro prism extending at an angle of about forty five degrees with respect to the rear of the container and at an angle of about ninety degrees with respect to the first rear face of the Porro prism and the second rear face of the Porro prism extending at an angle of about forty five degrees with respect to the front face of the Porro prism.

202. The method of claim 201 wherein the step of providing the illusion assembly is defined further as providing the illusion assembly with the rear face of the first total reflection prism extending at an angle of about forty five degrees with respect to the front of the container and at an angle of about forty five degrees with respect to the front face of the first total reflection prism and at an angle of about forty five degrees with respect to the bottom face of the first total reflection prism, and wherein the front face of the first total reflection prism extends at an angle of about ninety degrees with respect to the bottom face of the first total reflection prism, the front face of the first total reflection prism being disposed about adjacent the first transparent area and comprising a portion of the first transparent area, and wherein the rear face of the second total reflection prism extends at an angle of about forty five degrees with respect to the front face of the second total reflection prism and at an angle of about forty five degrees with respect to the bottom face of the second total reflection prism, and the front face of the second total reflection prism extends at an angle of about ninety degrees with respect to the bottom face of the second total reflection prism, the front face of the second total reflection prism being disposed adjacent the second transparent area and comprising a portion of the second transparent area, the bottom faces of the first and the second total reflection prisms extending in a coplaner disposition and the bottom faces of the first and the second total reflection prisms extending in a plane about parallel with the front face of the Porro prism.

203. The method of claim 202 wherein the step of providing the illusion assembly is defined further as providing the illusion assembly with the bottom faces of the first and the second total reflection prisms being spaced a distance from the front face of the Porro prism, and wherein some of the light passes through a portion of the first transparent area and through the space between the first and the second total reflection prisms and the Porro prism and out the second transparent area.

204. The method of claim 203 wherein the step of providing the illusion assembly is defined further as providing the illusion assembly with one end of the rear face of the first total reflection prism being disposed near one end of the rear face of the second total reflection prism and the rear face of the first total reflection prism extends at an angle of about ninety degrees with respect to the rear face of the second total reflection prism, a portion of the space between the first and the second total reflection prisms and the Porro prism comprising a portion of the first transparent area and a portion of the space between the first and the second total reflection prisms and the Porro prism comprising a portion of the second transparent area.

205. The method of claim 167 wherein the step of providing the illusion assembly is defined further as providing the illusion assembly with the illusion devices comprising a Dove prism having a front wall, a rear wall, a first end wall, a second end wall, a bottom wall and a top, the top extending in a plane about parallel with the bottom wall, the front wall extending between the bottom wall and the top at an angle of about forty five degrees from the bottom wall and the front wall being angled generally toward the rear wall, the rear wall being spaced a distance from the front wall, and the rear wall extending between the bottom wall and the top and the rear wall extending from the bottom wall generally toward the front wall at an angle of about forty five degrees with respect to the bottom wall, the light rays entering the front wall and being reflected in the Dove prism and reflected out the rear wall.

206. The method of claim 205 wherein the step of providing the illusion assembly is defined further as providing the illusion assembly with the Dove prism being defined further as comprising at least a portion of the container, the retaining space being formed in the top of the Dove prism and extending a distance through the Dove prism toward the bottom wall of the Dove prism, the retaining space being positioned so that the light rays reflected in the Dove prism do not pass through the retaining space.

207. The method of claim 205 wherein the step of providing the illusion assembly is defined further as providing the illusion assembly with the Dove prism being defined further as having the first end wall angled from the bottom wall to the top and toward the second end wall at an angle of about forty five degrees with respect to the bottom wall and having the second end wall extending between the bottom wall and the top at an angle of about forty five degrees with respect to the bottom wall and extending generally toward the first end wall.

208. The method of claim 167 wherein the step of providing the illusion assembly is defined further as providing the illusion assembly with the illusion devices comprising a pair of Dove prisms, each Dove prism having a front wall, a rear wall, a first end wall, a second end wall, a bottom wall and a top, the top extending in a plane about parallel with the bottom wall, the front wall extending between the bottom wall and the top at an angle of about forty five degrees from the bottom wall, and the front wall being angled generally toward the rear wall, the rear wall being spaced a distance from the front wall and extending between the bottom wall and the top and the rear wall extending from the bottom wall generally toward the front wall at an angle of about forty five degrees with respect to the bottom wall, the light rays entering the front wall and being reflected in the Dove prism and reflected out the rear wall, the rear wall of one of the Dove prisms being disposed near the front wall of the other Dove prism and positioned so that the light rays passing from the rear wall of the one Dove prism enter the front wall of the other Dove prism and are reflected within the other Dove prism and out the rear wall of the other Dove prism.

209. The method of claim 208 wherein the step of providing the illusion assembly is defined further as providing the illusion assembly with each Dove prism comprising at least a portion of the container and wherein the retaining space is defined further to comprise a retaining space formed in the top of each of the Dove prisms with each retaining space being positioned in the respective Dove prism so that the light rays passing through the respective Dove prisms do not pass through the retaining space in that Dove prism.

210. The method of claim 167 wherein the step of providing the illusion assembly is defined further as providing the illusion assembly with the illusion devices comprising a first lens having a focal point spaced a first focal length from the first lens, the first lens being disposed about adjacent the first transparent area, the first lens comprising at least a portion of the first transparent area; and a second lens having a focal point spaced a second focal length from the second lens with the second lens being disposed about adjacent the second transparent area, and with the second lens comprising at least a portion of the second transparent area, the first lens and the second lens being aligned and the first focal length being about equal to the second focal length, the focal point of the first lens about coinciding with the focal point of the second lens, the light rays passing through the first transparent area and through the first lens and being focused at the focal points of the first and second lenses and the light passing from the focal points of the first and the second lenses through the second lens and out the second transparent area.

211. The method of claim 210 the step of providing the illusion assembly is defined further as providing the illusion assembly further comprising a first hollow cone shaped opaque light housing having a first end and a second end, the first end of the first light housing being positioned adjacent the first lens and the first lens of the first light housing substantially encompassing the first end, the first light housing extending a distance into the container space terminating with the second end of the first light housing positioned at about the focal points of the first and the second lenses; and a second hollow cone shaped opaque light housing having a first end and a second end, the first end of the second light housing substantially encompassing the second lens, the second light housing extending a distance into the container space terminating with the second end of the second light housing positioned near the second end of the first light housing and positioned at about the focal points of the first and the second lenses, the first and the second light housing cooperating with portions of the container to form the retainer assembly and define the retaining space.

212. The illusion of claim 177 wherein the step of providing the illusion assembly is defined further as providing the illusion assembly with the illusion devices comprising a first lens having a first focal point spaced a first focal length from the first lens, the first lens being disposed in the front opening in the front wall and the first lens substantially encompassing the front opening, the first lens comprising at least a portion of the first transparent area; and a second lens having a focal point spaced a second focal length from the second lens with the second lens being disposed in the rear opening in the rear wall and substantially encompassing the rear opening, the second lens comprising at least a portion of the second transparent area, the first lens and the second lens being aligned and the first focal length being about equal to the second focal length, the focal point of the first focal lens about coinciding with the focal point of the second lens, the light rays passing through the first lens and being focused at the focal points of the first and the second lenses and the light rays passing from the focal points of the first and the second lenses through the second lens and out the rear opening.

213. The method of claim 212 the step of providing the illusion assembly is defined further as providing the illusion assembly further comprising a first hollow cone shaped opaque light housing having a first end and a second end, the first end of the first light housing being positioned adjacent the first lens and the first lens of the first light housing substantially encompassing the first end, the first light housing extending a distance into the container space terminating with the second end of the first light housing positioned at about the focal points of the first and the second lenses; and a second hollow cone shaped opaque light housing having a first end and a second end, the first end of the second light housing substantially encompassing the second lens, the second light housing extending a distance into the container space terminating with the second end of the second light housing positioned near the second end of the first light housing and positioned at about the focal points of the first and the second lenses, the first and the second light housing cooperating with portions of the container to form the retainer assembly and define the retaining space.

214. The method of claim 177 wherein the step of providing the illusion assembly is defined further as providing the illusion assembly with the front opening being defined further as comprising a plurality of spaced apart front openings, and wherein the rear opening is defined further as comprising a plurality of spaced apart rear openings, each front opening being aligned with one of the rear openings to form an aligned pair of front openings and rear openings, and wherein the illusion devices comprise a plurality of first lenses, each first lens being positioned in one of the front openings, each first lens having a focal point spaced a first focal length from the first lens, the first lenses cooperating to comprise the first transparent area; a plurality of second lenses, each second lens being positioned in one of the rear openings, each second lens having a focal point spaced a second focal length from the second lens, the second lenses cooperating to define the second transparent area, each first lens being aligned with one of the second lenses to form an aligned pair of lenses and the first focal length and the second focal length of each aligned pair of lenses being about equal whereby the focal points of each pair of aligned lenses about coincide, light rays passing through each of the first lenses being focused at the focal points of the respective first and second lenses of each aligned pair of lenses and the light rays passing from the focal points through the respective second lenses of the aligned pair of lenses.

215. The method of claim 184 the step of providing the illusion assembly is defined further as providing the illusion assembly further comprising a plurality of first hollow cone shaped opaque light housings, each first light housing having a first end and a second end, the first end of each of the first light housing being positioned adjacent one of the first lenses and the first end of the first light housing substantially encompassing one of the first lenses, each first light housing extending a distance into the container space terminating with the second end of the first light housing positioned at about the focal point of the respective first lens; and a plurality of second hollow cone shaped light housings, each second light housing having a first end and a second end, the first end of each of the second light housings substantially encompassing one of the second lenses, each of the second light housings extending a distance into the container space terminating with the second end of the second light housing positioned near the second end of one of the first light housings and positioned at about the focal point of the second lens, the first and the second light housings cooperating with portions of the container to form the retainer assembly and define the retaining space.

216. The method of claim 167 wherein the step of providing the illusion assembly is defined further as providing the illusion assembly with the container comprising a front and a rear, and wherein the illusion devices comprise a first lens disposed near the front of the container and the first lens comprising at least a portion of the first transparent area; and a second lens disposed near the rear of the container with the second lens being spaced a distance from the first lens and the second lens comprising at least a portion of the second transparent area, light passing through the first lens and passing from the first lens through the second lens.

217. The method of claim 215 wherein the step of providing the illusion assembly is defined further as providing the illusion assembly with each of the first and the second lenses being defined further as comprising a converging lens.

218. The method of claim 216 wherein the step of providing the illusion assembly is defined further as providing the illusion assembly with the first lens being a converging lens and the second lens being a diverging lens.

219. The method of claim 217 wherein the step of providing the illusion assembly is defined further as providing the illusion assembly with the front opening being defined further as comprising a plurality of front openings and wherein the rear opening is defined further as comprising a plurality of rear openings, and wherein the illusion devices further comprise a plurality of optical fibers, one end of each optical fiber being disposed in one of the front openings and the opposite end of each optical fiber being disposed in one of the rear openings, light passing from the front openings through the optical fibers and out the rear openings.

220. The method of claim 177 wherein the step of providing the illusion assembly is defined further as providing the illusion assembly with each front opening being aligned with one of the rear openings, and wherein each optical fiber extends from one of the front openings to the rear opening aligned therewith.

221. The method of claim 220 wherein the step of providing the illusion assembly is defined further as providing the illusion assembly with illusion devices comprising a video camera disposed in the container space having a lens disposed adjacent the front opening with the lens substantially encompassing the front opening and comprising the first transparent area; a display disposed in the rear opening with the display substantially encompassing the rear opening and comprising the second transparent area; and means interconnecting the video camera and the display whereby images received by the video camera are displayed on the display.

222. The method of claim 167 wherein the step of providing the illusion assembly is defined further as providing the illusion assembly with the illusion devices further comprising a first right triangle prism; a second right triangle prism; a third right triangle prism; and a fourth right triangle prism, the first right triangle prism, the second right triangle prism, the third right triangle prism and the fourth right triangle prism being positioned whereby light enters the first transparent areas and passes through the first right triangle prism wherein the light is reflected from the first right triangle prism to the second right triangle prism and wherein the light is passed through the second right triangle prism and reflected through the third right triangle prism, and wherein the light is passed through the third right triangle prism and reflected to the fourth right triangle prism and wherein the light is passed through the fourth right triangle prism and reflected out of the fourth right triangle prism and out through the second transparent area.

223. An illusion assembly for retaining an item comprising:

a container having a first transparent area and a second transparent area, at least a portion of the item being disposed in the container and positioned between the first transparent area and the second transparent area of the container; and illusion means for enabling an individual to look through the first transparent area, and through the second transparent area without the individual seeing the portion of the item disposed in the container.

224. An illusion assembly comprising:

a floral grouping;

a container having a first transparent area and a second transparent area, at least a portion of the floral grouping being disposed in the container and positioned between the first transparent area and the second transparent area of the container; and illusion devices for creating the illusion of seeing through the first transparent area, and through the second transparent area without seeing the portion of the floral grouping disposed in the retainer assembly.

225. A method comprising:

providing an item;

providing an illusion assembly comprising a container having a first transparent area and a second transparent area, the container at least partially encompassing a container space with at least a portion of the container space being disposed between the first transparent area and the second transparent area of the container; a retainer assembly defining a retaining space with at least a portion of the retainer assembly being disposed between the first transparent area and the second transparent area; and illusion means for enabling an individual to look through the first transparent area, and through the second transparent area without the individual seeing any portion of the retainer assembly disposed between the first transparent area and the second transparent area;

disposing at least a portion of the item in the retaining space; and looking, by the individual, through the first transparent area and seeing the illusion created by the illusion means of looking through the second transparent area without the individual seeing the portion of the item disposed in the retaining space.

226. A method comprising:

providing a floral grouping;

providing an illusion assembly comprising a container having a first transparent area and a second transparent area, the container at least partially encompassing a container space with at least a portion of the container space being disposed between the first transparent area and the second transparent area of the container; a retainer assembly defining a retaining space with at least a portion of the retainer assembly being disposed between the first transparent area and the second transparent area; and illusion devices for creating the illusion of seeing through the first transparent area, and through the second transparent area without seeing any portion of the retainer assembly disposed between the first transparent area and the second transparent area;

disposing at least a portion of the floral grouping in the retaining space; and looking through the first transparent area and seeing the illusion created by the illusion devices of looking through the second transparent area without seeing the portion of the floral grouping disposed in the retaining space.

* * * * *

UNITED STATES PATENT AND TRADEMARK OFFICE
CERTIFICATE OF CORRECTION

PATENT NO. : 5,392,161

DATED : February 21, 1995

INVENTOR(S) : Weder et al.

It is certified that error appears in the above-identified patent and that said Letters Patent is hereby corrected as shown below:

In the drawings, please add the reference numeral --346-- to Figure 6 as indicated below.

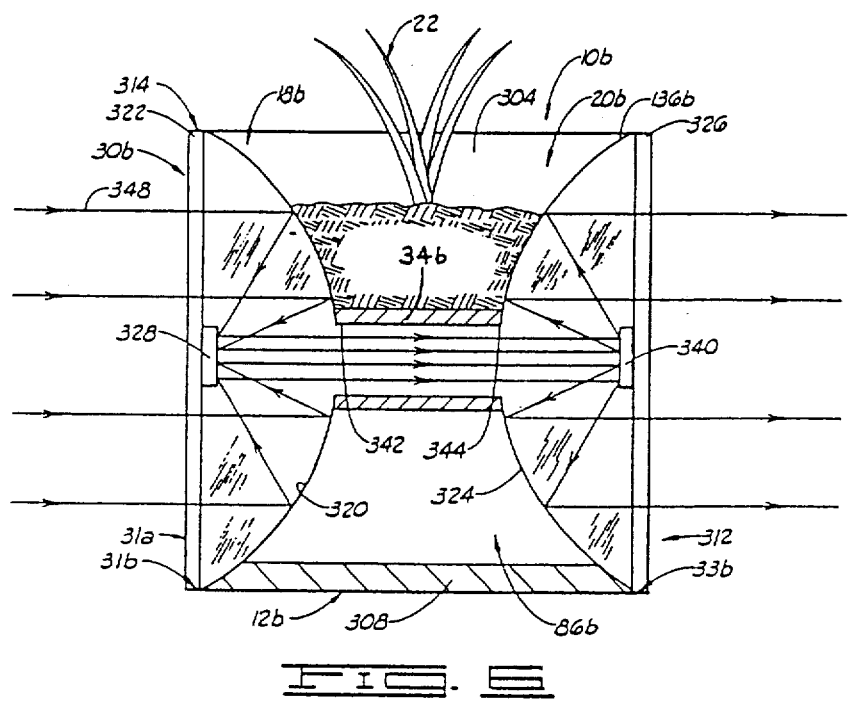

FIG. 6

UNITED STATES PATENT AND TRADEMARK OFFICE
CERTIFICATE OF CORRECTION

PATENT NO. : 5,392,161
DATED : February 21, 1995
INVENTOR(S) : Weder et al.

It is certified that error appears in the above-identified patent and that said Letters Patent is hereby corrected as shown below:

In the drawings, please add the reference numeral --440-- and designations --A--, --B--, --C-- and --D-- to Figure 7 as indicated below.

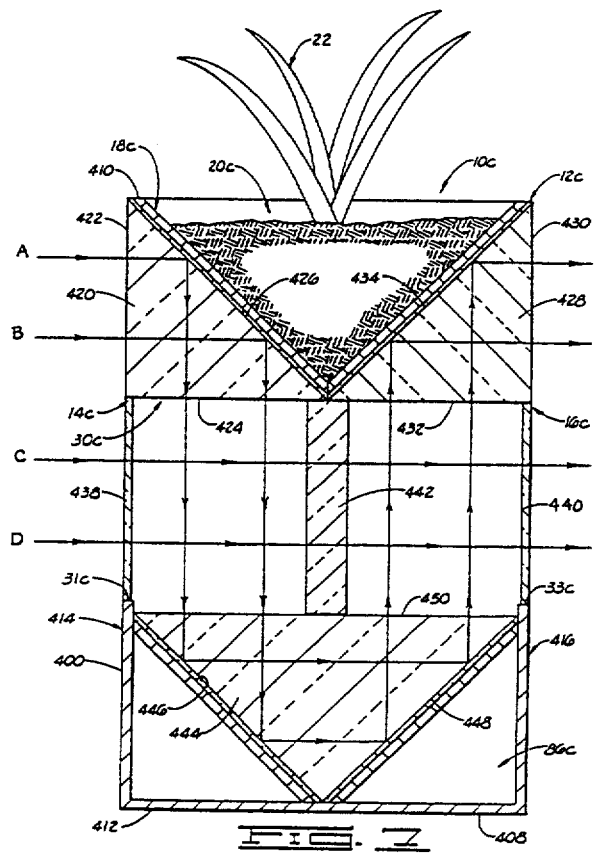

UNITED STATES PATENT AND TRADEMARK OFFICE
CERTIFICATE OF CORRECTION

PATENT NO. : 5,392,161
DATED : February 21, 1995
INVENTOR(S) : Weder et al.

It is certified that error appears in the above-identified patent and that said Letters Patent is hereby corrected as shown below:

In the drawings, please add the designations --A--, --B--, --C--, --D-- and --E-- to Figure 14 as indicated below.

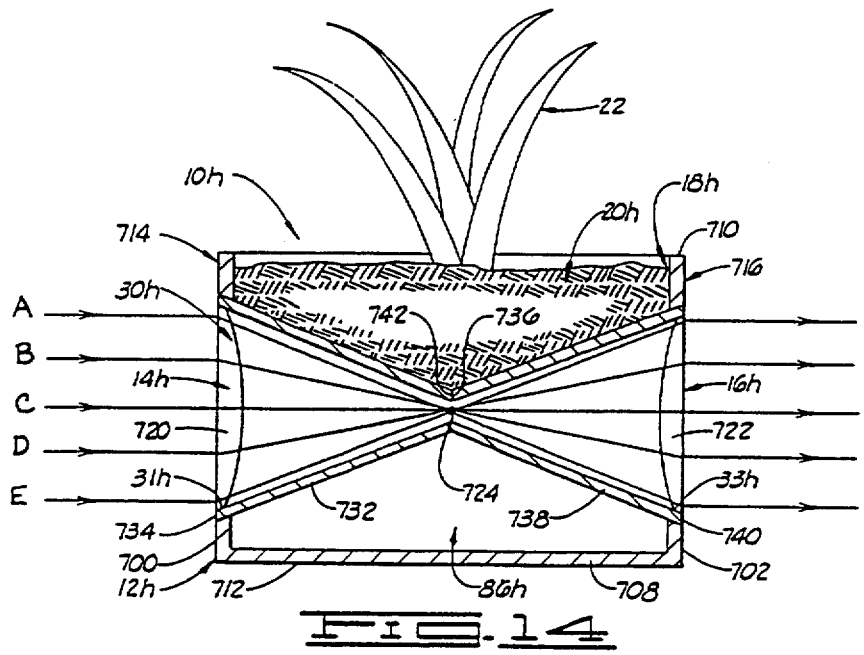

UNITED STATES PATENT AND TRADEMARK OFFICE
CERTIFICATE OF CORRECTION

PATENT NO. : 5,392,161
DATED : February 21, 1995
INVENTOR(S) : Weder et al.

It is certified that error appears in the above-identified patent and that said Letters Patent is hereby corrected as shown below:

In the drawings, please add the reference numeral --810-- to Figure 19 as indicated below.

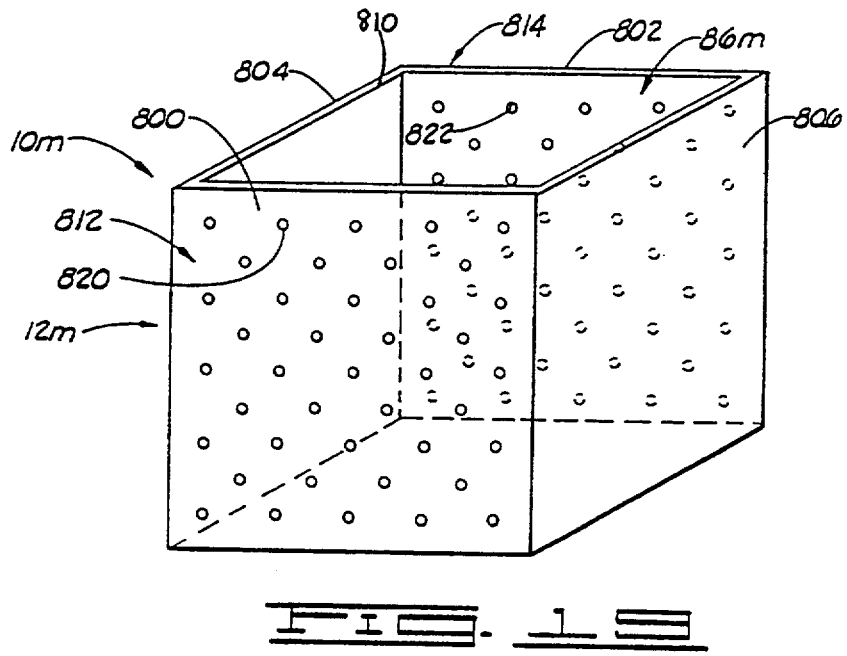

FIG. 19

UNITED STATES PATENT AND TRADEMARK OFFICE
CERTIFICATE OF CORRECTION

PATENT NO. : 5,392,161

DATED : February 21, 1995

INVENTOR(S) : Weder et al.

It is certified that error appears in the above-identified patent and that said Letters Patent is hereby corrected as shown below:

Column 3, line 53, please delete "second side wall 34" and substitute therefor --second end wall 34--.

Column 4, line 51, please delete "in" and substitute therefor -- and --.

Column 4, line 51, after "second end 104" please insert -- of --.

Column 4, line 61, please delete "top 44" and substitute therefor -- top 42 --.

Column 8, line 30, please delete "component space 86a" and substitute therefor -- container space 86a --.

Column 10, line 32, please delete "container space 866" and substitute therefor -- container space 86b --.

Column 14, line 21, please delete "optical path matching plate 582" and substitute therefor -- optical path matching plate 442 --.

Column 14, line 29, please delete "reflection prism 422" and substitute therefor -- reflection prism 420 --.

UNITED STATES PATENT AND TRADEMARK OFFICE
CERTIFICATE OF CORRECTION

PATENT NO. : 5,392,161
DATED : February 21, 1995
INVENTOR(S) : Weder et al.

It is certified that error appears in the above-identified patent and that said Letters Patent is hereby corrected as shown below:

Column 14, line 32, please delete "reflection prism 422" and substitute therefor -- reflection prism 420 --.

Column 15, line 2, please delete "patch matching plate" and substitute therefor -- path matching plate --.

Column 15, line 64, please delete "front opening 14d" and substitute therefor -- front transparent area 14d --.

Column 15, line 66, please delete "rear opening 16b" and substitute therefor -- rear transparent area 16b --.

Column 16, line 1, please delete "illusion devices 30c" and substitute therefor -- illusion devices 30d --.

Column 17, line 27, please delete "container space 20h" and substitute therefor -- retaining space 20h --.

Column 17, line 45, please delete "rear opening 16b" and substitute therefor -- rear opening 33h--.

Column 17, line 45, please delete "container 33h" and substitute therefor -- container 12h --.

UNITED STATES PATENT AND TRADEMARK OFFICE
CERTIFICATE OF CORRECTION

PATENT NO. : 5,392,161
DATED : February 21, 1995
INVENTOR(S) : Weder et al.

It is certified that error appears in the above-identified patent and that said Letters Patent is hereby corrected as shown below:

Column 17, line 64, please delete "front" and substitute therefor -- first --.

Column 18, line 20, please delete "container 12g" and substitute therefor -- container 12h --.

Column 18, line 61, please delete "731i" and substitute therefor -- 732i --.

Column 19, line 16, please delete "posses" and substitute therefor -- possess --.

Column 21, line 34, please delete "right triangle prisms" and substitute therefor -- total reflection prisms --.

Column 22, line 10, after "transparent" please insert -- area --.

Column 22, line 41, please delete "opening 14r" and substitute therefor -- area 14r --.

Column 22, lines 44-45, please delete "transparent window 970r" and substitute therefor -- transparent window 970 --.

Column 22, lines 52-53, please delete "front transparent area 16r" and substitute therefor -- rear transparent area 16r --.

UNITED STATES PATENT AND TRADEMARK OFFICE
CERTIFICATE OF CORRECTION

PATENT NO. : 5,392,161
DATED : February 21, 1995
INVENTOR(S) : Weder et al.

It is certified that error appears in the above-identified patent and that said Letters Patent is hereby corrected as shown below:

Column 22, lines 55-56, please delete "front transparent opening 14r" and substitute therefor -- front transparent area 14r --.

Column 22, line 56, please delete "rear transparent opening 16r" and substitute therefor -- rear transparent area 16r --.

Column 27, line 12, after "claim 1" please insert -- wherein --.

Column 29, line 31, before "rear concave mirror" please insert -- the --.

Column 30, line 50, before "rear concave mirror" please insert -- the --.

Column 35, line 23, please delete "prisms enters" and substitute therefor -- prism enter --.

Column 37, line 25, please delete "housing" and substitute therefor -- housings --.

Column 42, line 54, after "claim 56" please insert -- wherein --.

Column 45, line 5, before "rear concave mirror" please insert -- the --.

UNITED STATES PATENT AND TRADEMARK OFFICE
CERTIFICATE OF CORRECTION

PATENT NO. : 5,392,161
DATED : February 21, 1995
INVENTOR(S) : Weder et al.

It is certified that error appears in the above-identified patent and that said Letters Patent is hereby corrected as shown below:

Column 46, line 23, before "rear concave mirror" please insert -- the --.

Column 52, line 64, please delete "housing" and substitute therefor -- housings --.

Column 53, line 32, please delete "if" and substitute therefor -- is --.

Column 54, line 21, please insert --,-- after the word "container".

Column 60, line 16, please delete "claim 113" and substitute therefor -- claim 112 --.

Column 60, line 38, after "opening in" please insert -- the --.

Column 61, line 14, after "claim 129" please insert -- wherein --.

Column 61, line 59, after "opening in" please insert -- the --.

Column 62, line 1, after "claim 134" please insert -- wherein --.

Column 62, line 20, after "assembly" please insert -- with --.

UNITED STATES PATENT AND TRADEMARK OFFICE
CERTIFICATE OF CORRECTION

PATENT NO. : 5,392,161
DATED : February 21, 1995
INVENTOR(S) : Weder et al.

It is certified that error appears in the above-identified patent and that said Letters Patent is hereby corrected as shown below:

Column 67, line 20, after "claim 154" please insert -- wherein --.

Column 67, line 64, after "claim 156" please insert -- wherein --.

Column 68, line 47, after "claim 128" please insert -- wherein --.

Column 68, line 52, please delete "housing" and substitute therefor -- housings --.

Column 73, line 62, after "first mirror" please delete "is".

Column 75, line 4, after "extending" please insert -- in --.

Column 76, line 35, after "opening in" please insert -- the --.

Column 77, line 11, after "claim 185" please insert -- wherein --.

Column 77, line 55, after "opening in" please insert -- the --.

Column 77, line 65, after "claim 190" please insert -- wherein --.

UNITED STATES PATENT AND TRADEMARK OFFICE
CERTIFICATE OF CORRECTION

PATENT NO. : 5,392,161
DATED : February 21, 1995
INVENTOR(S) : Weder et al.

It is certified that error appears in the above-identified patent and that said Letters Patent is hereby corrected as shown below:

Column 78, line 16, after "illusion assembly" please insert -- wherein --.

Column 79, line 27, please delete "prism and," and substitute therefor -- prism, and --.

Column 83, line 16, after "claim 210" please insert -- wherein --.

Column 83, line 60, after "claim 212" please insert -- wherein --.

Column 84, line 42, after "claim 184" please insert -- wherein --.

Column 84, line 47, please delete "housing" and substitute therefor -- housings --.

Signed and Sealed this

Twenty-fifth Day of July, 1995

*Attest:*

BRUCE LEHMAN

*Attesting Officer*  *Commissioner of Patents and Trademarks*